US012726988B2

(12) United States Patent
Yang et al.

(10) Patent No.: US 12,726,988 B2
(45) Date of Patent: Sep. 1, 2026

(54) MODULARIZED DESIGN FOR INTER-PHYSICAL LAYER PRIORITY UCI MULTIPLEXING

(71) Applicant: APPLE INC., Cupertino, CA (US)

(72) Inventors: Weidong Yang, San Digeo, CA (US); Amir Aminzadeh Gohari, Sunnyvale, CA (US); Chao Jin, San Diego, CA (US); Dawei Zhang, Saratoga, CA (US); Hong He, San Jose, CA (US); Oghenekome Oteri, San Diego, CA (US); Ruoheng Liu, San Diego, CA (US); Sigen Ye, San Diego, CA (US); Wei Zeng, Saratoga, CA (US); Wenshu Zhang, Sunnyvale, CA (US); Yinghui Li, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 250 days.

(21) Appl. No.: 18/559,623

(22) PCT Filed: May 11, 2022

(86) PCT No.: PCT/US2022/072270
§ 371 (c)(1),
(2) Date: Nov. 8, 2023

(87) PCT Pub. No.: WO2022/241449
PCT Pub. Date: Nov. 17, 2022

(65) Prior Publication Data

US 2024/0244622 A1 Jul. 18, 2024

Related U.S. Application Data

(60) Provisional application No. 63/187,085, filed on May 11, 2021.

(51) Int. Cl.
*H04W 72/21* (2023.01)
*H04B 7/06* (2006.01)
(Continued)

(52) U.S. Cl.
CPC .......... *H04W 72/21* (2023.01); *H04B 7/0626* (2013.01); *H04L 1/0061* (2013.01);
(Continued)

(58) Field of Classification Search
CPC ... H04L 1/1854; H04L 5/0055; H04L 1/1861; H04L 5/0064; H04W 72/56; H04W 72/04
See application file for complete search history.

(56) References Cited

U.S. PATENT DOCUMENTS

2018/0220413 A1 * 8/2018 Yang ..................... H04W 72/56
2018/0279353 A1 * 9/2018 Shaheen ............... H04W 72/21
(Continued)

FOREIGN PATENT DOCUMENTS

WO WO-2020135214 A1 * 7/2020 ............ H04W 72/56
WO 2020202068 A1 10/2020
(Continued)

OTHER PUBLICATIONS

Sony, "Considerations in intra-UE UL multiplexing", R1-2008358, 3GPP TSG RAN WG1 #103-e, e-Meeting, Item 8.3.3, Oct. 26-Nov. 13, 2020, 4 pages.
(Continued)

*Primary Examiner* — Yee F Lam
(74) *Attorney, Agent, or Firm* — Dorsey & Whitney LLP

(57) ABSTRACT

Systems and methods for modularized design for inter-physical layer priority uplink control information (UCI) multiplexing are disclosed herein. A user equipment (UE) may determine a first code rate for a first portion of UCI and a second code rate for a second portion of UCI. Different code rates may be used to encode different portions of UCI
(Continued)

(e.g., hybrid automatic repeat request acknowledgement (HARQ-ACK) bits, channel state information (CSI) reporting bits, scheduling request (SR) bits, cyclic redundancy check (CRC) bits, etc.). Further, a UE may select a group of bets offset sets based on a physical layer priority type and a UCI multiplexing type.

15 Claims, 24 Drawing Sheets

(51) Int. Cl.

| | |
|---|---|
| ***H04L 1/00*** | (2006.01) |
| ***H04L 1/1607*** | (2023.01) |
| ***H04L 1/1812*** | (2023.01) |
| ***H04L 1/1829*** | (2023.01) |
| ***H04L 5/00*** | (2006.01) |
| ***H04W 72/12*** | (2023.01) |
| ***H04W 72/232*** | (2023.01) |
| ***H04W 72/563*** | (2023.01) |
| ***H04W 72/566*** | (2023.01) |

(52) U.S. Cl.

CPC .......... *H04L 1/0067* (2013.01); *H04L 1/1671* (2013.01); *H04L 1/1812* (2013.01); *H04L 1/1854* (2013.01); *H04L 5/0051* (2013.01); *H04W 72/12* (2013.01); *H04W 72/232* (2023.01); *H04W 72/563* (2023.01); *H04W 72/566* (2023.01)

(56) References Cited

U.S. PATENT DOCUMENTS

| | | | |
|---|---|---|---|
| 2018/0324787 A1* | 11/2018 | Yin | H04L 5/0053 |
| 2020/0008227 A1* | 1/2020 | Lee | H04W 28/0278 |
| 2021/0051649 A1 | 2/2021 | He et al. | |
| 2021/0194622 A1 | 6/2021 | Takeda et al. | |
| 2021/0250134 A1 | 8/2021 | Islam et al. | |
| 2021/0266941 A1* | 8/2021 | Park | H04L 1/1861 |
| 2021/0321394 A1* | 10/2021 | Li | H04W 72/0446 |
| 2021/0368508 A1* | 11/2021 | Chen | H04L 1/0013 |
| 2022/0104210 A1 | 3/2022 | Yang et al. | |
| 2022/0132537 A1* | 4/2022 | Wang | H04L 1/0061 |
| 2022/0183025 A1 | 6/2022 | Frberg et al. | |
| 2022/0217709 A1 | 7/2022 | Yang et al. | |
| 2022/0225380 A1 | 7/2022 | Zhang et al. | |
| 2022/0232591 A1 | 7/2022 | Hosseini et al. | |
| 2022/0279538 A1 | 9/2022 | Jung et al. | |
| 2023/0155720 A1 | 5/2023 | Yin | |
| 2023/0189274 A1 | 6/2023 | Li et al. | |
| 2023/0231688 A1 | 7/2023 | Chen et al. | |
| 2023/0284225 A1 | 9/2023 | Yin et al. | |
| 2023/0300840 A1 | 9/2023 | Zhang et al. | |
| 2023/0318748 A1 | 10/2023 | Yin et al. | |
| 2023/0354404 A1 | 11/2023 | Li et al. | |
| 2023/0379094 A1 | 11/2023 | Yin et al. | |
| 2023/0379916 A1 | 11/2023 | Yin et al. | |
| 2024/0089928 A1 | 3/2024 | Zhang et al. | |
| 2024/0146466 A1 | 5/2024 | Yin et al. | |

FOREIGN PATENT DOCUMENTS

| | | |
|---|---|---|
| WO | 2021028872 A1 | 2/2021 |
| WO | 2021152804 A1 | 8/2021 |

OTHER PUBLICATIONS

Apple Inc., R1-2200416, 3GPP TSG RAN WG1 #107bis-e, e-Meeting, Agenda Item 8.3.3, Jan. 17-25, 2022, 61 pages.

Intel Corporation, "Further analysis and details of intra-UE multiplexing and prioritization", R1-2103030, 3GPP TSG RAN WG1 Meeting #104-bis-E, e-Meeting, Agenda Item 8.3.3, Apr. 12-Apr. 20, 2021, 21 pages.

Nokia, Nokia Shanghai Bell, "On UL intra-UE prioritization and multiplexing enhancements", R1-2008843, 3GPP TSG RAN WG1 #103-e, e-Meeting, Agenda Item 8.3.3, Oct. 26-Nov. 13, 2020, 20 pages.

Sony, "Considerations on intra-UE UL multiplexing", R1-2103303, 3GPP TSG RAN WG1 #104bis-e, e-Meeting, Agenda Item 8.3.3, Apr. 12-20, 2021, 8 pages.

PCT/US2022/072269, International Search Report and Written Opinion, Sep. 7, 2022, 16 pages.

PCT/US2022/072270, International Search Report and Written Opinion, Sep. 15, 2022, 15 pages.

PCT/US2022/072271, International Search Report and Written Opinion, Sep. 15, 2022, 17 pages.

U.S. Appl. No. 18/559,628, Non-Final Office Action, Jan. 26, 2025, 9 pages.

U.S. Appl. No. 18/559,646, Non-Final Office Action, Dec. 19, 2025, 16 pages.

U.S. Appl. No. 18/559,646, Final Office Action, Jun. 5, 2026, 23 pages.

* cited by examiner

600

602

604

| UCI(s) for transmission on a PUCCH | UCI for encoding | Value of $E_{UCI}$ |
|---|---|---|
| HARQ-ACK | HARQ-ACK | $E_{UCI} = E_{tot}$ |
| HARQ-ACK, SR | HARQ-ACK, SR | $E_{UCI} = E_{tot}$ |
| CSI (CSI not of two parts) | CSI | $E_{UCI} = E_{tot}$ |
| HARQ-ACK, CSI (CSI not of two parts) | HARQ-ACK, CSI | $E_{UCI} = E_{tot}$ |
| HARQ-ACK, SR, CSI (CSI not of two parts) | HARQ-ACK, SR, CSI | $E_{UCI} = E_{tot}$ |
| CSI (CSI of two parts) | CSI part 1 | $E_{UCI} = \min\left(E_{tot}, \left\lceil \left(O^{CSI\text{-}part1} + L\right) / R_{UCI}^{max} / Q_m \right\rceil \cdot Q_m\right)$ |
| | CSI part 2 | $E_{UCI} = E_{tot} - \min\left(E_{tot}, \left\lceil \left(O^{CSI\text{-}part1} + L\right) / R_{UCI}^{max} / Q_m \right\rceil \cdot Q_m\right)$ |
| HARQ-ACK, CSI (CSI of two parts) | HARQ-ACK, CSI part 1 | $E_{UCI} = \min\left(E_{tot}, \left\lceil \left(O^{ACK} + O^{CSI\text{-}part1} + L\right) / R_{UCI}^{max} / Q_m \right\rceil \cdot Q_m\right)$ |
| | CSI part 2 | $E_{UCI} = E_{tot} - \min\left(E_{tot}, \left\lceil \left(O^{ACK} + O^{CSI\text{-}part1} + L\right) / R_{UCI}^{max} / Q_m \right\rceil \cdot Q_m\right)$ |
| HARQ-ACK, SR, CSI (CSI of two parts) | HARQ-ACK, SR, CSI part 1 | $E_{UCI} = \min\left(E_{tot}, \left\lceil \left(O^{ACK} + O^{SR} + O^{CSI\text{-}part1} + L\right) / R_{UCI}^{max} / Q_m \right\rceil \cdot Q_m\right)$ |
| | CSI part 2 | $E_{UCI} = E_{tot} - \min\left(E_{tot}, \left\lceil \left(O^{ACK} + O^{SR} + O^{CSI\text{-}part1} + L\right) / R_{UCI}^{max} / Q_m \right\rceil \cdot Q_m\right)$ |

| UCI(s) for transmission on a PUCCH | UCI for encoding | Value of $E_{UCI}$ |
|---|---|---|
| HARQ-ACK, SR | Part I: HP HARQ-ACK, HP-SR | $E_{UCI} = min(E_{tot}, \lceil (O^{H-ACK} + O^{H-SR} + L)/R_{UCI}^{max} / Q_m \rceil \cdot Q_m)$ |
| | Part II: LP HARQ-ACK, (LP-SR) | $E_{UCI} = E_{tot} - min(E_{tot}, \lceil (O^{H-ACK} + O^{H-SR} + L)/R_{UCI}^{max} / Q_m \rceil \cdot Q_m)$ |
| HARQ-ACK, SR, CSI (CSI is at HP) | Part I: HP HARQ-ACK, HP-SR, (HP CSI) | $E_{UCI} = min(E_{tot}, \lceil (O^{H-ACK} + O^{H-SR} + O^{H-CSI} + L)/R_{UCI}^{max} / Q_m \rceil \cdot Q_m)$ |
| | Part II: LP HARQ-ACK, (LP-SR) | $E_{UCI} = E_{tot} - min(E_{tot}, \lceil (O^{H-ACK} + O^{H-SR} + O^{H-CSI} + L)/R_{UCI}^{max} / Q_m \rceil \cdot Q_m)$ |
| HARQ-ACK, SR, CSI (CSI is of two parts) | Part I: HP HARQ-ACK, HP-SR, CSI part 1 | $E_{UCI} = min(E_{tot}, \lceil (O^{H-ACK} + O^{H-SR} + O^{H-CSI-part\,1} + L)/R_{UCI}^{max} / Q_m \rceil \cdot Q_m)$ |
| | Part II: LP HARQ-ACK, (LP-SR), CSI part 2 | $E_{UCI} = E_{tot} - min(E_{tot}, \lceil (O^{H-ACK} + O^{H-SR} + O^{H-CSI-part\,1} + L)/R_{UCI}^{max} / Q_m \rceil \cdot Q_m)$ |

| UCI(s) for transmission on a PUCCH | UCI for encoding | Value of $E_{UCI}$ |
|---|---|---|
| HARQ-ACK, SR, CSI (CSI is at LP, and it is of a single part) | Part I: HP HARQ-ACK, HP-SR | $E_{UCI} = min(E_{tot}, \lceil (O^{H-ACK} + O^{H-SR} + L)/R_{UCI}^{max}/Q_m \rceil \cdot Q_m)$ |
| | Part II: LP HARQ-ACK, (LP-SR), (LP-CSI) | $E_{UCI} = E_{tot} - min(E_{tot}, \lceil (O^{H-ACK} + O^{H-SR} + L)/R_{UCI}^{max}/Q_m \rceil \cdot Q_m)$ |
| HARQ-ACK, SR, CSI (Some CSI is at HP, some CSI is at LP, all CSIs are of a single part) | Part I: HP HARQ-ACK, HP-SR | $E_{UCI} = min(E_{tot}, \lceil (O^{H-ACK} + O^{H-SR} + O^{H-CSI} + L)/R_{UCI}^{max}/Q_m \rceil \cdot Q_m)$ |
| | Part II: LP HARQ-ACK, (LP-SR), (LP-CSI) | $E_{UCI} = E_{tot} - min(E_{tot}, \lceil (O^{H-ACK} + O^{H-SR} + O^{H-CSI} + L)/R_{UCI}^{max}/Q_m \rceil \cdot Q_m)$ |

| UCI(s) for transmission on a PUCCH | UCI for encoding | Value of $E_{UCI}$ |
| --- | --- | --- |
| HARQ-ACK, SR | HP HARQ-ACK, HP-SR, LP HARQ-ACK, (LP-SR) | $E_{UCI} = E_{tot}$ |
| | | |
| HARQ-ACK, SR, CSI (CSI is at HP) | HP HARQ-ACK, HP-SR, HP CSI, LP HARQ-ACK, (LP-SR) | $E_{UCI} = E_{tot}$ |
| | | |
| HARQ-ACK, SR, CSI (CSI is of two parts) | HP HARQ-ACK, HP SR, CSI part 1, LP HARQ-ACK, (LP SR) | $E_{UCI,part\ 1} = min(E_{tot}, \left\lceil (O^{H-ACK} + O^{H-SR} + O^{H-CSI-part\ 1} + O^{L-ACK} + O^{L-SR} + L)/R_{UCI}^{max}/Q_m \right\rceil \cdot Q_m)$ |
| | CSI part 2 | $E_{UCI,part\ 2} = E_{tot} - E_{UCI,part\ 1}$ |

FIG. 14

MODULARIZED DESIGN FOR INTER-PHYSICAL LAYER PRIORITY UCI MULTIPLEXING

TECHNICAL FIELD

This application relates generally to wireless communication systems, including uplink control information (UCI) multiplexing.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

FIG. 6 illustrates a table showing options for calculating a rate matching sequence length(s) (denoted $E_{UCI}$), according to some wireless communication systems.

FIG. 10 illustrates a table for a first option for UCI mapping for separate encoding of HP HARQ-ACK and LP HARQ-ACK when $$R_{UCI}^{max} = r_1,$$

according to an embodiment.

FIG. 11 illustrates a table for UCI mapping for a second option for UCI mapping for separate encoding of HP HARQ-ACK and LP HARQ-ACK when $$R_{UCI}^{max} = r_1,$$

according to an embodiment.

Figure 12:
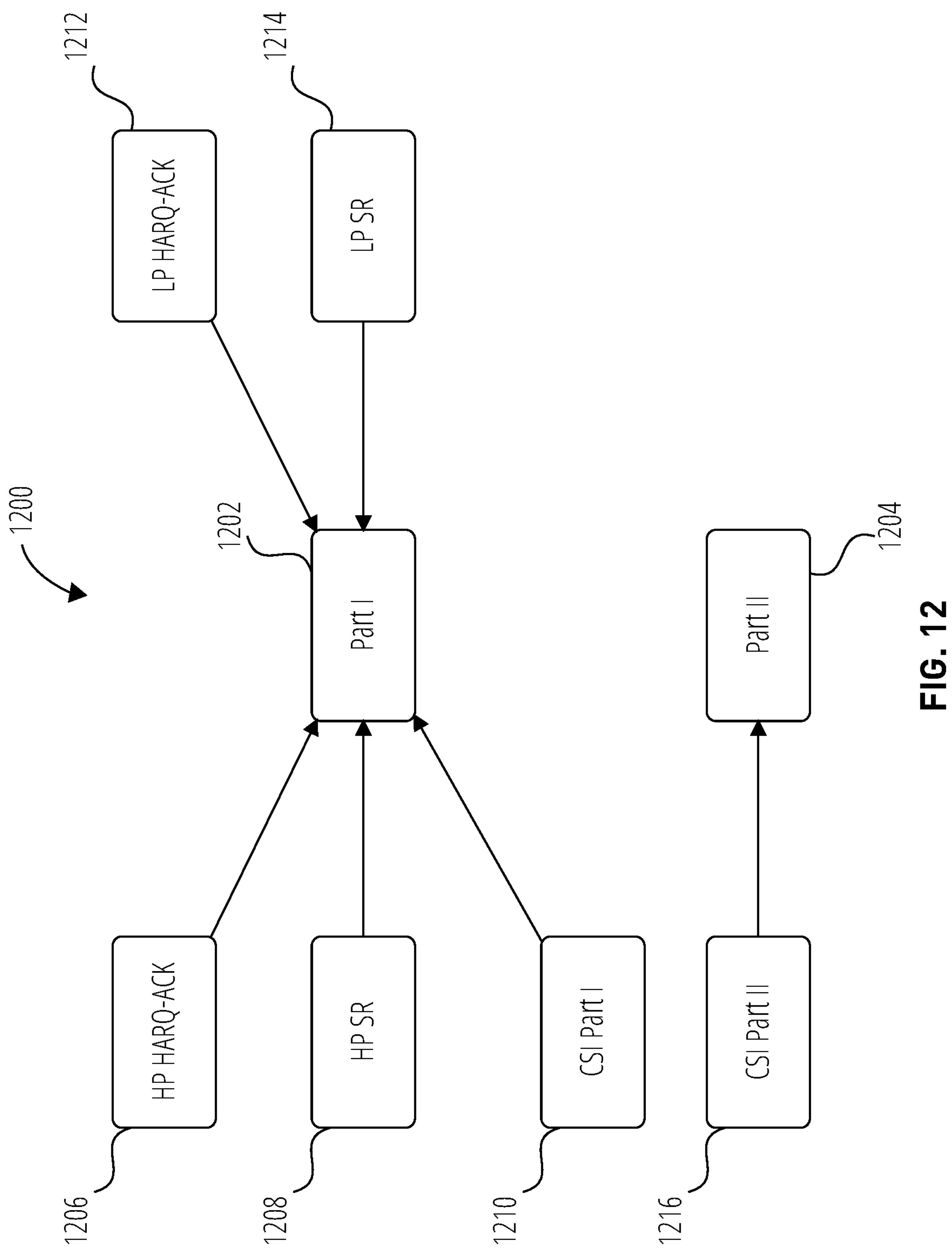

FIG. 12 illustrates an option for separate encoding of elements of UCI, according to embodiment herein.

Figure 13:
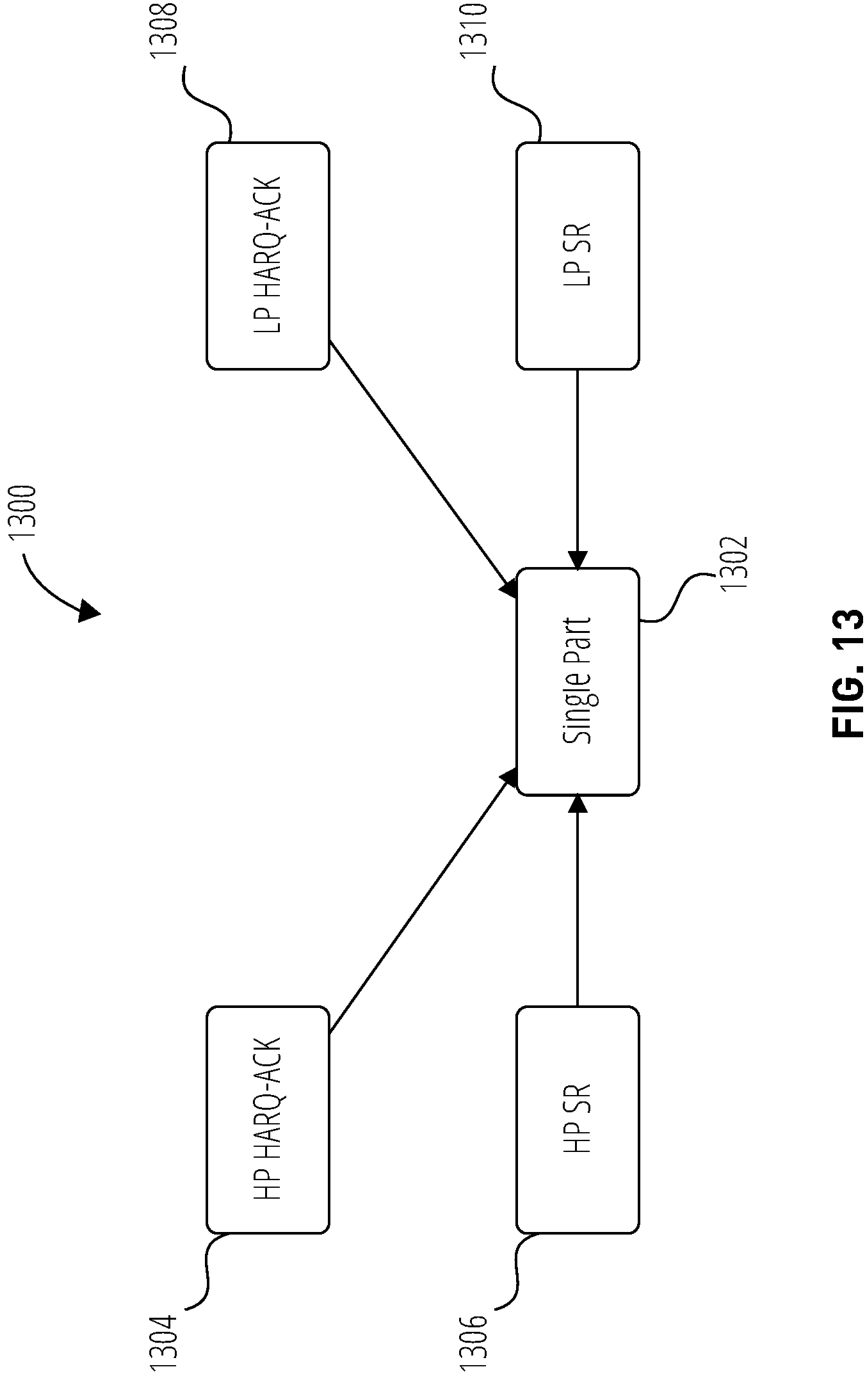

FIG. 13 illustrates an option for joint encoding of HP HARQ-ACK and SR, according to embodiments herein.

FIG. 14 illustrates a table for an option for UCI encoding when $$R_{UCI}^{max} = r_1,$$

according to an embodiment.

Figure 15:
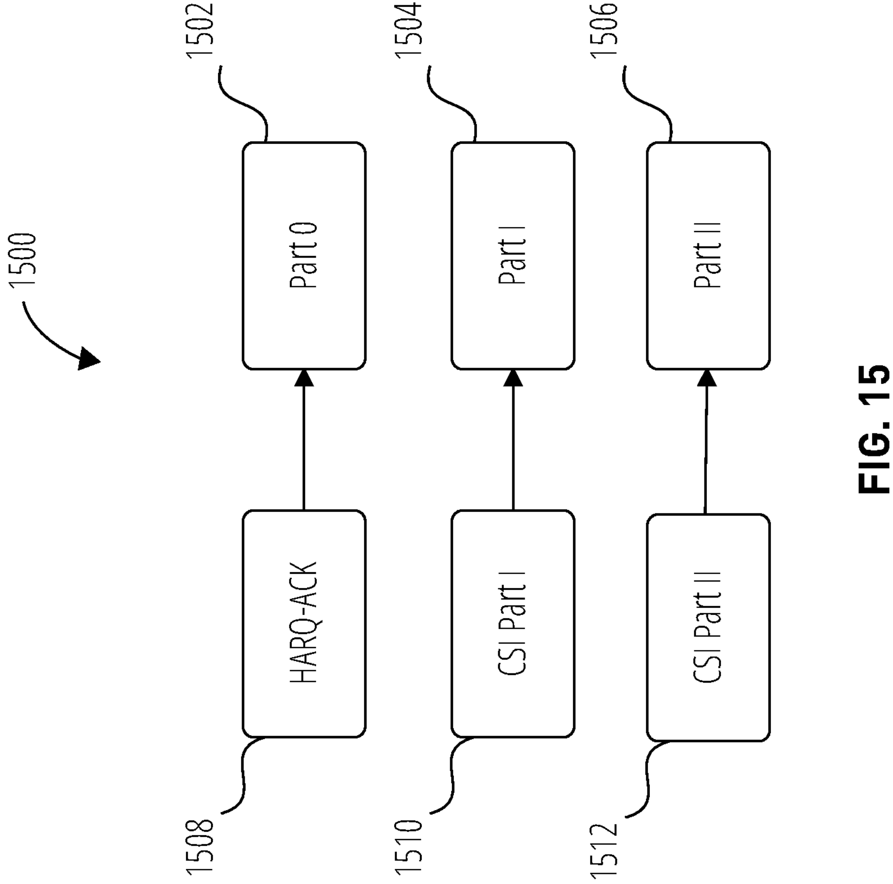

FIG. 15 illustrates an option for mapping UCIs to 3 parts in UCI multiplexing over PUSCH, according to embodiments herein.

Figure 16:
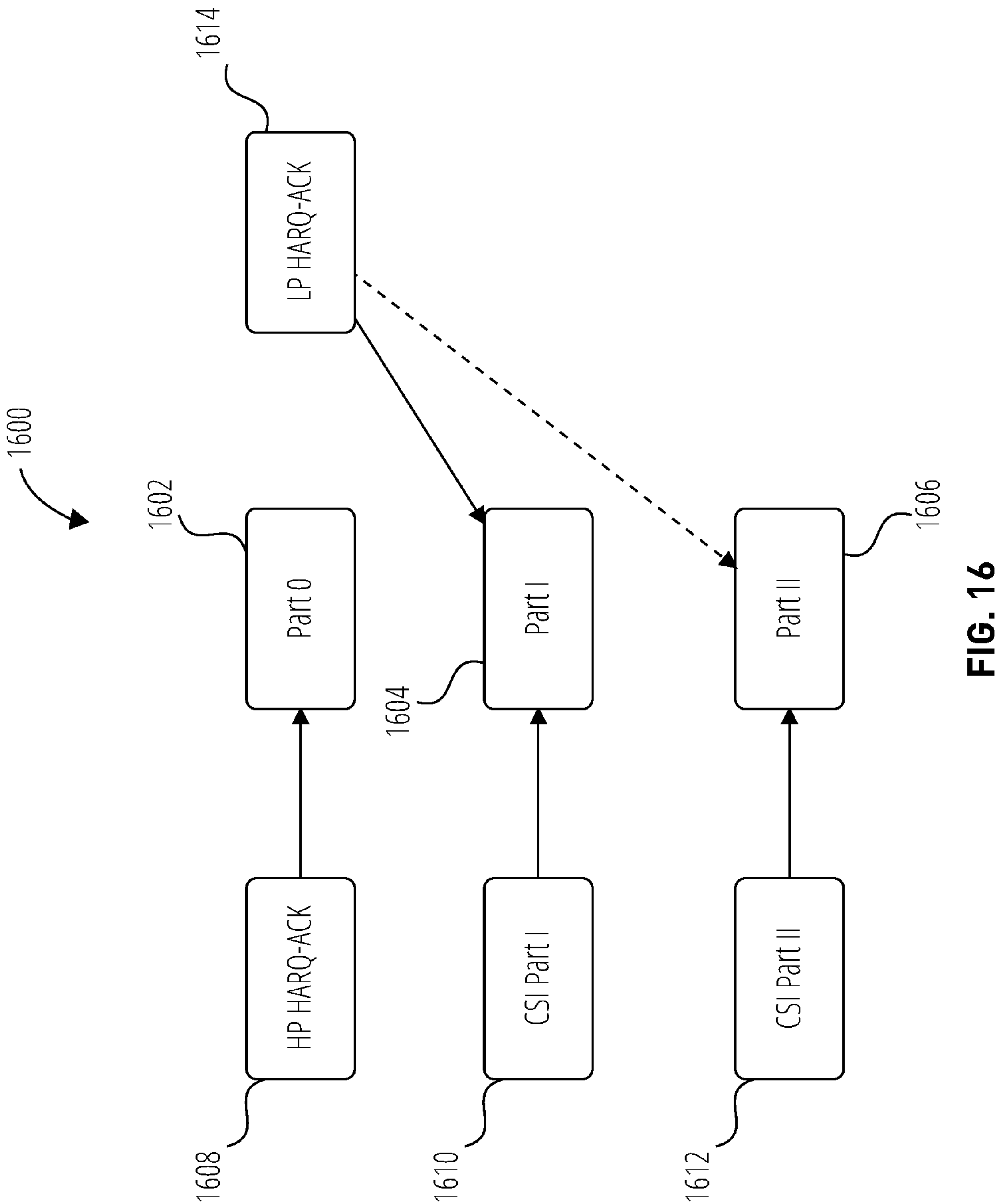

FIG. 16 illustrates an option for separate encoding of HP HARQ-ACK and LP HARQ-ACK, according to embodiments herein.

Figure 17:
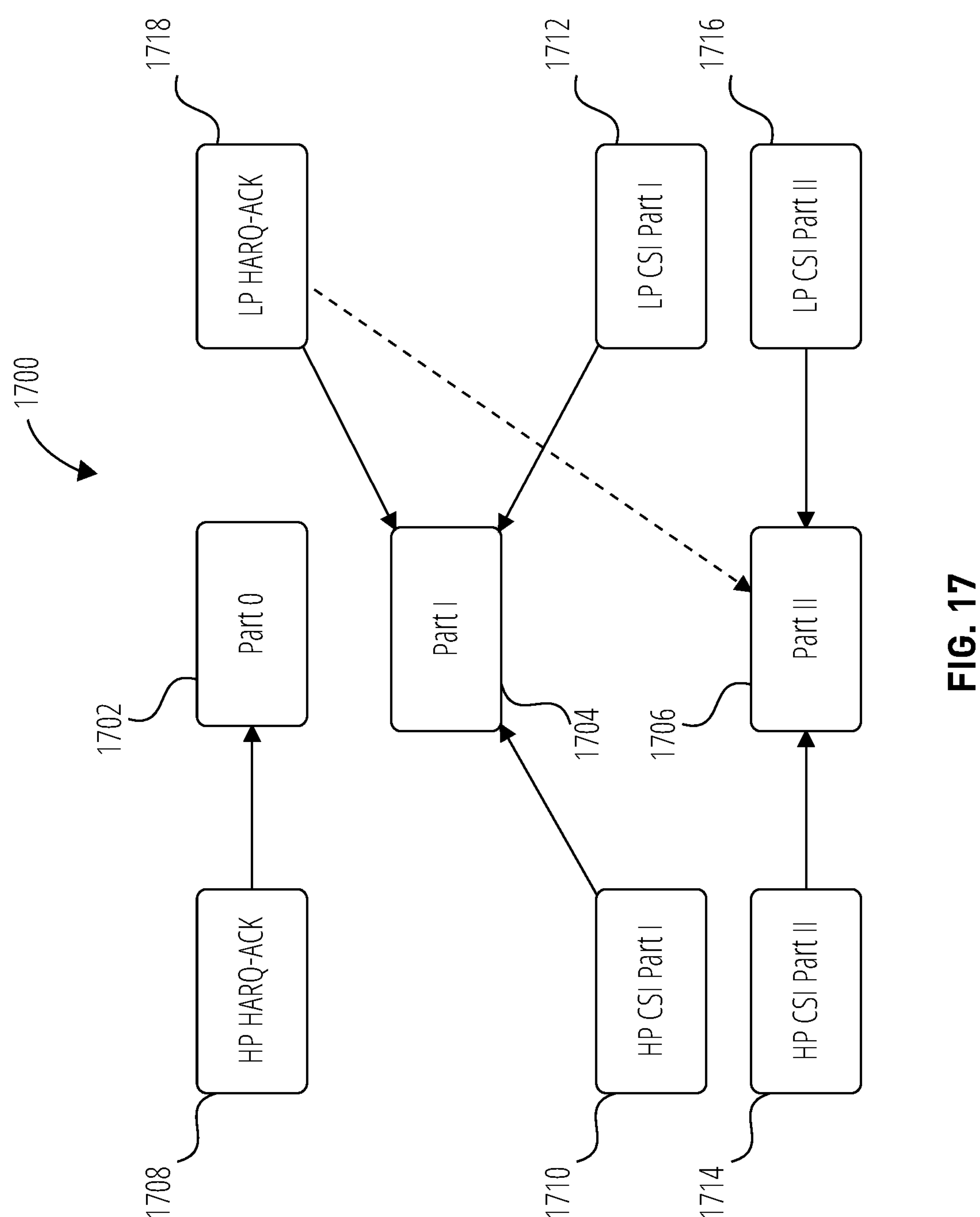

FIG. 17 illustrates an option for separate CSI treatment, according to embodiments herein.

Figure 18:
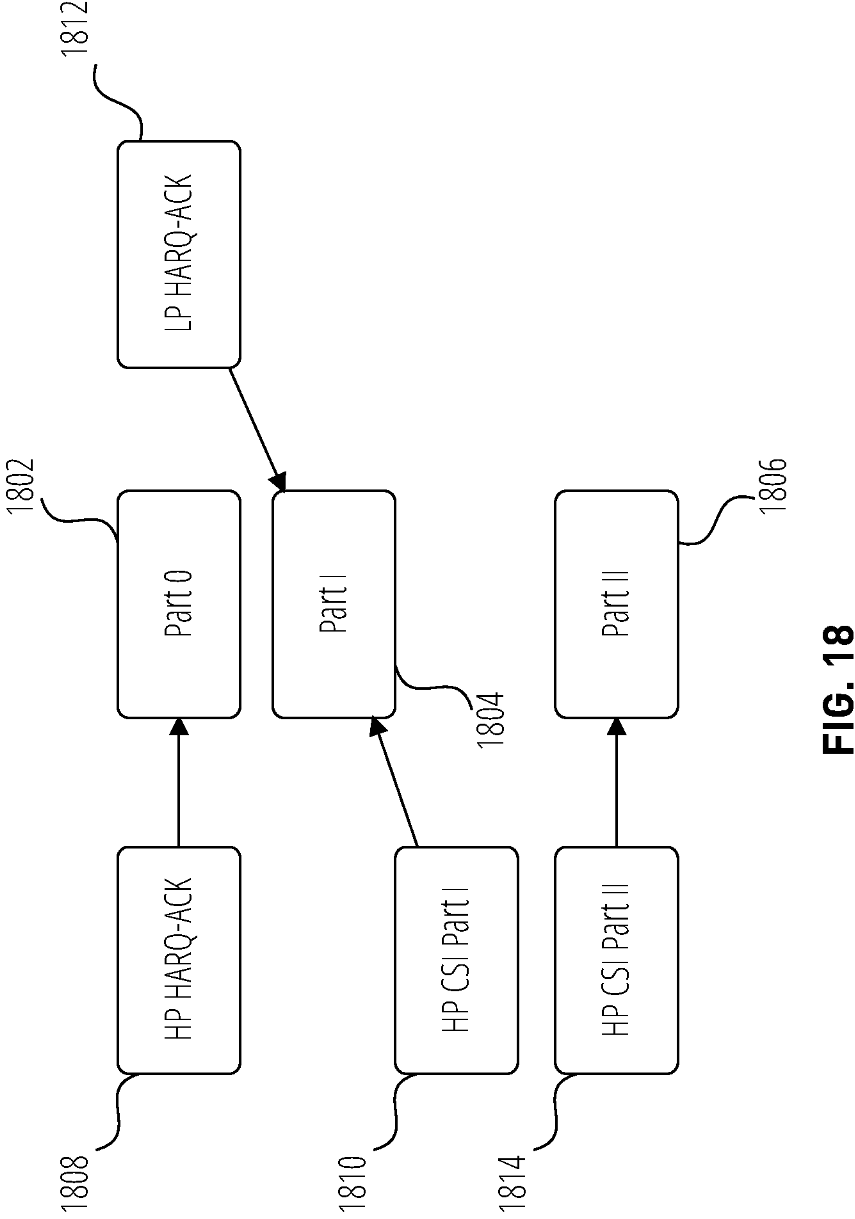

FIG. 18 illustrates an option for separate CSI treatment, according to embodiments herein.

Figures 19A, 19B:
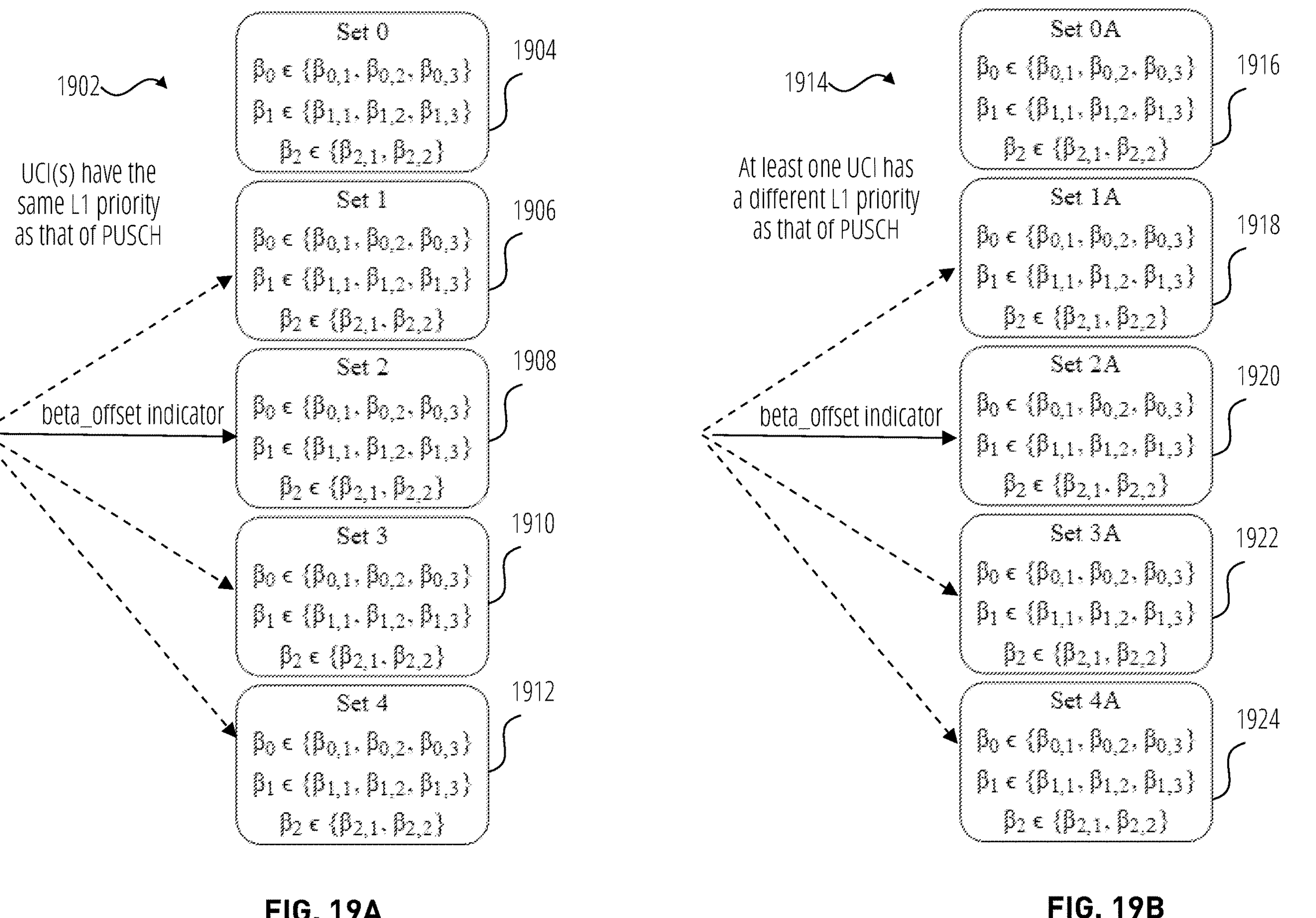

FIGS. 19A and 19B illustrate betaOffset set selection at a PUSCH with a given physical layer priority, according to embodiments discussed herein.

Figure 20:
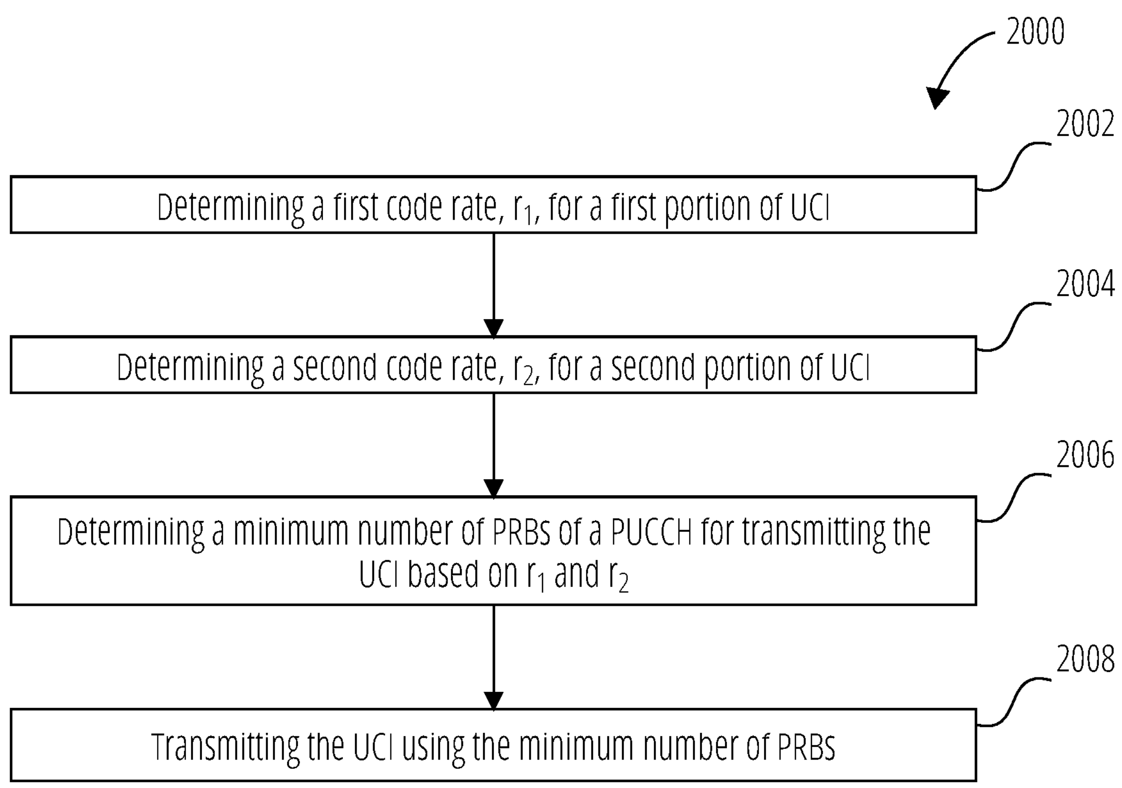

FIG. 20 illustrates a method of a user equipment, according to an embodiment.

Figure 21:
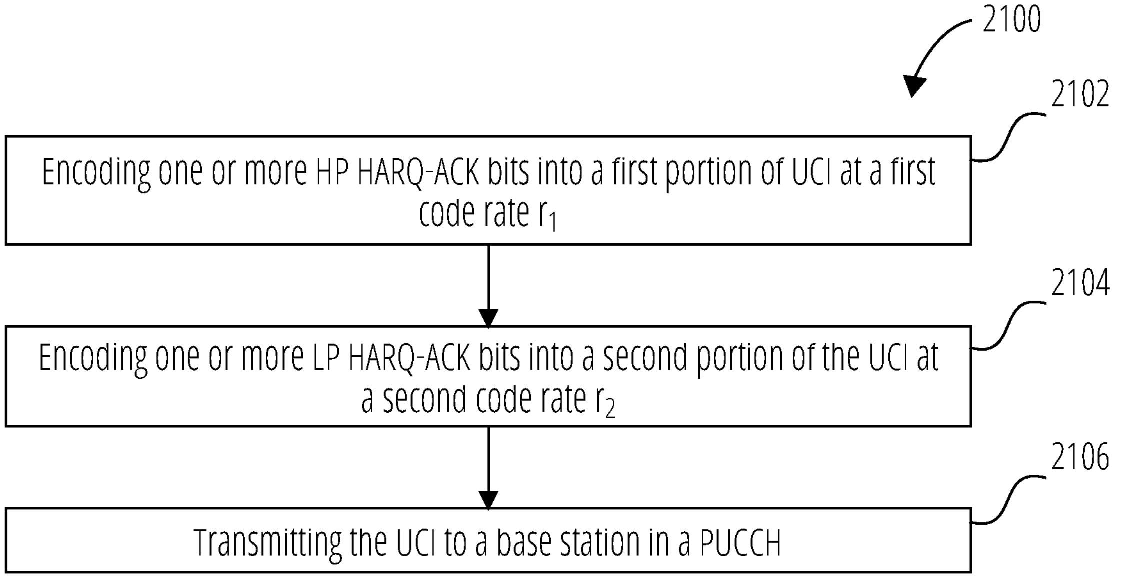

FIG. 21 illustrates a method of a user equipment, according to an embodiment.

Figure 22:
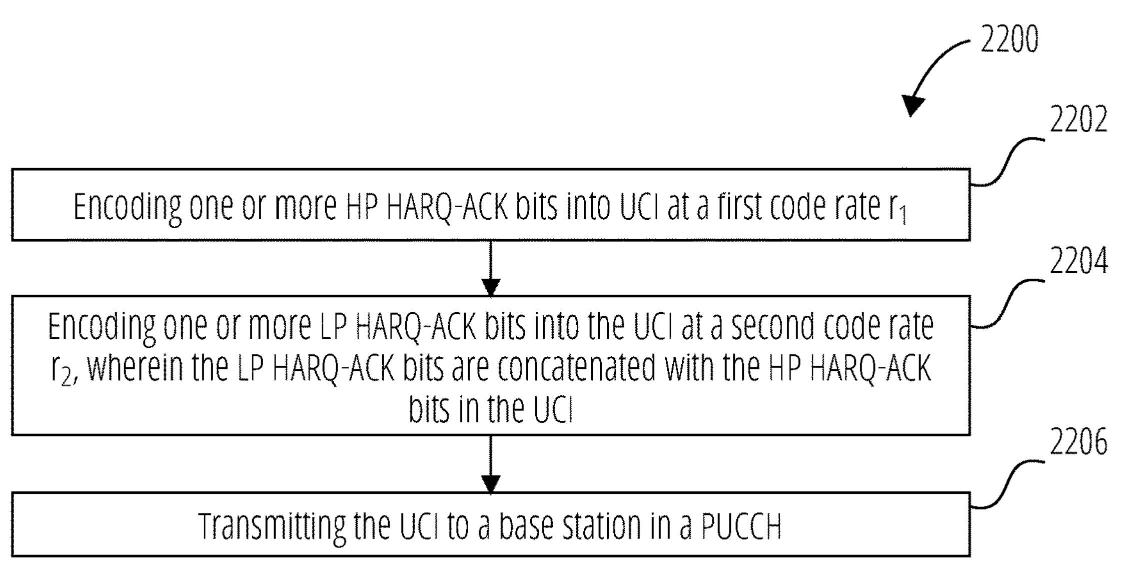

FIG. 22 illustrates a method of a user equipment, according to an embodiment.

Figure 23:
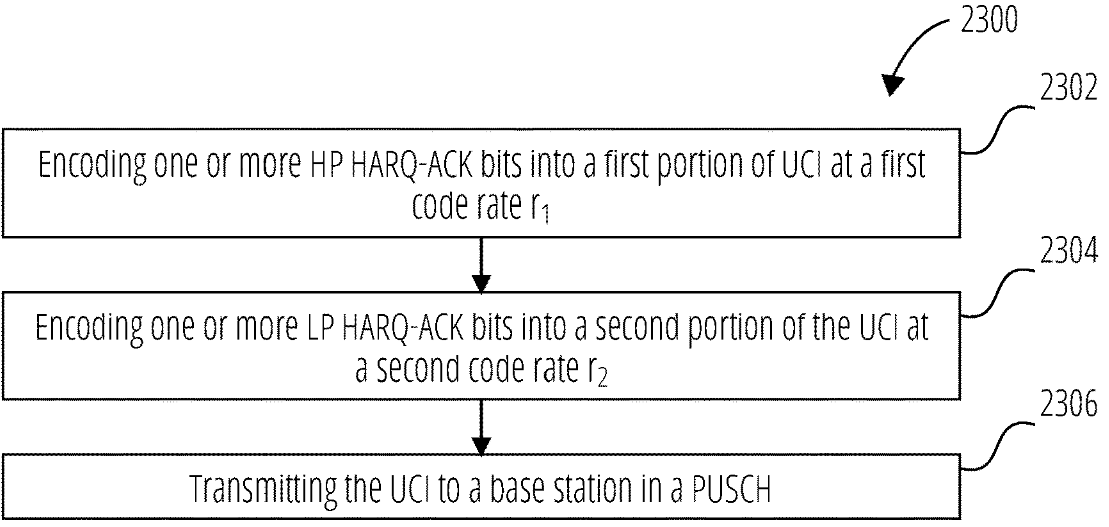

FIG. 23 illustrates a method of a user equipment, according to an embodiment.

Figure 24:
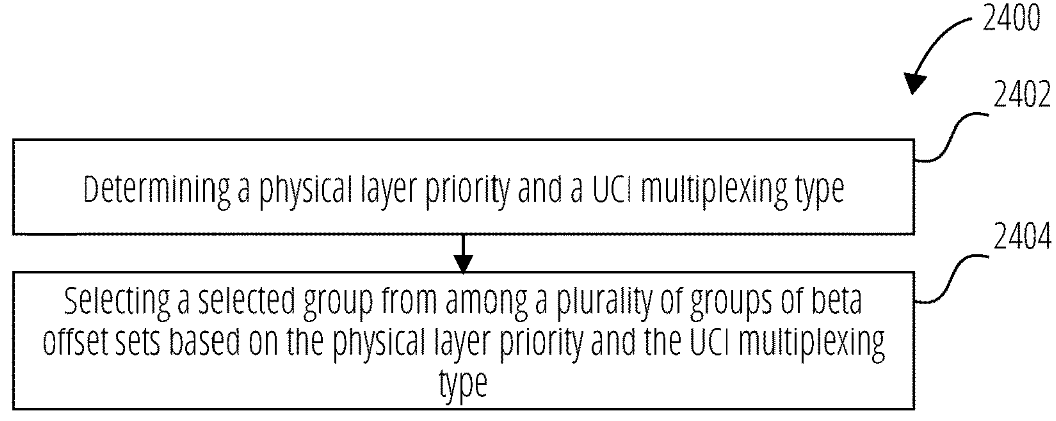

FIG. 24 illustrates a method of multiplexing UCI by a UE in a wireless communication system that includes a BS, according to an embodiment.

Figure 25:
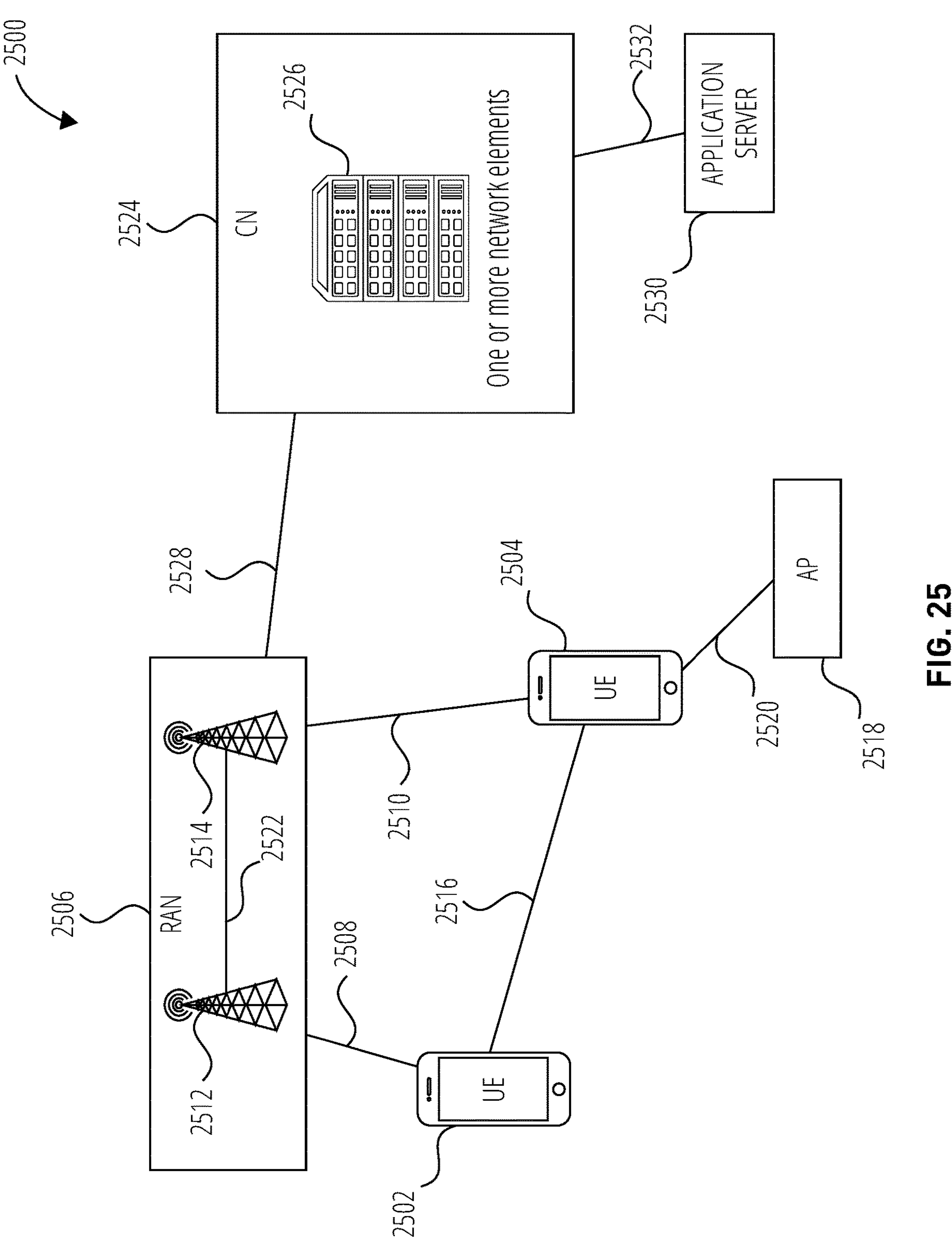

FIG. 25 illustrates an example architecture of a wireless communication system, according to embodiments disclosed herein.

Figure 26:
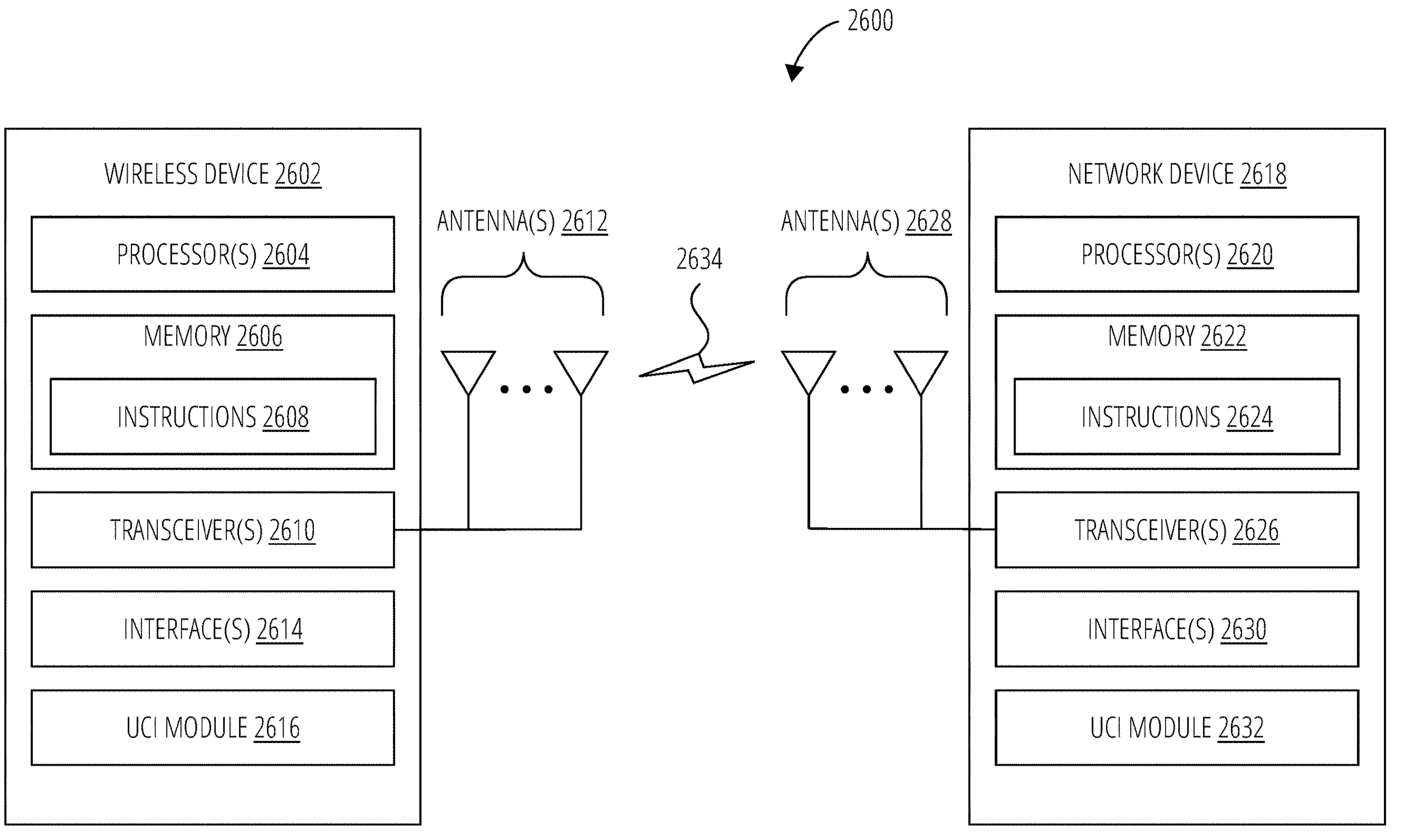

FIG. 26 illustrates a system for performing signaling between a wireless device and a network device, according to embodiments disclosed herein.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network.

Therefore, the UE as described herein is used to represent any appropriate electronic component.

1. INTRODUCTION

Uplink control information (UCI) multiplexing in 3GPP Release 15 (Rel-15) NR is oftentimes complex. In 3GPP Release 16 (Rel-16), physical layer (PHY) priority was introduced in relation to UCI multiplexing, which complicates UCI multiplexing further. In 3GPP Release 17 (Rel-17), inter-Layer 1 (inter-L1) priority UCI multiplexing may cause UCI multiplexing's complexity to increase even more.

Accordingly, in some embodiments, it may be desirable to keep one or more portions of the UCI multiplexing design of Rel-16. However, keeping close to such design aspects may implicate various considerations, as further shown herein. As such, the principles described herein include various solutions to allow for managing the complexity increase of UCI multiplexing in Rel-17.

Notably, the following items may be considered: 1. For transmission (Tx) of UCIs: a. simultaneous Tx of physical uplink control channel (PUCCH)/physical uplink shared channel (PUSCH); and b. uplink control channel (UCCH) carrier switching; 2. For UCI multiplexing: a. inter-priority multiplexing; and b. PHY cancellation of direct grants (DGs)/configured grants (CGs); 3. For hybrid automatic repeat request (HARQ) codebook construction: a. semi-persistent scheduling (SPS) HARQ deferral; b. retransmission of cancelled HARQ; c. Type 1 sub-slot HARQ codebook enhancement; and d. SPS HARQ skipping; and 4. For physical channel design of PUCCH: a. PUCCH sub-slot repetition; and b. PUCCH F0/F2 inter-sub-slot repetition.

It may be that for multiplexing a high-priority (HP) hybrid automatic repeat request acknowledgement (HARQ-ACK) (HARQ-ACK) and a low-priority (LP) HARQ-ACK into a PUCCH in some wireless communication networks, when the total number of LP and HP HARQ-ACK bits is more than 2, separate coding for the two HARQ-ACKs is supported.

In some such cases, a UE may be configured to drop channel state information (CSI) (including CSI part 1 and/or CSI part 2, if either/both of these exist) if the CSI would multiplex on a PUCCH which has HP Ack/Nack (A/N). Further, it may be that for multiplexing a HP HARQ-ACK and a LP HARQ-ACK into a PUSCH in such wireless communication networks, separate coding for the two HARQ-ACKs is supported. Embodiments for UCI multiplexing design and related design from HARQ/CSI enhancements are discussed herein.

2. PUCCH RESOURCE SELECTION

Figure 1:
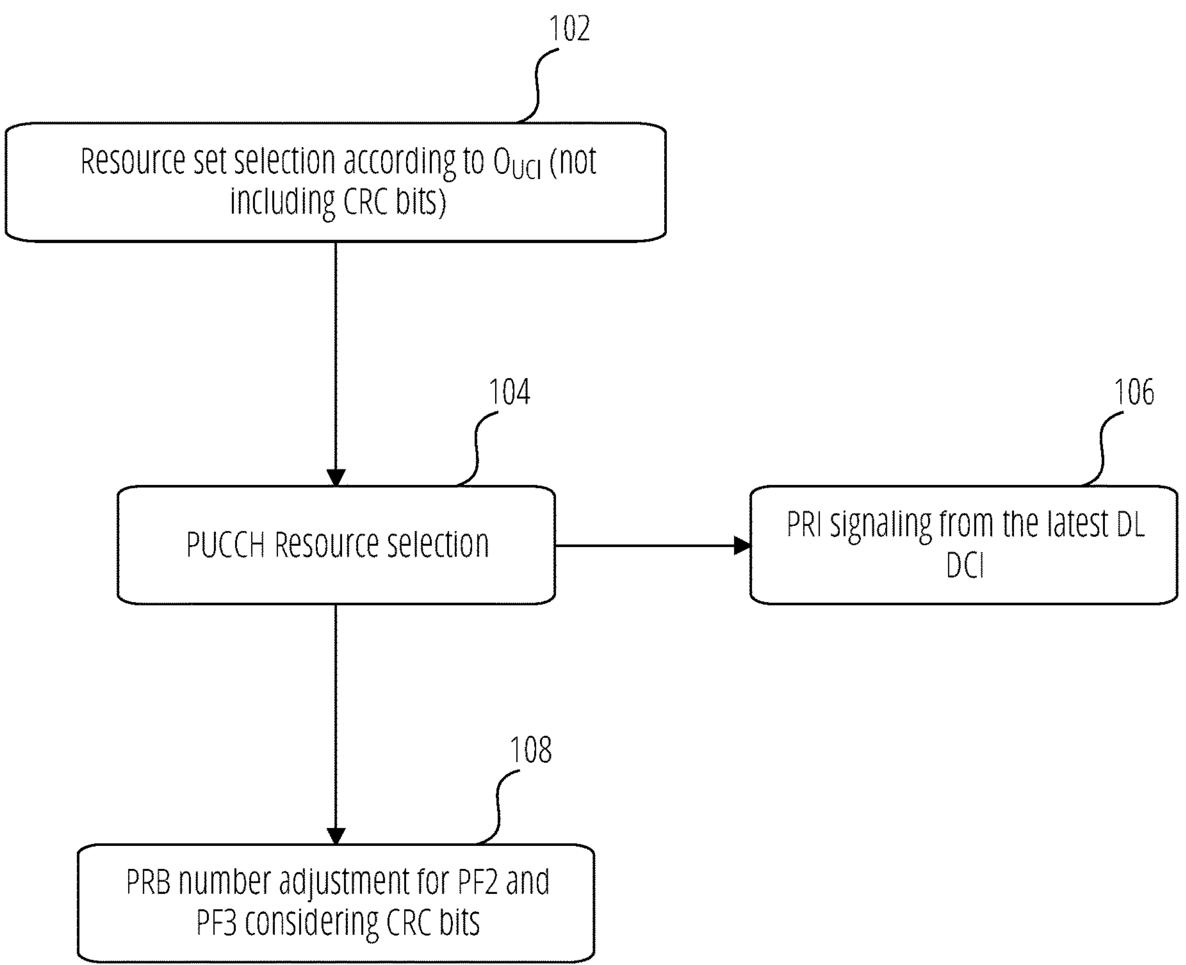
FIG. 1 illustrates PUCCH resource set selection, PUCCH resource selection, PRI, PRB number adjustment/interlace number adjustment, and CSI omission 108 according to some embodiments.

2.1 PUCCH Resource Set Selection, PUCCH Resource Selection, Physical Resource Block (PRB) Number Adjustment, and CSI Omission Rule In some wireless communications systems, multiple procedures are involved in PUCCH resource selection and PUCCH resource size determination. FIG. 1 illustrates PUCCH resource set selection 102, PUCCH resource selection 104, priority indication (PRI) 106 and PRB number adjustment/interlace number adjustment and CSI omission 108 according to some such embodiments.

As illustrated, the PUCCH resource set selection 102 occurs according to a number of UCI bits (and not including any cyclic redundancy check (CRC) bits).

The PUCCH resource selection 104 is then made from the selected resource set. As illustrated, the PUCCH resource selection 104 may be informed by the PRI 106 signaling that is received in the latest downlink (DL) downlink control information (DCI).

The PRB number adjustment/interlace number adjustment and CSI omission 108 are then performed for PUCCH format 2 (PF2) and PUCCH format 3 (PF3) considering CRC bits. In a first case involving CRC bits for HARQ over PF2/PF3, CRC is considered, and a PRB number adjustment over PF2/PF3 is performed.

In a second case involving HARQ bits and scheduling request (SR) bits over PF2/PF3/PUCCH format 4 (PF4), CRC is considered, and a PRB number adjustment over PF2/PF3 is performed.

In a third case involving HARQ bits, SR bits, and wideband (WB) or single band (SB) CSI bits over PF2; or involving HARQ bits, SR bits, and WB CSI bits over PF3/PF4; CRC for CSI part 1 is considered, a PRB number adjustment over PF2/PF3 is performed, and if the maximum PRB number is still not enough, CSI reports are omitted if necessary (note that in this case these CSI reports are found in CSI part 1 only)

In a fourth case involving HARQ-ACK bits, SR bits, and SB CSI bits over PF3/PF4, CRC for CSI part 1 and CSI part 2 are considered, a PRB number adjustment over PF3 is performed, and if the maximum PRB number is still not enough, CSI reports are omitted from CSI part 2 first, and then omitted from CSI part 1, as necessary.

The following tables illustrate various aspects examples of radio resource control (RRC) configurations relevant to discussion herein.

TABLE 1

Example of PUCCH resource set configuration

| | PUCCH resource set 0 | PUCCH resource set 1 | PUCCH resource set 2 | PUCCH resource set 3 |
|---|---|---|---|---|
| PUCCH resource set index | pucch-ResourceSetId = 0 | pucch-ResourceSetId = 1 | pucch-ResourceSetId = 2 | pucch-ResourceSetId = 3 |
| PUCCH resources in a PUCCH resource set | resourceList (0, 1, 2, . . . , 7) | resourceList (32, 33, . . . , 39) | resourceList (40, 41, . . . , 47) | resourceList (48, 49, . . . , 55) |
| maxPayloadSize | | $N_2$ = maxPayloadSize$_1$ | $N_3$ = maxPayloadSize$_2$ | |
| Applicable range | $0_{UCI} \leq 2$ | $2 < 0_{UCI} \leq N_2$ | $N_2 < 0_{UCI} \leq N_3$ | $N_3 < 0_{UCI} \leq 1706$ |

TABLE 2

Example of PUCCH resources configurations indicated by PRI = 0.

| | PUCCH resource 0 | PUCCH resource 32 | PUCCH resource 40 | PUCCH resource 48 |
|---|---|---|---|---|
| pucch-ResourceId | 0 | 32 | 40 | 48 |
| startingPRB | 10 | 0 | 2 | 6 |
| intraSlotFrequencyHopping | | enabled | enabled | enabled |
| secondHopPRB | | 80 | 50 | 76 |
| PUCCH format | PUCCH-format0: initialCyclicShift: 6; nrofSymbols: 2 startingSymbolIndex: 11 | PUCCH-format4: nrofSymbols: 4 occ-Length: n4 occ-Index: n3 startingSymbolIndex: 0 | PUCCH-format2: nrofPRBs: = 8 nrofSymbols: 2 startingSymbolIndex: 12 | PUCCH-format3: nrofPRBs: = 10 nrofSymbols: 4 startingSymbolIndex: 9 |

TABLE 3

Example of PUCCH resource configurations indicated by PRI = 1

| | PUCCH resource 1 | PUCCH resource 33 | PUCCH resource 41 | PUCCH resource 49 |
|---|---|---|---|---|
| pucch-ResourceId | 1 | 33 | 41 | 49 |
| startingPRB | 11 | 1 | 10 | 16 |
| intraSlotFrequencyHopping | | enabled | enabled | enabled |
| secondHopPRB | | 81 | 58 | 86 |
| PUCCH format | PUCCH-format0: initialCyclicShift: 6; nrofSymbols: 2 startingSymbolIndex: 11 | PUCCH-format4: nrofSymbols: 4 occ-Length: n4 occ-Index: n3 startingSymbolIndex: 0 | PUCCH-format3: nrofPRBs: = 2 nrofSymbols: 4 startingSymbolIndex: 7 | PUCCH-format3: nrofPRBs: = 8 nrofSymbols: 5 startingSymbolIndex: 8 |

TABLE 4

Example of maxCodeRate configurations at PF2/PF3/PF4 for high priority (HP) PUCCH configuration (PUCCH-Config)

| | | PUCCH-Config (for HP PUCCH) | | | |
|---|---|---|---|---|---|
| | | format1 | format2 | format3 | format4 |
| With PUCCH-FormatConfig, Each parameter can be provided for each PUCCH format separately | interslotFrequencyHopping additionalDMRS maxCodeRate nrofSlots pi2BPSK simultaneousHARQ-ACK-CSI | N/A | zeroDot08 | zeroDot25 | zeroDot15 |

TABLE 5

Example of maxCodeRate at PF2/PF3/PF4 for low priority (LP) PUCCH-Config

| | | PUCCH-Config (for LP PUCCH) | | | |
|---|---|---|---|---|---|
| | | format1 | format2 | format3 | format4 |
| With PUCCH-FormatConfig, Each parameter can be provided for each PUCCH format separately | interslotFrequencyHopping | | | | |
| | additionalDMRS | | | | |
| | maxCodeRate | N/A | zeroDot15 | zeroDot35 | zeroDot25 |
| | nrofSlots | | | | |
| | pi2BPSK | | | | |
| | simultaneousHARQ-ACK-CSI | | true | true | true |

By way of example, it can be seen that PUCCH resource 40 (as found in Table 2) and PUCCH resource 41 (as found in Table 3) are under PUCCH resource set 2. Further, it can be seen in Table 2 that the PUCCH resource 40 is of PF2, while Table 3 shows that the PUCCH resource 41 is of PF3.

Each PUCCH resource may be configured with a different maxCodeRate parameter. For example, Table 4 indicates that PUCCH resources of PF2 (such as PUCCH resource 40) correspond to a 0.08 maxCodeRate parameter, while PUCCH resources of PF3 (such as PUCCH resource 41) correspond to a 0.25 maxCodeRate parameter.

Finally, by comparing Table 4 and Table 5, it is seen also that maxCodeRate for a given PUCCH format can be configured separately for each PUCCH-Config. For example, a PUCCH resource of PF2 under a PUCCH-Config for HP PUCCH may correspond to a 0.08 maxCodeRate parameter, while that same PUCCH resource under a PUCCH-Config for a LP PUCCH may correspond to a 0.15 maxCodeRate parameter.

2.2 PUCCH Resource Set Selection Procedure

The PUCCH resource set selection procedure takes as inputs a number of UCI information bits $O_{UCI}$, a maxPayloadSize (that indicates a maximum number of UCI information bits) for a second PUCCH resource set, and a maxPayloadSize for a third PUCCH resource set (e.g., and where it may be understood that for a first PUCCH resource set, a maximum number of UCI information bits is 2).

At a given physical layer priority, with a PUCCH-Config arrangement where there is one PUCCH-Config for LP PUCCHs and another PUCCH-Config for HP PUCCHs, a UE can be configured with up to 4 PUCCH resource sets for UCI feedback including HARQ-ACK in response to a grant-based physical downlink shared channel (PDSCH) or a SPS release.

There are up to 32 PUCCH resources under the first PUCCH resource set, and up to 8 PUCCH resources under each of the configured PUCCH resource sets. The second and the third PUCCH resource sets can be configured with a "maxPayloadSize."

Discussion herein may denote a PUCCH format x as PFx (e.g., PF1 for PUCCH Format 1, PF3 for PUCCH format 3, etc.)

A process for selecting a PUCCH resource set may then be understood to include/consider that:

For PUCCH resource set selection, $O_{UCI}$ bits (not including CRC bits) is compared with 2, the maxPayloadSize for the 2nd PUCCH resource set, and/or the maxPayloadSize for the 3rd PUCCH resource set to select a PUCCH resource set. Essentially, 2, maxPayloadSize for the 2nd PUCCH resource set, maxPayloadSize for the 3rd PUCCH resource set and 1706 define 4 ranges for the number of UCI information bits $O_{UCI}$ (0 to 2, 2 to the maxPayloadSize for the 2nd PUCCH resource set, the maxPayloadSize for the 2nd PUCCH resource set to the maxPayloadSize for the 3rd PUCCH resource set, and the maxPayloadSize for the 3rd PUCCH resource set to 1706). Each range corresponds to a PUCCH resource set that is selected when $O_{UCI}$ falls within that range.

The PUCCH resource set selection procedure provides as output the selected PUCCH resource set.

2.3 PUCCH Resource Selection Procedure

The PUCCH resource selection procedure takes as input the selected PUCCH resource set and a PRI included a latest DL DCI. Then, the PRI included the DL DCI is used to select a PUCCH resource within the selected PUCCH resource set. The PUCCH resource selection procedure provides as output the selected PUCCH resource.

2.4 PRB Number Adjustment Procedure

In some wireless communication systems, it may be that PUCCH format 2 and PUCCH format 3 can have more than one PRB. In these cases, in order to use PUCCH resource in a parsimonious a way, the number of PRBs in PUCCH format 2 and PUCCH format 3 can be adjusted according to the payload size. In some such cases, any CRC bits are included in the consideration of PRB number adjustment. Further, the allowable PRB number for PUCCH format 3 is limited to a number with prime factor(s) from 2, 3 and 5 (as discrete Fourier transform spread orthogonal frequency division multiplexing (DFT-S-OFDM) is used for PUCCH format 3.

The PRB number adjustment procedure takes as inputs the configured PRB number of the selected PUCCH resource (if it is at PF2 or PF3), $O_{UCI}$, a number of CRC bits $O_{CRC}$, and the maxCodeRate according to the PUCCH format of the selected PUCCH resource.

Note that in some wireless communication systems, all PUCCH resources of the same PUCCH format (PF2/PF3/PF4) under the same PUCCH-Config have the same maxCodeRate.

It may be that $O_{UCI}$, $O_{CRC}$ consist of two parts if two part CSI is reported.

Then, the minimum number of PRBs which allows transmission of $O_{UCI}+O_{CRC}$ with no greater coding rate than the PUCCH specific maxCodeRate according to the PUCCH format of the selected PUCCH resource $$\left(\text{denoted } N_{RB,min}^{PUCCH}\right)$$

is determined. In some wireless communication systems, for PF3, $$N_{RB,min}^{PUCCH}$$

is restricted to have prime factor(s) out of 2, 3 and 5.

The BRB number adjustment procedure provides as output $$N_{RB,min}^{PUCCH}.$$

Under these conditions, various cases are possible:

Case 1: The PRB number adjustment for HARQ-ACK only over PF2/PF3 procedure according to some wireless communication systems may be as follows:

If a UE transmits a PUCCH with $O_{ACK}$ HARQ-ACK information bits and $O_{CRC}$ bits using PUCCH format 2 or PUCCH format 3 in a PUCCH resource that includes $$M_{RB}^{PUCCH}$$

PRBs the UE determines a number of PRBs $$M_{RB,min}^{PUCCH}$$

for the PUCCH transmission to be the minimum number of PRBs, that is smaller than or equal to a number of PRBs $$M_{RB}^{PUCCH}$$

provided respectively by nrofPRBs of PUCCH-format2 or nrofPRBs of PUCCH-format3 and start from the first PRB from the number of PRBs, that results to $$(O_{ACK}+O_{CRC}) \le M_{RB,min}^{PUCCH} \cdot N_{sc,ctrl}^{RB} \cdot N_{symb\text{-}UCI}^{PUCCH} \cdot Q_m \cdot r \text{ and, if } M_{RB}^{PUCCH} > 1,$$

$$(O_{ACK}+O_{CRC}) > \left(M_{RB,min}^{PUCCH}-1\right) \cdot N_{sc,ctrl}^{RB} \cdot N_{symb\text{-}UCI}^{PUCCH} \cdot Q_m \cdot r,$$

$$\text{where } N_{sc,ctrl}^{RB},\ N_{symb\text{-}UCI}^{PUCCH},\ Q_m,$$

and r are defined in the manner to be discussed herein. For PUCCH format 3, if $$M_{RB,min}^{PUCCH}$$

is not equal $2^{\alpha_2} \cdot 3^{\alpha_3} \cdot 5^{\alpha_5}$ (e.g., as may be discussed in 3GPP TS 38.211 version 16.4.0 (January 2021)), $$M_{RB,min}^{PUCCH}$$

is increased to the nearest allowed value of nrofPRBs for PUCCH-format3. If $$(O_{ACK}+O_{CRC}) > \left(M_{RB}^{PUCCH}-1\right) \cdot N_{sc,ctrl}^{RB} \cdot N_{symb-UCI}^{PUCCH} \cdot Q_m \cdot r,$$

the UE transmits the PUCCH over $$M_{RB}^{PUCCH}$$

PRBs.

In some such wireless communication systems, interlace number adjustment for PF2/PF3 with interlaced transmission may be introduced as follows:

If a UE is provided a first interlace of $$M_{Interface,0}^{PUCCH}$$

PRBs by interlace0 in InterlaceAllocation and transmits a PUCCH with $O_{ACK}$ HARQ-ACK information bits and $O_{CRC}$ bits using PUCCH format 2 or PUCCH format 3, the UE transmits the PUCCH over the first interlace if $$(O_{ACK}+O_{CRC}) \le M_{Interface,0}^{PUCCH} \cdot N_{sc,ctrl}^{RB} \cdot N_{symb-UCI}^{PUCCH} \cdot Q_m \cdot r;$$

otherwise, if the UE is provided a second interlace by interlace1 in PUCCH-format2 or PUCCH-format3, the UE transmits the PUCCH over the first and second interlaces.

Case 2: The PRB number adjustment procedure for HARQ-ACK+SR over PF2/PF3 according to some wireless communication systems may be as follows:

If a UE transmits a PUCCH with $O_{ACK}$ HARQ-ACK information bits, $O_{SR}$[log$_2$(K+1)] SR bits, and $O_{CRC}$ CRC bits using PUCCH format 2 or PUCCH format 3 in a PUCCH resource that includes $$M_{RB}^{PUCCH}$$

PRBs, the UE determines a number of PRBs $$M_{RB,min}^{PUCCH}$$

for the PUCCH transmission to be the minimum number of PRBs, that is smaller than or equal to a number of PRBs provided respectively by nrofPRBs in PUCCH-format2 or nrofPRBs in PUCCH-format3 and starts from the first PRB from the number of PRBs, that results to $$(O_{ACK}+O_{SR}+O_{CRC}) \le M_{RB,min}^{PUCCH} \cdot N_{sc,ctrl}^{RB} \cdot N_{symb-UCI}^{PUCCH} \cdot Q_m \cdot r \text{ and,}$$

$$\text{if } M_{RB}^{PUCCH} > 1,$$

$$(O_{ACK}+O_{SR}+O_{CRC}) > \left(M_{RB}^{PUCCH} > 1\right) \cdot N_{sc,ctrl}^{RB} \cdot N_{symb-UCI}^{PUCCH} \cdot Q_m \cdot r \text{, where}$$

$$N_{sc,ctrl}^{RB} \cdot N_{symb-UCI}^{PUCCH} \cdot Q_m, \text{ and } r$$

are defined in the manner to be discussed herein. For PUCCH format 3, if $$M_{RB,min}^{PUCCH}$$

is not equal $2^{\alpha_2}\cdot 3^{\alpha_3}\cdot 5^{\alpha_5}$ (e.g., as may be discussed in 3GPP TS 38.211 version 16.4.0 (January 2021), $$M_{RB,min}^{PUCCH}$$

is increased to the nearest allowed value of nrofPRBs for PUCCH-format3 [12, TS 38.331]. If $$(O_{ACK}+O_{SR}+O_{CRC})>(M_{RB}^{PUCCH}>1)\cdot N_{sc,ctrl}^{RB}\cdot N_{symb-UCI}^{PUCCH}\cdot Q_m\cdot r,$$

the UE transmits the PUCCH over the $$M_{RB}^{PUCCH}$$

PRBs.

In some such wireless communication systems, interlaced transmission of PF2/PF3 may be introduced as follows: If a UE is provided a first interlace of $$M_{Interlace,0}^{PUCCH}$$

PRBs by interlace0 in InterlaceAllocation and transmits a PUCCH with $O_{ACK}$ HARQ-ACK information bits, $O_{SR}=\lceil\log_2(K+1)\rceil$ SR bits, and $O_{CRC}$ CRC bits using PUCCH format 2 or PUCCH format 3, the UE transmits the PUCCH over the first interlace if $$(O_{ACK}+O_{SR}+O_{CRC})\leq M_{RB,min}^{PUCCH}\cdot N_{sc,ctrl}^{RB}\cdot N_{symb-UCI}^{PUCCH}\cdot Q_m\cdot r;$$

otherwise, if the UE is provided a second interlace by interlace1 in PUCCH-format2 or PUCCH-format3, the UE transmits the PUCCH over the first and second interlaces.

Case 3: A description for HARQ-ACK+SR+WB/SB CSI over PF2, or for HARQ-ACK+SR+WB CSI over PF3/PF4, as used by some wireless communication systems, follows. It is noted that the description may be considered more complex than Case 1 and Case 2. In such cases, $O_{CSI}$ and $O_{CRC}$ may consist of two parts; and r is the maxCodeRate associated with the PUCCH format of the selected PUCCH resource.

A UE is configured by maxCodeRate with a code rate for multiplexing HARQ-ACK, SR, and CSI report(s) in a PUCCH transmission using PUCCH format 2, PUCCH format 3, or PUCCH format 4.

If a UE transmits CSI reports using PUCCH format 2, it may be that the UE transmits only wideband CSI for each CSI report. Herein, a Part 1 CSI report may refer to either to a CSI report with only wideband CSI, or to a Part 1 CSI report with wideband CSI and sub-band CSI.

It may be understood that:

$O_{ACK}$ a total number of HARQ-ACK information bits, if any;

$O_{SR}$ a total number of SR bits. $O_{SR}=0$ if there is no scheduling request bit; otherwise, $O_{SR}=\lceil\log_2(K+1)\rceil$;

$$O_{CSI}=\Sigma_{n=1}^{N_{CSI}^{total}}(O_{CSI-part1,n}+O_{CSI-part2,n}),$$

where $O_{CSI-part1,n}$ is a number of Part 1 CSI report bits for CSI report with priority value n, $O_{CSI-part2,n}$ is a number of Part 2 CSI report bits, if any, for CSI report with priority value n, and $$N_{CSI}^{total}$$

is a number of CSI reports that include overlapping CSI reports; and $O_{CRC}=O_{CRC,CSI-part1}+O_{CRC,CSI-part2}$, where $O_{CRC,CSI-part1}$ is a number of CRC bits, if any, for encoding HARQ-ACK, SR and Part 1 CSI report bits, and $O_{CRC,CSI-part2}$ is a number of CRC bits, if any, for encoding Part 2 CSI report bits.

Further, r is a code rate given by maxCodeRate (which, for some NR systems may be defined according to Table 9.2.5.2-1 as found in 3GPP TS 38.213 version 16.4.0 (January 2021));

$$M_{RB}^{PUCCH}$$

is a number of PRBs for PUCCH format 2, or PUCCH format 3, or PUCCH format 4, respectively, where $$M_{RB}^{PUCCH}$$

is provided by nrofPRBs in PUCCH-format2 for PUCCH format 2 or by nrofPRBs in PUCCH-format3 for PUCCH format 3, and $$M_{RB}^{PUCCH}=1$$

for PUCCH format 4;

$$N_{sc,ctrl}^{RB}=N_{sc}^{RB}-4$$

for PUCCH format 2 or, if the PUCCH resource with PUCCH format 2 includes an orthogonal cover code with length $$N_{SF}^{PUCCH,2}$$

provided by occ-Length, $$N_{sc,ctrl}^{RB} = (N_{sc}^{RB} - 4)/N_{SF}^{PUCCH,2},\ N_{sc,ctrl}^{RB} = N_{sc}^{RB}$$

for PUCCH format 3 or, if the PUCCH resource with PUCCH format 3 includes an orthogonal cover code with length $$N_{SF}^{PUCCH,3}$$

provided by $$occ\text{-}Length,\ N_{sc,ctrl}^{RB} = N_{sc}^{RB}/N_{SF}^{PUCCH,3},\ \text{and}\ N_{sc,ctrl}^{RB} = N_{sc}^{RB}/N_{SF}^{PUCCH,4}$$

for PUCCH format 4, where $$N_{sc}^{RB}$$

is a number of subcarriers per resource block;

$$N_{symb-UCI}^{PUCCH}$$

is equal to a number of PUCCH symbols $$N_{symb}^{PUCCH,2}$$

for PUCCH format 2 provided by nrofSymbols in PUCCH-format2. For PUCCH format 3 or for PUCCH format 4, $$N_{symb-UCI}^{PUCCH}$$

is equal to a number of PUCCH symbols $$N_{symb}^{PUCCH,3}$$

for PUCCH format 3 or equal to a number of PUCCH symbols $$N_{symb}^{PUCCH,4}$$

for PUCCH format 4 provided by nrofSymbols in PUCCH-format3 or nrofSymbols in PUCCH-format4, respectively, after excluding a number of symbols used for DM-RS transmission for PUCCH format 3 or for PUCCH format 4, respectively; and $Q_m$=1 if pi/2-BPSK is the modulation scheme and $Q_m$=2 if QPSK is the modulation scheme as indicated by pi2 BPSK for PUCCH format 3 or PUCCH format 4. For PUCCH format 2, $Q_m$=2.

In some such wireless communication systems, PRB number adjustment/interlace number adjustment and CSI omission rules may be as follows:

It may be that a UE has HARQ-ACK, SR and wideband or sub-band CSI reports to transmit and the UE determines a PUCCH resource with PUCCH format 2, or the UE has HARQ-ACK, SR and wideband CSI reports to transmit and the UE determines a PUCCH resource with PUCCH format 3 or PUCCH format 4, where the UE determines the PUCCH resource using the PUCCH resource indicator field in a last of a number of DCI formats with a value of a PDSCH-to-HARQ_feedback timing indicator field, if present, or a value of dl-DataToUL-ACK, or dl-DataToUL-ACK-r16, or dl-DataToUL-ACKForDCIFormat1_2, indicating a same slot for the PUCCH transmission, from a PUCCH resource set provided to the UE for HARQ-ACK transmission, and the UE determines the PUCCH resource set as described in Clause 9.2.1 and Clause 9.2.3 for $O_{UCI}$ UCI bits.

In such a case, if $$(O_{ACK} + O_{SR} + O_{CSI-part1} + O_{CRC,CSI-part1}) \leq M_{RB}^{PUCCH} \cdot N_{sc,ctrl}^{RB} \cdot N_{symb-UCI}^{PUCCH} \cdot Q_m \cdot r,$$

the UE transmits the HARQ-ACK, SR, and CSI reports bits by selecting the minimum number $$M_{RB,min}^{PUCCH}$$

of the $$M_{RB}^{PUCCH}$$

PRBs satisfying $$(O_{ACK} + O_{SR} + O_{CSI-part1} + O_{CRC,CSI-part1}) \leq M_{RB,min}^{PUCCH} \cdot N_{sc,ctrl}^{RB} \cdot N_{symb-UCI}^{PUCCH} \cdot Q_m \cdot r;$$

Otherwise, the UE selects $$N_{CSI}^{reported}$$

CSI report(s), from the $$N_{CSI}^{total}$$

CSI reports, for transmission together with HARQ-ACK and SR in ascending priority value, where the value of $$N_{CSI}^{reported}$$

satisfies $$\left(O_{ACK}+O_{SR}+\sum_{n=1}^{N_{CSI}^{reported}} O_{CSI-part1,n}+O_{CRC,CSI-part1,N}\right) \leq M_{RB}^{PUCCH} \cdot N_{sc,ctrl}^{RB} \cdot N_{symb-UCI}^{PUCCH} \cdot Q_m \cdot r \text{ and}$$

$$\left(O_{ACK}+O_{SR}+\sum_{n=1}^{N_{CSI}^{reported}+1} O_{CSI-part1,n}+O_{CRC,CSI-part1,N}\right) > M_{RB}^{PUCCH} \cdot N_{sc,ctrl}^{RB} \cdot N_{symb-UCI}^{PUCCH} \cdot Q_m \cdot r$$

where $O_{CRC,CSI-part1,N}$ is a number of CRC bits corresponding to $$O_{ACK}+O_{SR}+\Sigma_{n=1}^{N_{CSI}^{reported}} O_{CSI-part1,n}$$

UCI bits, and $O_{CRC,CSI-part1,N+1}$ is a number of CRC bits corresponding to $$O_{ACK}+O_{SR}+\Sigma_{n=1}^{N_{CSI}^{reported}+1} O_{CSI-part1,n}$$

UCI bits.

It may be that a UE is provided a first interlace of $$M_{Interlace,0}^{PUCCH}$$

PRBs by interlace0 in InterlaceAllocation, the UE has HARQ-ACK, SR and wideband or sub-band CSI reports to transmit, and the UE determines a PUCCH resource with PUCCH format 2, or the UE has HARQ-ACK, SR and wideband CSI reports to transmit and the UE determines a PUCCH resource with PUCCH format 3, where the UE determines the PUCCH resource using the PUCCH resource indicator field in a last of a number of DCI formats with a value of a PDSCH-to-HARQ_feedback timing indicator field indicating a same slot for the PUCCH transmission, from a PUCCH resource set provided to the UE for HARQ-ACK transmission, and the UE determines the PUCCH resource set as described in Clauses 9.2.1 and 9.2.3 for $O_{UCI}$ UCI bits.

In such a case, if $$(O_{ACK}+O_{SR}+O_{CSI-part1}+O_{CRC,CSI-part1}) \leq M_{Interlace,0}^{PUCCH} \cdot N_{sc,ctrl}^{RB} \cdot N_{symb-UCI}^{PUCCH} \cdot Q_m \cdot r,$$

the UE transmits the HARQ-ACK, SR, and CSI reports bits in a PUCCH over the first interlace.

Otherwise, if the UE is provided a second interlace of $$M_{Interlace,1}^{PUCCH}$$

PRBs by interlace1 and if $$(O_{ACK}+O_{SR}+O_{CSI-part1}+O_{CRC,CSI-part1}) \leq \left(M_{Interlace,0}^{PUCCH}+M_{Interlace,1}^{PUCCH}\right) \cdot N_{sc,ctrl}^{RB} \cdot N_{symb-UCI}^{PUCCH} \cdot Q_m \cdot r,$$

the UE transmits the HARQ-ACK, SR, and CSI reports bits in a PUCCH over both the first and second interlaces.

Otherwise, the procedure is same as the corresponding one when the UE is provided PUCCH-ResourceSet by replacing $$M_{RB}^{PUCCH} \text{ with } M_{Interlace,0}^{PUCCH},$$

or, if the UE is provided interlace1, by $$M_{Interlace,0}^{PUCCH}+M_{Interlace,1}^{PUCCH}.$$

Case 4: A description for HARQ-ACK+SR+SB CSI over PF3/PF4 as used by some wireless communication systems follows. Note that $O_{CSI}$ and $O_{CRC}$ may consist of two parts, and r is the maxCodeRate associated with the PUCCH format of the selected PUCCH resource.

It may be that a UE has HARQ-ACK, SR and sub-band CSI reports to transmit and the UE determines a PUCCH resource with PUCCH format 3 or PUCCH format 4, where the UE determines the PUCCH resource using the PUCCH resource indicator field [5, TS 38.212] in a last of a number of DCI formats with a value of a PDSCH-to-HARQ_feedback timing indicator field indicating a same slot for the PUCCH transmission, from a PUCCH resource set provided to the UE for HARQ-ACK transmission, and the UE determines the PUCCH resource set as described in (e.g., as described in 3GPP TS 38.213, version 16.4.0 (January 2021), clause 9.2.1 and Clause 9.2.3) for $O_{UCI}$ UCI bits.

In such a case, if $$(O_{ACK}+O_{SR}+O_{CSI}+O_{CRC}) \leq M_{RB}^{PUCCH} \cdot N_{sc,ctrl}^{RB} \cdot Q_m \cdot r,$$

the UE transmits the HARQ-ACK, SR and the $$N_{CSI}^{total}$$

CSI report bits by selecting the minimum number $M_{RB,min}^{PUCCH}$ of $PRBs$ from the $M_{RB}^{PUCCH} PRBs$ satisfying $$(O_{ACK}+O_{SR}+O_{CSI}+O_{CRC}) \leq M_{RB,min}^{PUCCH} \cdot N_{sc,ctrl}^{RB} \cdot N_{symb-UCI}^{PUCCH} \cdot Q_m \cdot r$$

as described in Clauses 9.2.3 and 9.2.5.1.

Otherwise, if for $$N_{CSI-part2}^{reported} > 0$$

Part 2 CSI report priority value(s), it is $$\sum_{n=1}^{N_{CSI-part2}^{reported}} O_{CSI-part2,n} + O_{CRC,CSI-part2,N} \leq \left(M_{RB}^{PUCCH} \cdot N_{sc,ctrl}^{RB} \cdot N_{symb-UCI}^{PUCCH} - \left\lceil \left(O_{ACK} + O_{SR} + \sum_{n=1}^{N_{CSI}^{total}} O_{CSI-part1,n} + O_{CRC,CSI-part1}\right) / (Q_m \cdot r) \right\rceil \right) \cdot Q_m \cdot r, \text{ and}$$

$$\sum_{n=1}^{N_{CSI-part2}^{reported}+1} O_{CSI-part2,n} + O_{CRC,CSI-part2,N+1} > \left(M_{RB}^{PUCCH} \cdot N_{sc,ctrl}^{RB} \cdot N_{symb-UCI}^{PUCCH} - \left\lceil \left(O_{ACK} + O_{SR} + \sum_{n=1}^{N_{CSI}^{total}} O_{CSI-part1,n} + O_{CRC,CSI-part1} / (Q_m \cdot r)\right) \right\rceil \right) \cdot Q_m \cdot r,$$

the UE selects the first $$N_{CSI-part2}^{reported}$$

Part 2 CSI reports, according to respective priority value(s), for transmission together with the HARQ-ACK, SR and $$N_{CSI}^{total}$$

Part 1 CSI reports, where $O_{CSI\text{-}part1,n}$ is the number of Part 1 CSI report bits for the $n_{th}$ CSI report and $O_{CSI\text{-}part2,n}$ is the number of Part 2 CSI report bits for the $n_{th}$ CSI report priority value, $O_{CRC,CSI\text{-}part2,N}$ is a number of CRC bits corresponding to $$\sum_{n=1}^{N_{CSI-part2}^{reported}} O_{CSI-part2,n}, \text{ and } O_{CRC,CSI-part2,N+1}$$

is a number of CRC bits corresponding to $$\sum_{n=1}^{N_{CSI-part2}^{reported}+1} O_{CSI-part2,n}.$$

Otherwise, the UE drops all Part 2 CSI reports and selects $$N_{CSI-part1}^{reported}$$

Part 1 CSI report(s), from the $$N_{CSI}^{total}$$

CSI reports in ascending priority value, for transmission together with the HARQ-ACK and SR information bits where the value of $$N_{CSI-part1}^{reported}$$

satisfies $$\left(O_{ACK} + O_{SR} + \sum_{n=1}^{N_{CSI-part1}^{reported}} O_{CSI-part1,n} + O_{CRC,CSI-part1,N}\right) \leq M_{RB}^{PUCCH} \cdot N_{sc,ctrl}^{RB} \cdot N_{symb-UCI}^{PUCCH} \cdot Q_m \cdot r, \text{ and}$$

$$\left(O_{ACK} + O_{SR} + \sum_{n=1}^{N_{CSI-part1}^{reported}+1} O_{CSI-part1,n} + O_{CRC,CSI-part1,N+1}\right) > M_{RB}^{PUCCH} \cdot N_{sc,ctrl}^{RB} \cdot N_{symb-UCI}^{PUCCH} \cdot Q_m \cdot r,$$

where $O_{CRC,CSI\text{-}part1,N}$ is a number of CRC bits corresponding to $$O_{ACK} + O_{SR} + \sum_{n=1}^{N_{CSI-part1}^{reported}} O_{CSI-part1,n}$$

UCI bits, and $O_{CRC,CSI\text{-}part1,N+1}$ is a number of CRC bits corresponding to $$O_{ACK} + O_{SR} + \sum_{n=1}^{N_{CSI-part1}^{reported}+1} O_{CSI-part1,n}$$

UCI bits.

An interlace number adjustment and CSI omission for some wireless communication systems are captured below:

It may be that a UE is provided a first interlace of $$M_{Interlace,0}^{PUCCH}$$

PRBs by interlace0 in InterlaceAllocation, the UE has HARQ-ACK, SR and sub-band CSI reports to transmit, and the UE determines a PUCCH resource with PUCCH format 3, where the UE determines the PUCCH resource using the PUCCH resource indicator field in a last of a number of DCI formats that have a value of a PDSCH-to-HARQ_feedback timing indicator field indicating a same slot for the PUCCH transmission, from a PUCCH resource set provided to the UE for HARQ-ACK transmission, and that the UE determines the PUCCH resource set for $O_{UCI}$ UCI bits.

In such a case, if $$(O_{ACK} + O_{SR} + O_{CSI} + O_{CRC}) \leq M_{Interlace,0}^{PUCCH} \cdot N_{sc,ctrl}^{RB} \cdot N_{symb-UCI}^{PUCCH} \cdot Q_m \cdot r,$$

the UE transmits the HARQ-ACK, SR and the $$N_{CSI}^{total}$$

CSI report bits in a PUCCH over the first interlace.

Otherwise, if the UE is provided a second interlace of $$M_{Interlace,1}^{PUCCH}$$

PRBs by interlace1 and if $$(O_{ACK}+O_{SR}+O_{CSI}+O_{CRC})\leq (M_{Interlace,0}^{PUCCH}+M_{Interlace,1}^{PUCCH})\cdot N_{sc,ctrl}^{RB}\cdot N_{symb\text{-}UCI}^{PUCCH}\cdot Q_m\cdot r,$$

the UE transmits the HARQ-ACK, SR, and CSI reports bits in a PUCCH over both the first and second interlaces.

Otherwise, the procedure is same as the corresponding one when the UE is provided PUCCH-ResourceSet by replacing $$M_{RB}^{PUCCH} \text{ with } M_{Interlace,0}^{PUCCH},$$

or, if the UE is provided interlace1, with $$M_{Interlace,0}^{PUCCH}+M_{Interlace,1}^{PUCCH}.$$

2.5 CSI Omission Procedure

It may be that a CSI omission procedure is applied based on various conditions/cases, examples of which follow.

In a first case ("Omission Case 1"), if the CSI consists of WB CSI or CSI part 1 only, CSI omission is performed for CSI part 1 for a PUCCH resource of PF2/PF3/PF4. A priority value formula may be used to assign priority values to the CSI reports, and the CSI omission may be performed according to these priority values. An example of a priority value formula for this case in an NR context may be found in clause 5.2.5 of 3GPP TS 38.214, version 16.5.0 (March 2021).

In a second case ("Omission Case 2"), if the CSI consists of two parts (e.g., CSI part 1 and CSI part 2), then CSI omission is performed for CSI part 1 and CSI part 2 for a PUCCH resource for PF3/PF4. A priority value formula may be used to assign priority values to the CSI reports, and the CSI omission may be performed according to these priority values. An example of a priority value formula for this case in an NR context may be found in clause 5.2.5 in 3GPP TS 38.214, version 16.5.0 (March 2021). Further, priority levels for the CSI part 2 may be determined using priority value mechanisms particular for CSI part 2. An example of a priority value mechanism for this case in an NR context may be found in clause 5.2.3 of 3GPP TS 38.214, version 16.5.0 (March 2021) (see, e.g., Table 5.2.3-1 "Priority reporting levels for Part 2 CSI").

The CSI omission procedure takes as input the selected PUCCH resource (if it is at PF2 or PF3, PF4), $O_{UCI}$, $O_{CRC}$, and the maxCodeRate according to the PUCCH format of the selected PUCCH resource.

Then, for Omission Case 1: CSI part 1 of CSI report(s) are discarded until the remaining payload and its corresponding CRC bits can be transmitted with no greater a coding rate than the PUCCH format specific maxCodeRate, according to the PUCCH format of the selected PUCCH resource.

For Omission Case 2: CSI part 2 of CSI report(s) are discarded, and, if necessary, CSI part 1 of CSI report(s) are also discarded, until the remaining payload and its corresponding CRC bits can be transmitted with no greater a coding rate than the PUCCH format specific maxCodeRate, according to the PUCCH format of the selected PUCCH resource.

For Omission Case 1, the CSI omission procedure provides as output $$N_{CSI}^{reported}$$

(the number of CSI reports surviving CSI omission).

For Omission case 2, the CSI omission procedure provides as output $$N_{CSI-part2}^{reported}$$

(the number of CSI reports with un-omitted CSI part 2) or $$N_{CSI\text{-}part1}^{reported}$$

(the number of CSI reports with un-omitted CSI part 1 when CSI part 2 of all CSI reports are omitted.

In some wireless communication systems, for omission of CSI part 2 of CSI reports, the following two conditions may be used:

$$\sum_{n=1}^{N_{CSI-part2}^{reported}} O_{CSI-part2,n}+O_{CRC,CSI-part2,N}\leq \left(M_{RB}^{PUCCH}\cdot N_{sc,ctrl}^{RB}\cdot N_{symb-UCI}^{PUCCH}-\left\lceil\left(O_{ACK}+O_{SR}+\sum_{n=1}^{N_{CSI}^{total}} O_{CSI-part1,n}+O_{CRC,CSI-part1}\right)/(Q_m\cdot r)\right\rceil\right)\cdot Q_m\cdot r \text{ and,}$$

$$\sum_{n=1}^{N_{CSI-part2}^{reported}+1} O_{CSI-part2,n}+O_{CRC,CSI-part2,N+1}> \left(M_{RB}^{PUCCH}\cdot N_{sc,ctrl}^{RB}\cdot N_{symb-UCI}^{PUCCH}-\left\lceil\left(O_{ACK}+O_{SR}+\sum_{n=1}^{N_{CSI}^{total}} O_{CSI-part1,n}+O_{CRC,CSI-part1}\right)/(Q_m\cdot r)\right\rceil\right)\cdot Q_m\cdot r.$$

For example, see 3GPP TS 38.213 version 16.4.0 (January 2021) section 9.2.5.2.

Those two conditions can be reformulated as $$\left(\sum_{n=1}^{N_{CSI-part2}^{reported}} O_{CSI-part2,n}+O_{CRC,CSI-part2,N}\right)/(Q_m\cdot r)+\left\lceil\left(O_{ACK}+O_{SR}+\sum_{n=1}^{N_{CSI}^{total}} O_{CSI-part1,n}+O_{CRC,CSI-part1}\right)/(Q_m\cdot r)\right\rceil\leq M_{RB}^{PUCCH}\cdot N_{sc,ctrl}^{RB}\cdot N_{symb-UCI}^{PUCCH}, \text{ and}$$

$$\left(\sum_{n=1}^{N_{CSI-part2}^{reported}+1} O_{CSI-part2,n}+O_{CRC,CSI-part2,N+1}\right)/(Q_m\cdot r)+\left\lceil\left(O_{ACK}+O_{SR}+\sum_{n=1}^{N_{CSI}^{total}} O_{CSI-part1,n}+O_{CRC,CSI-part1}\right)/(Q_m\cdot r)\right\rceil> M_{RB}^{PUCCH}\cdot N_{sc,ctrl}^{RB}\cdot N_{symb-UCI}^{PUCCH}.$$

From the reformulated conditions, it can be seen roughly the same coding rate is required for CSI part 1 and CSI part 2.

In sum, in some such embodiments, it may be understood that for CSI omission, a selected PUCCH resource (if it is at PF2 or PF3, PF4), $O_{UCI}$, $O_{CRC}$, and a maxCodeRate according to the PUCCH format of the selected PUCCH resource are used as inputs, and the same coding rate is used for two CSI parts (CSI part 1 and CSI part 2) when generating the output.

3. PUCCH RESOURCE SET SELECTION

Mapping rules for CSI Part I and CSI part II over PUCCH may be used in some wireless communication networks. For example, see 3GPP TS 38.212 version 16.4.0 (January 2021).

To facilitate discussion herein, the resources taken by CSI Part I and CSI part II (as in prior wireless communication systems) may instead be denoted as UCI Part I and UCI part II respectively. Mapping rules discussed herein are accordingly discussed in terms of UCI part I and UCI Part II.

In one or more of the previously discussed embodiments, it can be seen that the coding rate of UCI payload plus CRC bits is not a factor considered in PUCCH resource set selection, and that all PUCCH resources of the same PUCCH format (PF2 or PF3 or PF4) under the same PUCCH-Config have the same maxCodeRate.

One motivation for supporting separate encoding is to provide differentiated protection to HP HARQ-ACK information bits and LP HARQ-ACK information bits. When providing such differentiated protection, it may be that $q_1$ HP HARQ-ACK information bits plus $q_2$ LP HARQ-ACK information bits can require very different PUCCH resource in terms of number of coded bits compared to the case with $q_2$ HP HARQ-ACK information bits plus $q_1$ LP HARQ-ACK information bits. In such a case, it may be beneficial to use both the coding rate for the HP HARQ-ACK information bits and the coding rate for the LP HARQ-ACK information bits in a corresponding PUCCH resource set selection procedure.

In a first alternative for such a PUCCH resource set selection procedure, the following formula can be considered:

$$O_{combined} = O_{UCI-part1} + O_{UCI-part2} \cdot r_1 / r_2,$$

where $r_1$ is the maximum coding rate for UCI part I, and $r_2$ is the maximum coding rate for UCI part II.

Further, in some wireless communication systems, it may be that the maxPayloadSize under PUCCH-ResourceSet corresponds to one of the configured coding rates (e.g., $r_1$ in an NR case).

In a second alternative for such a PUCCH resource set selection procedure, it is also possible to treat the configuration PUCCH resources/PUCCH resource sets according to a reference coding rate (denoted $r_{ref}$), and then (depending on some condition(s)), $r_1$ and $r_2$ are subsequently determined. In such circumstances, $r_1$ and $r_2$ may be different values (e.g. depending on a UCI combination, a PUCCH format, a number of PRBs in the PUCCH resource, a PUCCH resource set, etc.). Further, it may be assumed that the required numbers of coded bits does not exceed the number of coded bits available at the PUCCH according to the formula:

$$O_{UCI-part1} \frac{1}{r_1} + O_{UCI-part2} \cdot \frac{1}{r_2} \leq M_{ref} \frac{1}{r_{ref}}$$

where $M_{ref}$ is a maximum number of UCI bits supported over PUCCH resource set j (e.g., $M_{ref}$ is one of 2, $N_2$=maxPayloadSize$_1$ (a maxPayloadSize for a 2nd PUCCH resource set, as discussed herein), $N_3$=maxPayloadSize$_2$ (a maxPayloadSize for a 3rd PUCCH resource set, as discussed herein), or 1706, as the case may be). Alternatively, $M_{ref}$ can be configured for all or some PUCCH resource set(s).

In such cases, it may be that the formula:

$$O_{combined} = O_{UCI-part1} \frac{r_{ref}}{r_1} + O_{UCI-part2} \cdot \frac{r_{ref}}{r_2}$$

is used to look up a PUCCH resource set.

In one embodiment, the reference coding rate is configured for all or some PUCCH resource set(s).

In another embodiment, the reference coding rate $r_{ref}$ is an order statistics-selected one of the maxCodeRates for PUCCH resources under a PUCCH resource set or PUCCH formats for PUCCH resources under a PUCCH resource set. For example, the reference coding rate may be the minimum/maximum/second smallest/second largest, etc. of all the maxCodeRates for PUCCH resources under a PUCCH resource set or PUCCH formats for PUCCH resources under a PUCCH resource set.

Then a generic formulation can be given as $$O_{combined} = O_{UCI-part1} / \tilde{r}_1 + O_{UCI-part2} / \tilde{r}_2,$$

$$\text{where } \tilde{r}_1 = r_1 / r_{ref},\ \tilde{r}_2 = r_2 / r_{ref}.$$

For both alternatives, $O_{combined}$ is checked with the range [1,2], [3, $N_2$], ($N_2$, $N_3$], ($N_3$, 1706] for PUCCH resource set selection.

3.1 Determination of $r_1$ and $r_2$

Multiple options for determining $r_1$ and $r_2$ are contemplated.

In a first option, $r_1$ and $r_2$ can be configured for UCI Part 1 and UCI part 2 under the high priority PUCCH-Config.

In a second option, $r_1$ and $r_2$ can be configured for UCI Part 1 and UCI part 2 for a PUCCH resource set under the high priority PUCCH-Config, where different PUCCH resource sets may have different pairs of $r_1$ and $r_2$.

In a third option, $r_1$ and $r_2$ can be configured for UCI Part 1 and UCI part 2 for a PUCCH format under the high priority PUCCH-Config.

In a fourth option, $r_1$ and $r_2$ can be configured for UCI Part 1 and UCI part 2 for a PUCCH resource under the high priority PUCCH-Config.

In a fifth option, $r_1$ is an order statistics-selected one of the maxCodeRates for PUCCH resources under a PUCCH resource set or for PUCCH formats for PUCCH resources under a PUCCH resource set under the high priority PUCCH-Config (e.g., the second PUCCH-Config), and $r_2$ is an order statistics-selected one of the maxCodeRates for PUCCH resources under a PUCCH resource set or for PUCCH formats for PUCCH resources under a PUCCH resource set under the low priority PUCCH-Config (e.g., the first PUCCH-Config).

For example, it may be that $r_1$ is a minimum among the maxCodeRate for PUCCH resources under a PUCCH resource set or for PUCCH formats for PUCCH resources under a PUCCH resource set under the high priority PUCCH-Config and $r_2$ is a minimum among the maxCodeRate for PUCCH resources under a PUCCH resource set or for PUCCH formats for PUCCH resources under a PUCCH resource set under the low priority PUCCH-Config. Note that in such cases, if a lookup procedure determines that $r_2>r_1$, then $r_2$ may be set to the value of $r_1$.

In a sixth option, the maxCodeRate for the PUCCH resource(s) under the HP PUCCH-Config matching the PRI indication is used for $r_1$, and the maxCodeRate for the PUCCH resource(s) under the LP PUCCH-Config matching the PRI indication is used for $r_2$.

In a seventh option, when a LP PUCCH ("PUCCH-2") with UCI ("UCI-2") overlaps with a HP PUCCH ("PUCCH-1") with UCI ("UCI-1"), and UCI-1 and UCI-2 are multiplexed over another HP PUCCH ("HP PUCCH-3"), then $r_1$ for PUCCH-3 is the effective coding rate of the UCI-1 over PUCCH-1 or the maxCodeRate of PUCCH-1, and $r_2$ for PUCCH-3 is the effective coding rate of the UCI-2 over PUCCH-2 or the maxCodeRate of PUCCH-2. In such cases, if $r_2>r_1$, then $r_2$ is set to the value of $r_1$. $r_{ref}$, if used, may be the maxCodeRate of HP PUCCH-3.

If the multiplexing of two HP PUCCHs both with mixed UCIs is considered, then a general rule for updating $r_1$ and $r_2$ can be to take the minimum of $r_1$'s for the new$r_1$, and taking the maximum of $r_2$'s or taking the minimum of $r_2$'s for the new$r_2$.

For different UCI combinations, different sets of ($r_1$, $r_2$) can be determined separately.

4. PRB NUMBER ADJUSTMENT/INTERLACE NUMBER ADJUSTMENT DESIGN

4.1 PRB Number Adjustment

In some wireless communications systems, PRBs for a PUCCH are contiguous in the frequency domain. In alternative wireless communications systems (e.g., in the NR case, under NR-U (NR Unlicensed Spectrum Access)), interlaced transmission of PUCCH may occur, where PRBs for a PUCCH may not be contiguous. When two interlaces are configured for PUCCH for unlicensed spectrum access, the PRBs under one PUCCH may actually be contiguous if both interlaces are utilized. However, the resource adjustment is at the interlace level, which may be different from the PRB number adjustment as specified for other wireless communication systems (e.g., wireless communication systems using only frequency contiguous PRBs for PUCCH).

In some wireless communication systems, two conditions (a trigger condition & a stop condition) are used attendant to PRB number adjustment. The trigger condition may be understood as:

$$(O_{ACK}+O_{SR}+O_{CSI}+O_{CRC}) \le M_{RB}^{PUCCH}\cdot N_{sc,ctrl}^{RB} N_{symb-UCI}^{PUCCH}\cdot Q_m\cdot r$$

where:

$$O_{CSI}=\sum_{n=1}^{N_{CSI}^{total}}(O_{CSI\text{-}part1,n}+O_{CSI\text{-}part2,n}),$$

where $O_{CSI\text{-}part1,n}$ is a number of CSI part 1 CSI reports bits for CSI report with priority value n, $O_{CSI\text{-}part2,n}$ is a number of CSI part 2 CSI report bits, if any, for CSI report with priority value n, and $$N_{CSI}^{total}$$

is a number of CSI reports that include overlapping CSI reports, and $O_{CRC}=O_{CRC,CSI\text{-}part1}+O_{CRC,CSI\text{-}part2}$, where $O_{CRC,CSI\text{-}part1}$ is a number of CRC bits, if any, for encoding HARQ-ACK, SR and Part 1 CSI report bits and $O_{CRC,CSI\text{-}part2}$ is a number of CRC bits, if any, for encoding Part 2 CSI report bits.

When the trigger condition is met, the UE transmits the HARQ-ACK, SR and the $$N_{CSI}^{total}$$

CSI report bits by selecting the minimum number $$M_{RB,min}^{PUCCH}$$

of PRBs from the $$M_{RB}^{PUCCH}$$

PRBs satisfying $$(O_{ACK}+O_{SR}+O_{CSI}+O_{CRC}) \le M_{RB,min}^{PUCCH}\cdot N_{sc,ctrl}^{RB} N_{symb\text{-}UCI}^{PUCCH}\cdot Q_m\cdot r.$$ See, e.g., clause 9.2.5.2 of 3GPP TS 38.213 version 16.5.0 (March 2021).

This trigger condition can be reformulated as $$\left(O_{ACK}+O_{SR}+\sum_{n=1}^{N_{CSI}^{total}} O_{CSI-part1,n}+O_{CRC,CSI-part1}\right)/(Q_m\cdot r)+\left(\sum_{n=1}^{N_{CSI}^{total}} O_{CSI-part2,n}+O_{CRC,CSI-part2}\right)/(Q_m\cdot r)\le M_{RB}^{PUCCH}\cdot N_{sc,ctrl}^{RB} N_{symb-UCI}^{PUCCH}$$

which may be a formulation that is illustrative as to how the sum of the number of modulation symbols required for UCI Part I and the number of modulation symbols required for UCI Part II does not exceed the number of modulation symbols with the maximum available number PRBs on the selected PUCCH.

By adjusting from this formulation, a manner of considering different coding rates for UCI Part I and UCI Part II for PRB number adjustment may be illustrated.

For example, a trigger condition for PRB number adjustment using different coding rates $r_1$ and $r_2$ can be given by $$\left(\sum_{n=1}^{N_{UCI-part2}^{total}} O_{UCI-part2,n}+O_{CRC,UCI-part2}\right)/(Q_m\cdot r_2)+\left(\sum_{n=1}^{N_{UCI}^{total}} O_{UCI-part1,n}+O_{CRC,UCI-part1}\right)/(Q_m\cdot r_1)\le M_{RB}^{PUCCH}\cdot N_{sc,ctrl}^{RB}\cdot N_{symb-UCI}^{PUCCH}.$$

Correspondingly, a stop condition for PRB number adjustment can be given by:

$$\left(\sum_{n=1}^{N_{UCI\text{-}part2}^{total}} O_{UCI\text{-}part2,n}+O_{CRC,UCI\text{-}part2}\right)/(Q_m\cdot r_2)+$$

-continued $$\left(\sum_{n=1}^{N_{UCI\text{-}part1}^{total}} O_{UCI\text{-}part1,n} + O_{CRC,UCI\text{-}part1}\right)/(Q_m \cdot r_1) \leq M_{RB,min}^{PUCCH} \cdot N_{sc,ctrl}^{RB}, \text{ with } M_{RB,min}^{PUCCH}$$

being the smallest number of PRBs allowable. In some NR networks, the allowable condition is given by 3GPP TS 38.213 version 16.4.0 (January 2021), clause 9.2.5.1 for PUCCH format 3: if $$M_{RB,min}^{PUCCH}$$

is not equal to $2^{\alpha_2} \cdot 3^{\alpha_3} \cdot 5^{\alpha_5}$, $$M_{RB,min}^{PUCCH}$$

is increased to the nearest allowed value of nrofPRBs for PUCCH-format3.

4.1.1 Multiplexing of Different UCI Parts on the Same Modulation Symbol

In some wireless communication networks, CSI parts are not multiplexed on the same modulation symbol. Other wireless communication networks may allow different UCI parts to be carried on the same modulation symbol. In such cases, it may be beneficial to keep the same design principle such that different UCI parts are not multiplexed on the same modulation symbol.

To be more consistent with the UCI omission rules to be discussed herein, the trigger condition for PRB number adjustment can be tightened by taking the ceiled value of the second item:

$$\left(\sum_{n=1}^{N_{UCI-part2}^{total}} O_{UCI-part2,n} + O_{CRC,UCI-part2}\right)/(r_2) + \left\lceil\left(\sum_{n=1}^{N_{UCI-part2}^{total}} O_{UCI-part1,n} + O_{CRC,UCI-part1}\right)/(r_1)\right\rceil \leq M_{RB}^{PUCCH} \cdot N_{sc,ctrl}^{RB} \cdot N_{symb-UCI}^{PUCCH} \cdot Q_m$$

Further, the stop condition for PRB number adjustment can be similarly tightened as follows:

$$\left(\sum_{n=1}^{N_{UCI-part2}^{total}} O_{UCI-part2,n} + O_{CRC,UCI-part2}\right)/(r_2) + \left\lceil\left(\sum_{n=1}^{N_{UCI-part1}^{total}} O_{UCI-part1,n} + O_{CRC,UCI-part1}\right)/(r_1)\right\rceil \leq M_{RB,min}^{PUCCH} \cdot N_{sc,ctrl}^{RB} \cdot N_{symb-UCI}^{PUCCH} \cdot Q_m$$

4.1.2 Conversion to Integer to Avoid gNB/UE Implementation Discrepancy

As can be seen for some formula provided herein, arithmetic operations with non-integer numbers (e.g. float/double numbers) may be required. To avoid a case where different precisions are taken by a gNB implementation and a UE implementation such that there is a discrepancy regarding the result between gNB and UE, operations of rounding, ceiling, floor, and/or fix can be applied to one or more terms that may not be integers in every case. For example, for the trigger condition for PRB number adjustment $$\left\lceil\left(\sum_{n=1}^{N_{UCI-part2}^{total}} O_{UCI-part2,n} + O_{CRC,UCI-part2}\right)/(Q_m \cdot r_2)\right\rceil + \left\lceil\left(\sum_{n=1}^{N_{UCI-part1}^{total}} O_{UCI-part1,n} + O_{CRC,UCI-part1}\right)/(Q_m \cdot r_1)\right\rceil \leq M_{RB}^{PUCCH} \cdot N_{sc,ctrl}^{RB} \cdot N_{symb-UCI}^{PUCCH}.$$

The stop condition for PRB number adjustment can be similarly modified as follows:

$$\left\lceil\left(\sum_{n=1}^{N_{UCI-part2}^{total}} O_{UCI-part2,n} + O_{CRC,UCI-part2}\right)/(Q_m \cdot r_2)\right\rceil + \left\lceil\left(\sum_{n=1}^{N_{UCI-part1}^{total}} O_{UCI-part1,n} + O_{CRC,UCI-part1}\right)/(Q_m \cdot r_1)\right\rceil \leq M_{RB,min}^{PUCCH} \cdot N_{sc,ctrl}^{RB} \cdot N_{symb-UCI}^{PUCCH}.$$

For other cases, such as PUCCH resource set selection and/or UCI omission, the same considerations can apply.

4.2 Interlace Number Adjustment

For an interlace number adjustment procedure, instead of performing PRB number adjustment for a potentially large number of PRB number candidates, it may be that only two PRB number candidates are examined, where a first of the two PRB number candidates corresponds to the number of PRBs in the first interlace, and a second of the two PRB number candidates corresponds to the number PRBs in the first and second interlace. The same considerations as previously discussed may apply.

In the case that a UE is provided with a first interlace of $$M_{Interlace,0}^{PUCCH}$$

PRBs by an interlace0 parameter in an InterlaceAllocation information element, if the UE has HARQ-ACK, SR and wideband or sub-band CSI reports to transmit and the UE determines a PUCCH resource with PUCCH format 2; or if the UE has HARQ-ACK, SR, and wideband CSI reports to transmit and the UE determines a PUCCH resource with PUCCH format 3; or if the UE has HARQ-ACK, SR, and sub-band CSI reports to transmit, and the UE determines a PUCCH resource with PUCCH format 3; where the UE determines the PUCCH resource using the PUCCH resource indicator field in a last of a number of DCI formats with a value of a PDSCH-to-HARQ_feedback timing indicator field indicating a same slot for the PUCCH transmission from a PUCCH resource set provided to the UE for HARQ-ACK transmission, after the UE determines the PUCCH resource set, if $$\left(\sum_{n=1}^{N_{UCI\text{-}part2}^{total}} O_{UCI\text{-}part2,n} + O_{CRC,UCI\text{-}part2}\right)/(Q_m \cdot r_2) + \left\lceil\sum_{n=1}^{N_{UCI\text{-}part1}^{total}} O_{UCI\text{-}part1,n} + O_{CRC,UCI\text{-}part1}\right)/(Q_m \cdot r_1)\right\rceil \leq M_{Interlace,0}^{PUCCH} \cdot N_{sc,ctrl}^{RB} \cdot N_{symb\text{-}UCI}^{PUCCH}, \text{ the } UE$$

transmits the HARQ-ACK, SR, and CSI reports bits in a PUCCH over the first interlace In the case that the UE is provided a second interlace of $$M_{Interlace,1}^{PUCCH}$$

PRBs by an interlace1 parameter, and if $$\left(\sum_{n=1}^{N_{UCI\text{-}part2}^{total}} O_{UCI\text{-}part2,n} + O_{CRC,UCI\text{-}part2}\right)/(Q_m \cdot r_2) + \left\lceil \sum_{n=1}^{N_{UCI\text{-}part1}^{total}} O_{UCI\text{-}part1,n} + O_{CRC,UCI\text{-}part1}\right)/(Q_m \cdot r_1)\right\rceil \le \left(M_{Interlace,0}^{PUCCH} + M_{Interlace,1}^{PUCCH}\right) \cdot N_{sc,ctrl}^{RB} \cdot N_{symb\text{-}UCI}^{PUCCH},$$

the UE transmits the HARQ-ACK, SR, and CSI reports bits in a PUCCH over both the first and second interlaces.

Otherwise, the procedure is same as the corresponding one when the UE is provided PUCCH-ResourceSet by replacing $$M_{RB}^{PUCCH} \text{ with } M_{Interlace,0}^{PUCCH},$$

or, if the UE is provided interlace1, with $$M_{Interlace,0}^{PUCCH} + M_{Interlace,1}^{PUCCH}.$$

A joint PUCCH resource set selection and PUCCH resource selection can also be conducted.

5. RESOURCE DETERMINATION FOR SPS HARQ ONLY

It may be that a UE has one or more CSI reports and zero or more HARQ-ACK/SR information bits to transmit in a PUCCH where the HARQ-ACK, if any, is in response to a PDSCH reception without a corresponding PDCCH and that (any of) the CSI reports overlap, and that the UE is provided by multi-CSI-PUCCH-ResourceList with J PUCCH resources in a slot, for PUCCH format 2 and/or PUCCH format 3 and/or PUCCH format 4, where the resources are indexed according to an ascending order for the product of a number of corresponding REs, a modulation order $Q_m$, a and configured code rates $r_1$ and $r_2$. In such a case, if $$\left(\sum_{n=1}^{N_{UCI\text{-}part2}^{total}} O_{UCI\text{-}part2,n} + O_{CRC,UCI\text{-}part2}\right)/(Q_m \cdot r_2) + \left\lceil \sum_{n=1}^{N_{UCI\text{-}part1}^{total}} O_{UCI\text{-}part1,n} + O_{CRC,UCI\text{-}part1}\right) /(Q_m \cdot r_1)\right\rceil \le \left(M_{RB}^{PUCCH} \cdot N_{sc,ctrl}^{RB} \cdot N_{symb\text{-}UCI}^{PUCCH}\right)_0,$$

the UE uses the PUCCH format 2 resource 0, the PUCCH format 3 resource 0, or the PUCCH format 4 resource 0 (as the case may be).

On the other hand, if $$\left(\sum_{n=1}^{N_{UCI-part2}^{total}} O_{UCI-part2,n} + O_{CRC,UCI-part2}\right)/(Q_m \cdot r_2) + \left\lceil\left(\sum_{n=1}^{N_{UCI-part1}^{total}} O_{UCI-part1,n} + O_{CRC,UCI-part1}\right)/(Q_m \cdot r_1)\right\rceil \le \left(M_{RB}^{PUCCH} \cdot N_{sc,ctrl}^{RB} \cdot N_{symb-UCI}^{PUCCH}\right)_j,$$

$$\left(\sum_{n=1}^{N_{UCI-part2}^{total}} O_{UCI-part2,n} + O_{CRC,UCI-part2}\right)/(Q_m \cdot r_2) + \left\lceil\left(\sum_{n=1}^{N_{UCI-part1}^{total}} O_{UCI-part1,n} + O_{CRC,UCI-part1}\right)/(Q_m \cdot r_1)\right\rceil \le \left(M_{RB}^{PUCCH} \cdot N_{sc,ctrl}^{RB} \cdot N_{symb-UCI}^{PUCCH}\right)_{j+1}, \text{ and}$$

$$0 \le j < J-1,$$

the UE uses PUCCH format 2 resource j+1, the PUCCH format 3 resource j+1, or the PUCCH format 4 resource j+1 (as the case may be).

Otherwise, the UE uses the PUCCH format 2 resource J−1, the PUCCH format 3 resource J−1, the PUCCH format 4 resource J−1 (as the case may be) and the UE selects $$N_{UCI}^{selected}$$

UCI USI report(s) for transmission together with HARQ-ACK information and SR, when any, in ascending priority value.

6. OMISSION RULES

6.1 Design Choice for UCI Omission

Assume different coding rate targets for UCI part I and UCI part II (for example, $r_1$ as the maximum coding rate for UCI part I and $r_2$ for the maximum coding rate for UCI part II). In such cases, the following conditions are used for UCI omission:

$$\left(\sum_{n=1}^{N_{UCI-part2}^{reported}} O_{UCI-part2,n} + O_{CRC,UCI-part2,N}\right)/(Q_m \cdot r_2) + \left\lceil\left(\sum_{n=1}^{N_{UCI-part1}^{total}} O_{UCI-part1,n} + O_{CRC,UCI-part1}\right)/(Q_m \cdot r_1)\right\rceil \le M_{RB}^{PUCCH} \cdot N_{sc,ctrl}^{RB} \cdot N_{symb-UCI}^{PUCCH}, \text{ and}$$

$$\left(\sum_{n=1}^{N_{UCI-part2}^{reported}+1} O_{UCI-part2,n} + O_{CRC,UCI-part2,N+1}\right)/(Q_m \cdot r_2) + \left\lceil\left(\sum_{n=1}^{N_{UCI-part1}^{total}} O_{UCI-part1,n} + O_{CRC,UCI-part1}\right)/(Q_m \cdot r_1)\right\rceil > M_{RB}^{PUCCH} \cdot N_{sc,ctrl}^{RB} \cdot N_{symb-UCI}^{PUCCH}.$$

In a case where all UCI part II is dropped, then the following conditions are used to determine remaining UCIs in UCI part I.

$$\left(\sum_{n=1}^{N_{UCI-part1}^{reported}} O_{UCI-part1,n} + O_{CRC,UCI-part1,N}\right)/(Q_m \cdot r_1) \le M_{RB}^{PUCCH} \cdot N_{sc,ctrl}^{RB} \cdot N_{symb-UCI}^{PUCCH}, \text{ and}$$

-continued $$\left(\sum_{n=1}^{N_{UCI-part1}^{reported}+1} O_{UCI-part1,n} + O_{CRC,UCI-part1,N+1}\right)/(Q_m \cdot r_1) > M_{RB}^{PUCCH} \cdot N_{sc,ctrl}^{RB} \cdot N_{symb-UCI}^{PUCCH} \cdot$$

6.2 Omission of Part 1 Only

For omission of Part I of CSI report(s), in some wireless communication networks, two conditions are checked:

$$\left(O_{ACK} + O_{SR} + \sum_{n=1}^{N_{CSI-part1}^{reported}} O_{CSI-part1,n} + O_{CRC,CSI-part1,N}\right) \le M_{RB}^{PUCCH} \cdot N_{sc,ctrl}^{RB} \cdot N_{symb-UCI}^{PUCCH} \cdot Q_m \cdot r, \text{ and}$$

$$\left(O_{ACK} + O_{SR} + \sum_{n=1}^{N_{CSI-part1}^{reported}+1} O_{CSI-part1,n} + O_{CRC,CSI-part1,N+1}\right) > M_{RB}^{PUCCH} \cdot N_{sc,ctrl}^{RB} \cdot N_{symb-UCI}^{PUCCH} \cdot Q_m \cdot r.$$

See, e.g., 3GPP TS 38.213 version 16.5.0 (March 2021).

As can be seen from above, the relevant UCI types are itemized (e.g., into types corresponding to each of HARQ-ACK, SR, and CSI). Yet it may be that, depending on the mapping of HP and LP UCIs to UCI Part I and UCI part II, explicitly listing the UCI combination in the manner can be quite complex. Accordingly, it is possible to reformulate these conditions as $$\left(\sum_{n=1}^{N_{UCI-part1}^{reported}} O_{UCI-part1,n} + O_{CRC,UCI-part1,N}\right) \le M_{RB}^{PUCCH} \cdot N_{sc,ctrl}^{RB} \cdot N_{symb-UCI}^{PUCCH} \cdot Q_m \cdot r \text{ and}$$

$$\left(\sum_{n=1}^{N_{UCI-part1}^{reported}+1} O_{UCI-part1,n} + O_{CRC,UCI-part1,N+1}\right) > M_{RB}^{PUCCH} \cdot N_{sc,ctrl}^{RB} \cdot N_{symb-UCI}^{PUCCH} \cdot Q_m \cdot r$$

Where, for example, $r=r_1$.

7. ORDERING OF UCIS IN UCI PART 1 AND UCI PART 2

It may be the case that CSI reporting is either HP or LP. In such a case, the order of UCI in a UCI part defines the order by which UCIs are omitted.

For the case where HP CSI is present, On UCI part 1 the order of UCI may be HP HARQ-ACK (including potentially more than one HARQ codebook), HP SR, HP CSI-Part I, and on UCI part 2 the order may be HP CSI-part II, LP-HARQ-ACK, (LP-SR).

Accordingly, on UCI Part 2, (LP-SR) (if supported by the wireless communication system and if present) is omitted first, LP-HARQ-ACK (including potentially more than one HARQ codebook) is omitted second (and note that if more than one HARQ codebook is present, then the last placed HARQ codebook is omitted/compacted first for example), and then HP CSI-part 2 can be omitted.

For the case LP CSI is present, on UCI part 1 the order may be HP HARQ-ACK (including potentially more than one HARQ codebook), HP SR, LP CSI-Part I, and on UCI part 2 the order may be LP-HARQ-ACK, (LP-SR), LP CSI-part II.

For all cases generally, on UCI part 1 the order may be HP HARQ-ACK (including potentially more than one HARQ codebook), HP SR, HP-CSI Part I, LP CSI-Part I, and on UCI part 2 the order may be HP CSI Part II, LP-HARQ-ACK, (LP-SR), LP CSI-part II.

Accordingly, CSI-part II on UCI part 2 is dropped first, followed by CSI-Part I on UCI part 1, followed by SR on UCI part 2, followed by LP HARQ-ACK on UCI part 2.

In some cases, it may be that a LP HARQ-ACK is of a higher priority than HP CSI, wherein CSIs are dropped first, then LP HARQ-ACK/SR can be dropped second.

In some cases, LP CSI-part II is dropped first, followed by LP-SR, followed by LP-HARQ-ACK, followed by HP CSI Part II, followed by LP CSI-Part I, followed by HP-CSI Part I, followed by HP SR, followed by HP HARQ-ACK. HP HARQ-ACK and LP HARQ-ACK may consist of more than one HARQ codebook in such cases.

7.1 Discussion on CSI Part I and CSI Part II

In some wireless communication systems, the introduction of two part CSI feedback may be motivated by the payload size variation for a reported rank: in such cases, CSI Part I provides sufficient information for gNB to determine the size of CSI part II, so blind detection with respect to different ranks is avoided. In some such wireless communication systems, single part CSI reports are included in CSI Part I even though for a single part CSI report there is no CSI part I in the CSI report. In view of the fact that in some such wireless communication systems the coding rate for UCI part I can be different from that for UCI part II, there may be a motivation to move all non-essential UCIs to UCI part II. Specifically, if a CSI report consists of a single part, then it can be carried in UCI Part II. However, if the single part CSI report is at HP, then it may still be desirable to carry the HP CSI report in UCI Part I.

In cases where the UCI payload may exceed the capacity of a PUCCH, it may be that the following priority rule is used (note not all UCI types may be present in a particular scenario, nor all the combinations need to be supported by specification):

$$HP\ HARQ\text{-}ACK > HP\ SR >$$

$$(HP\ CSI) > LP\ HARQ\text{-}ACK > (LP\ SR) > (LP\ CSI)$$

With the above prioritization rule, then a CSI omission rule may need to run twice: it is first run for LP CSI, and then after omitting or dropping all LP CSI, LP SR and LP HP-HARQ-ACK, and then it is again run to determine whether/that a part of HP CSI needs to be omitted.

Figure 2:
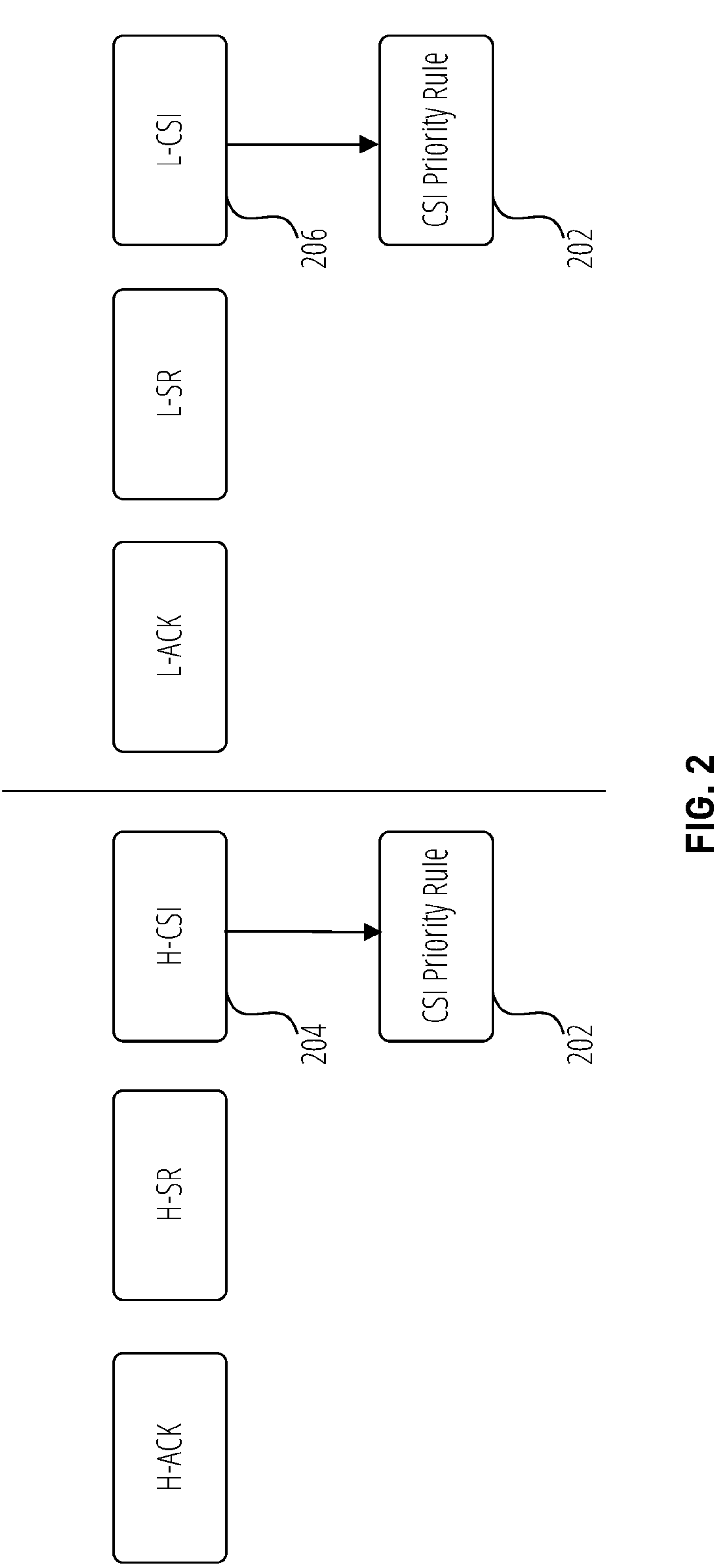
FIG. 2 illustrates how a CSI priority rule is applied separately to HP CSI and LP CSI, according to an embodiment.

In FIG. 2 illustrates how a CSI priority rule 202 is applied separately to HP CSI (or H-CSI) 204 and LP CSI (or L-CSI) 206, according to an embodiment. Corresponding to FIG. 2, (parts of) CSI reports within the H-CSI 204 and CSI reports within the L-CSI 206 are separately dropped, so the CSI priority rule(s) 202 are run twice (once for each of the HP CSI 204 another for the LP CSI 206).

In alternative cases, it may instead by that LP CSI is dropped when HP CSI is present, in order to avoid running CSI omission rules twice. In a first of such cases, LP CSI is dropped on UCI Part II only, while in a second of such cases, LP CSI is dropped from UCI part I and UCI II altogether. Then for UCI Part II or for both UCI Parts I and II, when HP CSI is present, only the following UCIs are carried in UCI part I and part II:

$$HP\ HARQ\text{-}ACK > HP\ SR > (HP\ CSI) > LP\ HARQ\text{-}ACK > (LP\ SR).$$

Alternatively, when HP CSI is absent, only the following UCIs are carried UCI part I and part II:

$$HP\ HARQ\text{-}ACK > HP\ SR > LP\ HARQ\text{-}ACK > (LP\ SR) > LP\ CSI.$$

If the power consumption for decoding all the PDSCHs with LP HARQ-ACK is more than the power consumption to acquire HP CSI, and, depending on the nature of the HP CSI, there may be motivation to prioritize the LP HARQ-ACK over HP CSI. In this case, the priority of elements in the UCIs can be:

$$HP\ HARQ\text{-}ACK > HP\ SR > LP\ HARQ\text{-}ACK > (HP\ CSI) > (LP\ SR) > (LP\ CSI).$$

Figure 3:
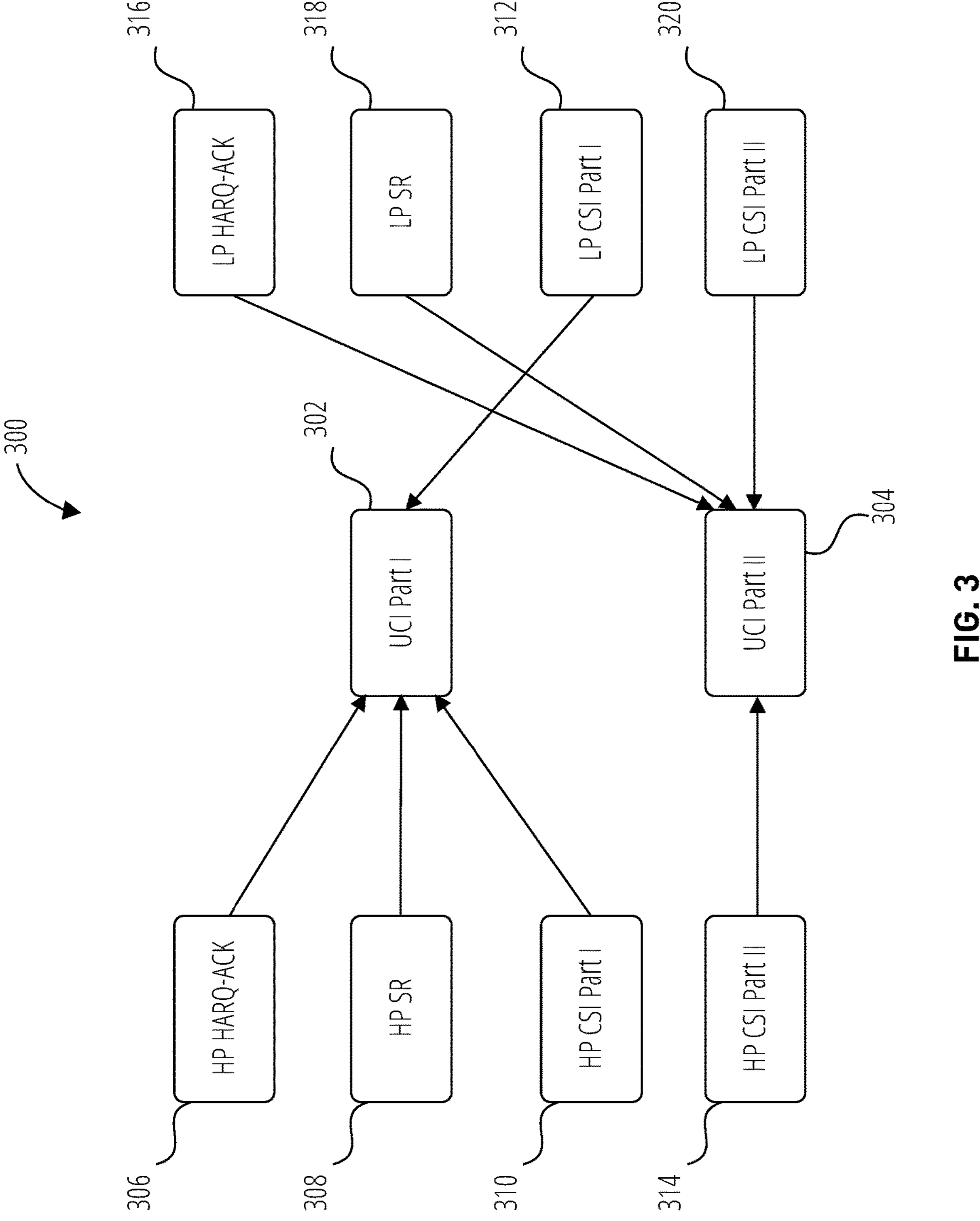
FIG. 3 illustrates an option for separate encoding of HP HARQ-ACK and LP HARQ-ACK, according to embodiment herein.

FIG. 3 illustrates an option 300 for separate encoding of HP HARQ-ACK and LP HARQ-ACK, according to embodiment herein. The encoding may use UCI part I 302 and UCI part II 304. As illustrated, the HP HARQ-ACK 306, the HP SR 308, the HP CSI part 1 310, and the LP CSI part 1 312 may be placed in the UCI part I 302. Further, as illustrated, the HP CSI part II 314, the LP HARQ-ACK 316, the LP SR 318, and the LP CSI part 2 320 may be placed in the UCI part II 304.

For a case where joint encoding of HP HARQ-ACK and LP HARQ-ACK are used, instead of mapping LP-HARQ-ACK to UCI part II, LP-HARQ-ACK may be mapped to UCI Part I.

Figure 4:
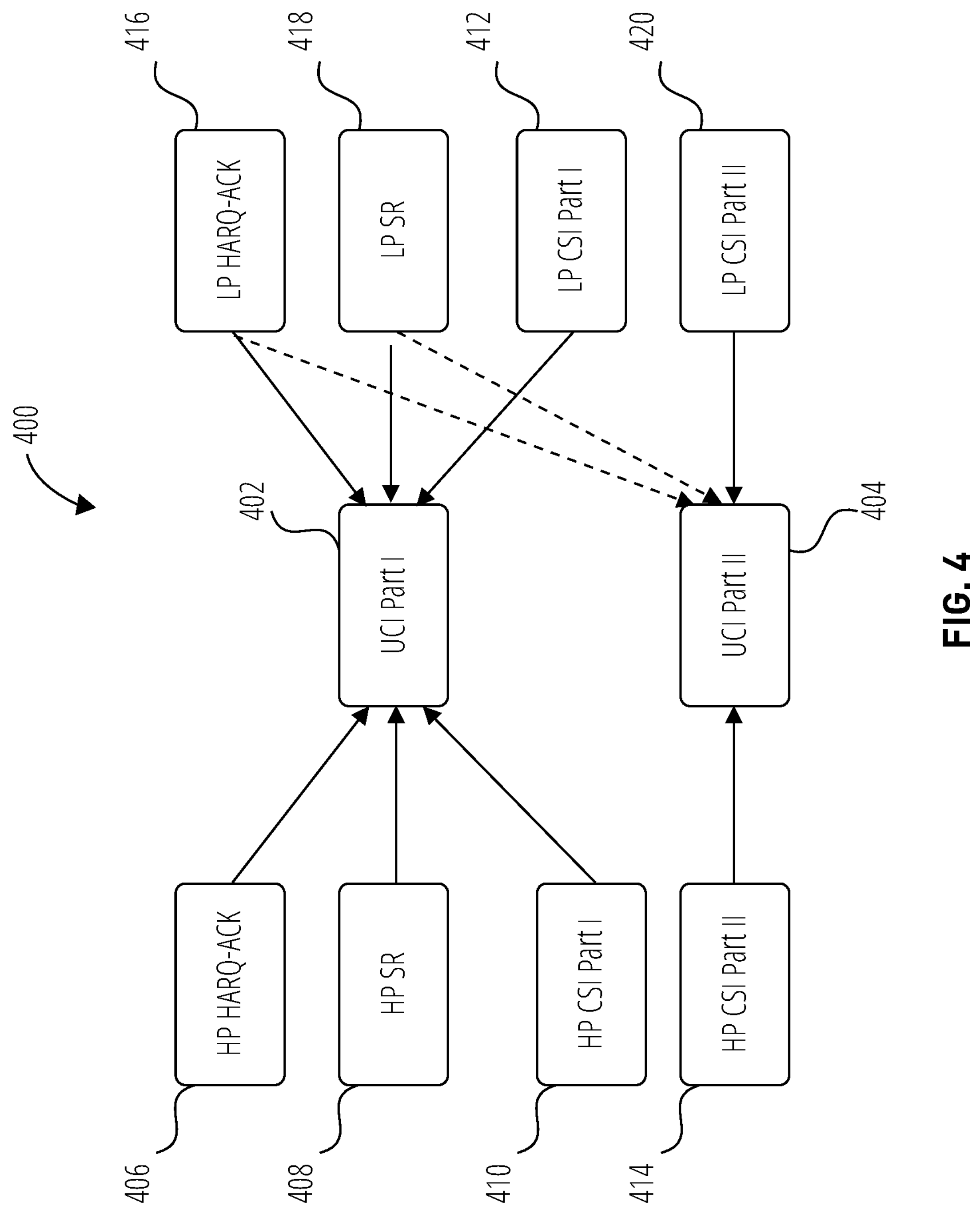
FIG. 4 illustrates an option for separate encoding of elements of UCI, according to embodiment herein.

FIG. 4 illustrates an option 400 for separate encoding of elements of UCI, according to embodiment herein. The encoding may use UCI part I 402 and UCI part II 404. As illustrated, the HP HARQ-ACK 406, the HP SR 408, the HP CSI part 1 410, the LP CSI part 1 412, the LP HARQ-ACK 416, and the LP SR 418 may be placed in the UCI part I 402. Further, as illustrated, the HP CSI part II 414 and the LP CSI part 2 420 may be placed in the UCI part II 404. As illustrated by dotted arrows, the difference between the option 300 of FIG. 3 and the option 400 of FIG. 4 is that in the option 400, the LP HARQ-ACK 416, and the LP SR 418 have been placed in the UCI part I 402 (instead of in the UCI part II 404).

8. SOLUTION TO FIX INCONSISTENT DESIGN IN PUCCH RESOURCE SET SELECTION AND UCI OMISSION RULE

8.1 Inconsistent Design Issues

8.1.1 Issue 1

In some wireless communication networks, PUCCH resource set selection design and CSI omission design are not consistent. For example, in some cases CRC bits are not used in PUCCH resource set selection while CRC bits are considered in the CSI omission rule.

Hence, in such wireless communication networks, it may be the case that, for example, PUCCH resource set 2 is selected according to $O_{UCI}$ bits, and then later it is found that CSI omission is triggered over the indicated PUCCH resource within PUCCH resource set 2. Further, it may be that a counterpart PUCCH in PUCCH resource set 3 has enough capacity to carry the UCI bits plus CRC bits without triggering CSI omission. If the CRC bits were considered in the first place (in the PUCCH resource set selection), then PUCCH resource set 3 could have been selected, and the un-necessary CSI omission could have been avoided.

In cases where LP HARQ-ACK can be carried over UCI part II, it would be undesirable to drop/or compact LP HARQ-ACK due to selection of a PUCCH resource set that will trigger CSI omission once CRC bits are considered.

8.1.2 Issue 2

In some wireless communication systems, a UCI payload's coding rate is not a factor in selecting a PUCCH resource set, but it is a factor for PRB number adjustment and CSI omission.

Accordingly, the variation in PUCCH capacity within a PUCCH resource set is not accounted in PUCCH resource set selection.

8.2 Joint PUCCH Resource Set Selection and PUCCH Resource Selection

In some wireless communication systems, PUCCH resource selection takes two steps: in the first step, $O_{UCI}$ bits is used to look up a PUCCH resource set. Note that the capacity of PUCCH resources within a PUCCH resource set varies (e.g. PUCCH-11 and PUCCH-12 are both under PUCCH resource set 1, but PUCCH-11 supports up to 10 bits for payload while PUCCH-12 supports up to 20 bits), and such variation in capacity may not be reflected by the PUCCH resource set's maxPayloadSize. Then, in the second step, PRI from a DL DCI is used to select a PUCCH resource within the selected PUCCH resource set in the first step.

From two issues discussed above, and also from the consideration with regard to $r_{ref}$ and $M_{ref}$ under PUCCH resource set selection Alt. 2 (where additional RRC signaling or rules to determine $r_{ref}$ and $M_{ref}$ are needed) a simplified solution may be used which does joint PUCCH resource set selection and PUCCH resource selection (and may further not require introduction of new RRC parameters for $r_{ref}$ and $M_{ref}$).

A simpler approach (e.g., as compared to the solution described in Section 4 to Section 6) is to first use the PRI to look up a PUCCH resource matching the PRI from each PUCCH resource set, then to identify PUCCH resources from that PUCCH resource set with a capacity no smaller than $O_{UCI}$ or $O_{UCI}+O_{CRC}$, then to select from these PUCCH resources the PUCCH resource with the least capacity. In the case where none of those PUCCH resources has a capacity no smaller than $O_{UCI}$ or $O_{UCI}+O_{CRC}$, then the PUCCH resource with the largest capacity may be chosen.

8.2.1 First Mechanism for Joint PUCCH Resource Set Selection and PUCCH Resource Selection For selecting a PUCCH resource from a number of PUCCH resource sets, in each PUCCH resource set, the PUCCH resource of an index as indicated by the PRI may be checked one by one with the following condition:

$$\left\lceil \left(\sum_{n=1}^{N_{UCI-part2}^{total}} O_{UCI-part2,n} + O_{CRC,UCI-part2}\right) / (Q_m \cdot r_2) \right\rceil +$$

-continued $$\left\lceil\left(\sum_{n=1}^{N_{UCI-part1}^{total}} O_{UCI-part1,n} + O_{CRC,UCI-part1}\right)/(Q_m \cdot r_1)\right\rceil \le M_{RB}^{PUCCH} \cdot N_{sc,ctrl}^{RB} \cdot N_{symb-UCI}^{PUCCH},$$

or with the condition $$\left(\sum_{n=1}^{N_{UCI-part2}^{total}} O_{UCI-part2,n} + O_{CRC,UCI-part2}\right)/(Q_m \cdot r_2) + \left\lceil\left(\sum_{n=1}^{N_{UCI-part1}^{total}} O_{UCI-part1,n} + O_{CRC,UCI-part1}\right)/(Q_m \cdot r_1)\right\rceil \le M_{RB}^{PUCCH} \cdot N_{sc,ctrl}^{RB} \cdot N_{symb-UCI}^{PUCCH}.$$

Note in either case, the CRC bit length is considered as part of the PUCCH resource determination. To avoid chicken-and-egg problems, it may be assumed that for information bits no smaller than 360, L=11.

As will be understood, this first mechanism may be responsive to either both of Issue 1 and/or Issue 2, as discussed above.

8.2.2 Second Mechanism for Joint PUCCH Resource Set Selection and PUCCH Resource Selection Another choice is to exclude CRC bit length in PUCCH resource determination altogether. Accordingly, the formulas can be modified by removing $O_{CRC,UCI-part2}$ and/or $O_{CRC,UCI-part1}$, e.g.:

$$\left\lceil\left(\sum_{n=1}^{N_{UCI-part2}^{total}} O_{UCI-part2,n}\right)/(Q_m \cdot r_2)\right\rceil + \left\lceil\left(\sum_{n=1}^{N_{UCI-part1}^{total}} O_{UCI-part1,n}/(Q_m \cdot r_1)\right\rceil \le M_{RB}^{PUCCH} \cdot N_{sc,ctrl}^{RB} \cdot N_{symb-UCI}^{PUCCH}, \text{ or}$$

$$\left(\sum_{n=1}^{N_{UCI-part2}^{total}} O_{UCI-part2,n}\right)/(Q_m \cdot r_2) + \left\lceil\left(\sum_{n=1}^{N_{UCI-part1}^{total}} O_{UCI-part1,n}\right)/(Q_m \cdot r_1)\right\rceil \le M_{RB}^{PUCCH} \cdot N_{sc,ctrl}^{RB} \cdot N_{symb-UCI}^{PUCCH}.$$

From the discussion above, it can be seen that with joint PUCCH resource set selection and PUCCH resource selection, there is no need to introduce PUCCH resource set-specific coding rates for UCI part I and UCI Part II. In cases where the maxCodeRate is configured per PUCCH format, the introduction of two maxCodeRates per PUCCH format or per PUCCH resource (i.e. the two options provided in Section 3.1 (e.g., the third option and/or the fourth option) is contemplated for use.

9. UCI MULTIPLEXING OVER PUCCH WITH MORE THAN 2 UCI BITS

In some wireless communication systems, UCI multiplexing over PUCCH considers a reliability of OFDM symbols in PUCCH. Further, OFDM symbols are grouped in up to 3 groups, then depending on the size of UCI part I and UCI part II, the resources are determined.

Figure 5A:
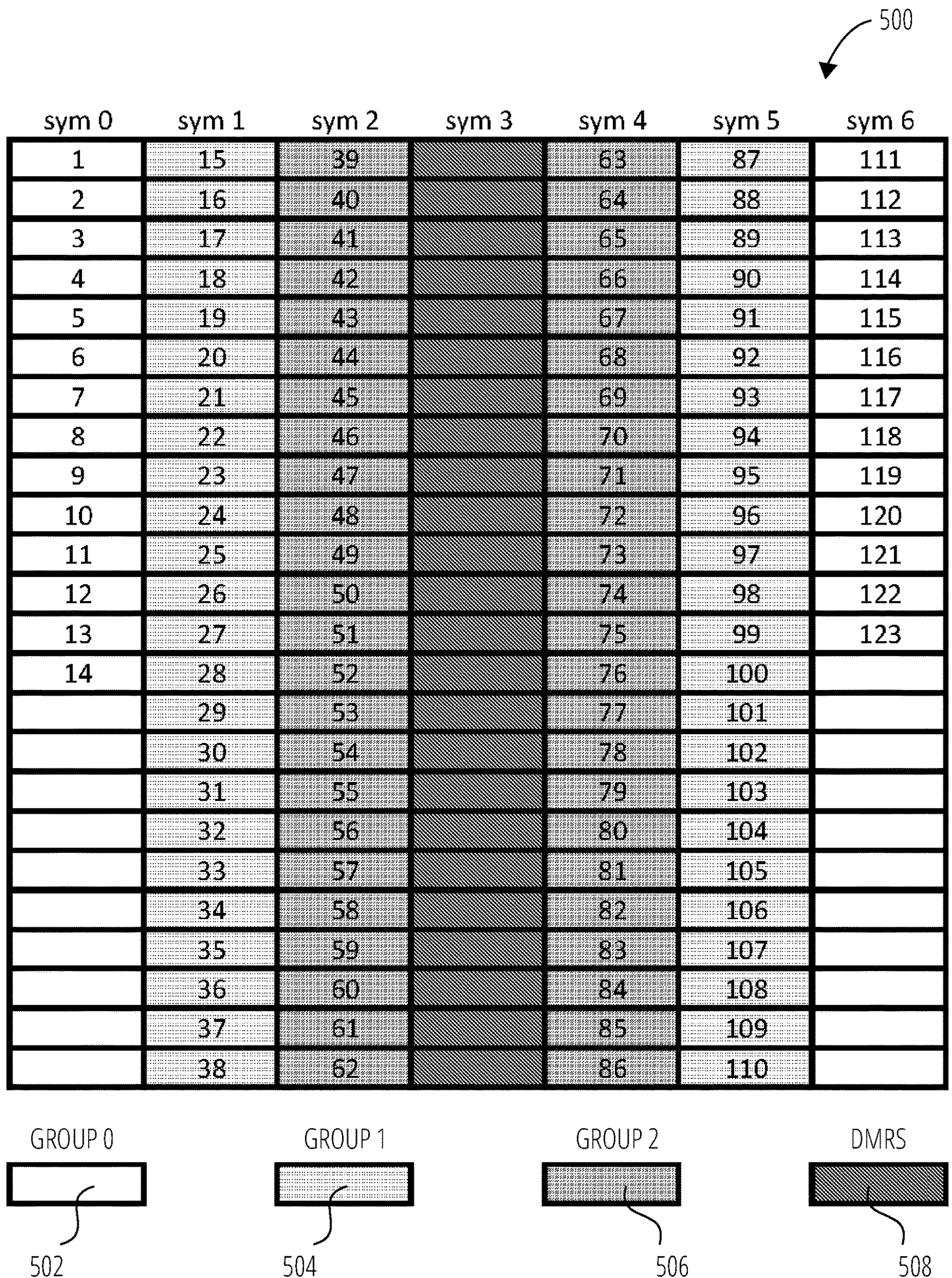
FIG. 5A and FIG. 5B together illustrate a UCI mapping for UCI part I, according to an embodiment.
Figure 5B:
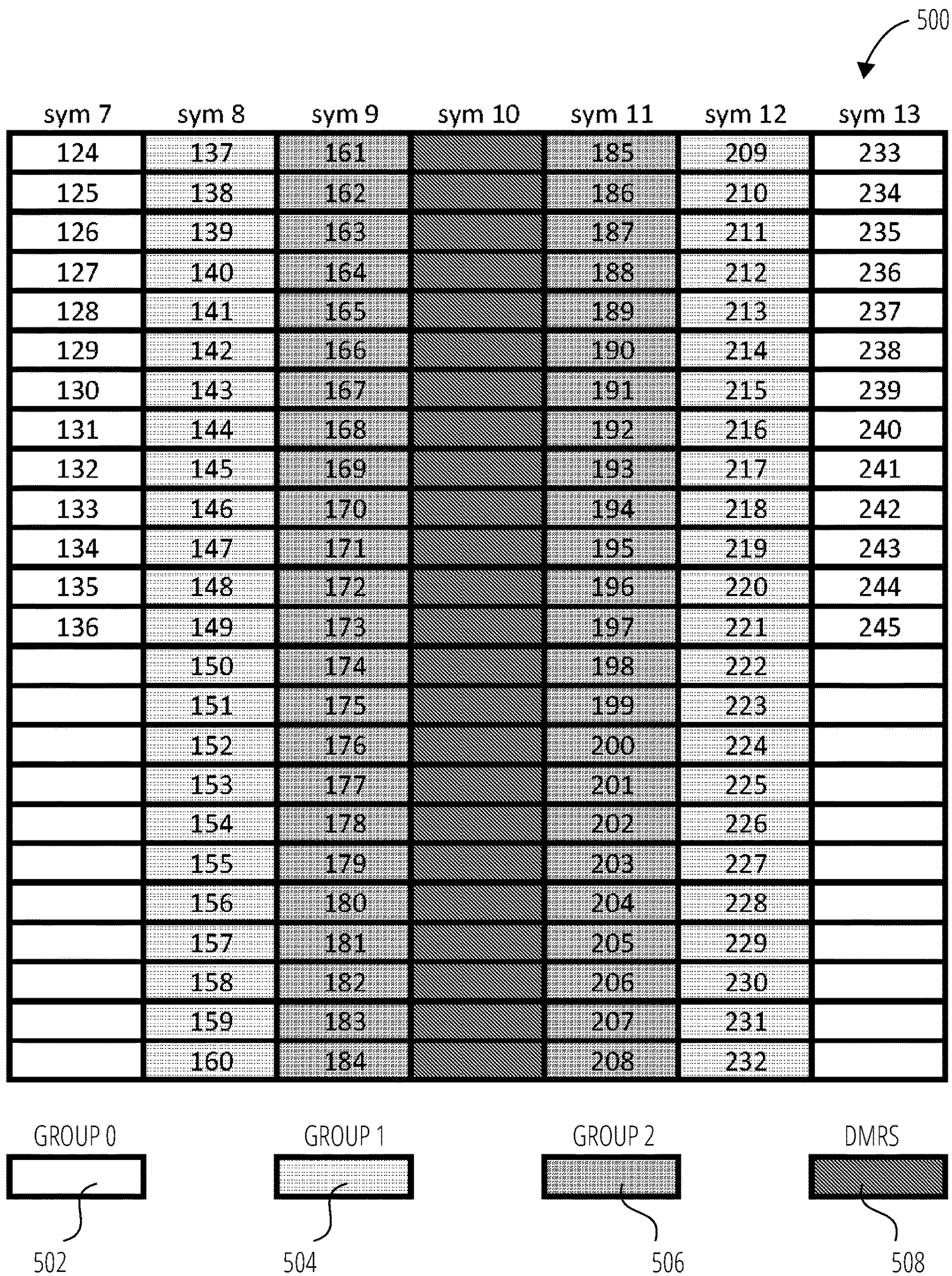

FIG. 5A and FIG. 5B together illustrate a UCI mapping 500 for UCI part I, according to an embodiment. The UCI mapping 500 places first OFDM symbols in a first group 502 (denoted "group 0"), second OFDM symbols in a second group 504 (denoted "group 1"), and third OFDM symbols in a third group 506 (denoted "group 2"), as illustrated. The UCI mapping 500 also illustrates placement for OFDM symbols used for DMRS 508.

FIG. 6 illustrates a table 600 showing options for calculating a rate matching sequence length(s) (denoted $E_{UCI}$), according to some wireless communication systems.

As can be seen in the first portion 602 of the table 604, if there is no two part CSI, UCI multiplexing for HARQ-ACK, SR and CSI are jointly encoded.

However, as can be seen in the second portion 604 of the table 600, if at least one CSI report is of two parts, then CSI part 2 is separately encoded, and the rest are jointly encoded.

Figure 7:
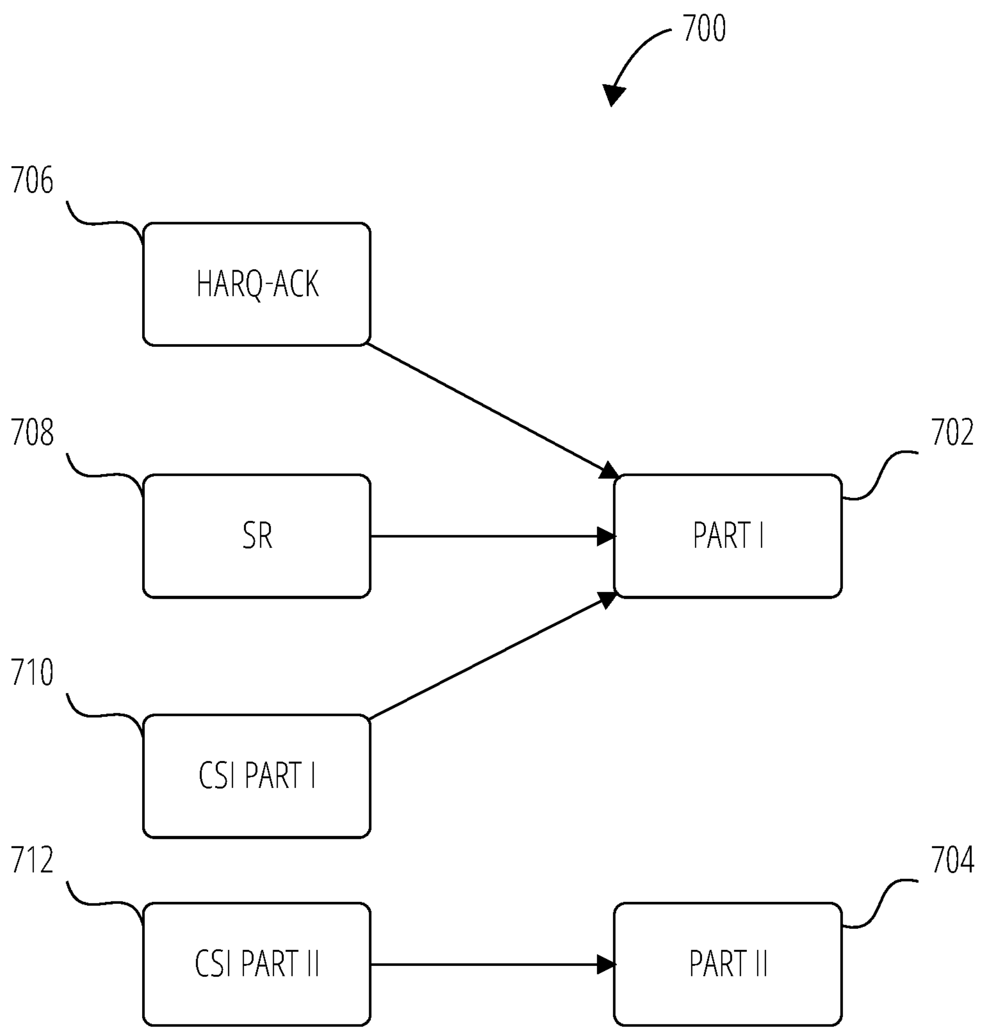
FIG. 7 illustrates a UCI mapping over PUCCH for two-part CSI, according to an embodiment.

FIG. 7 illustrates a UCI mapping 700 over PUCCH for two-part CSI, according to an embodiment. The 700 includes a UCI part I 702 and a UCI part II 704. As can be seen, HARQ-ACK 706, SR 708, and CSI Part 1 710 are mapped to UCI part I 702, while CSI part 2 712 is mapped to UCI part II 704.

In some wireless communication systems, two sequences may be defined for the case of two part CSI. For example, in some wireless communication systems, it may be that if at least one of the CSI reports for transmission on a PUCCH is of two parts, two UCI bit sequences are generated, $$a_0^{(1)}, a_1^{(1)}, a_2^{(1)}, a_3^{(1)}, \ldots, a_{A^{(1)}-1}^{(1)} \text{ and } a_0^{(2)}, a_1^{(2)}, a_2^{(2)}, a_3^{(2)}, \ldots, a_{A^{(2)}-1}^{(2)},$$

according to the following, where $A^{(1)}=O^{ACK}=O^{SR}=O^{CSI\text{-}part1}$ and $A^{(2)}=O^{CSI\text{-}part2}$". It is contemplated that in some cases, $$a_0^{(1)}, a_1^{(1)}, a_2^{(1)}, a_3^{(1)}, \ldots, a_{A^{(1)}-1}^{(1)} \text{ and } a_0^{(2)}, a_1^{(2)}, a_2^{(2)}, a_3^{(2)}, \ldots, a_{A^{(2)}-1}^{(2)},$$

may be populated in a different way.

Similarly, when one UCI bit sequence is generated, (as may be the case in some wireless communication systems), then the manner of populating the UCI bit sequence is relevant.

In an example wireless communication system implementing NR, it may be that 5 PUCCH formats are specified. One option for the support of joint encoding and separate encoding of UCIs in such cases is shown in Table 6 below.

TABLE 6

| Options for UCI Encoding | | | |
|---|---|---|---|
| | PUCCH Format 2 | PUCCH Format 3 | PUCCH Format 4 |
| Joint encoding of UCIs | X | X | X |
| Separate encoding of UCIs | | X | X |

Further, it may be that in this case, for PUCCH Format 0, joint encoding of HARQ-ACK and SR is supported, and that with PUCCH Format 1, channel selection is used to support the signaling of SR and HARQ-ACK, while on the PUCCH itself, only HARQ-ACK is carried. In such a case, it may be that the issue of whether and/or how to support HP/LP UCIs over PUCCH 1 may not be defined.

Finally, in this case, as can be seen in Table 6, for PUCCH Format 2, two part CSI may not be supported (meaning that only joint encoding of UCIs is supported over PUCCH format 2).

9.1 Separate Encoding HP HARQ-ACK and LP HARQ-ACK

Figure 8:
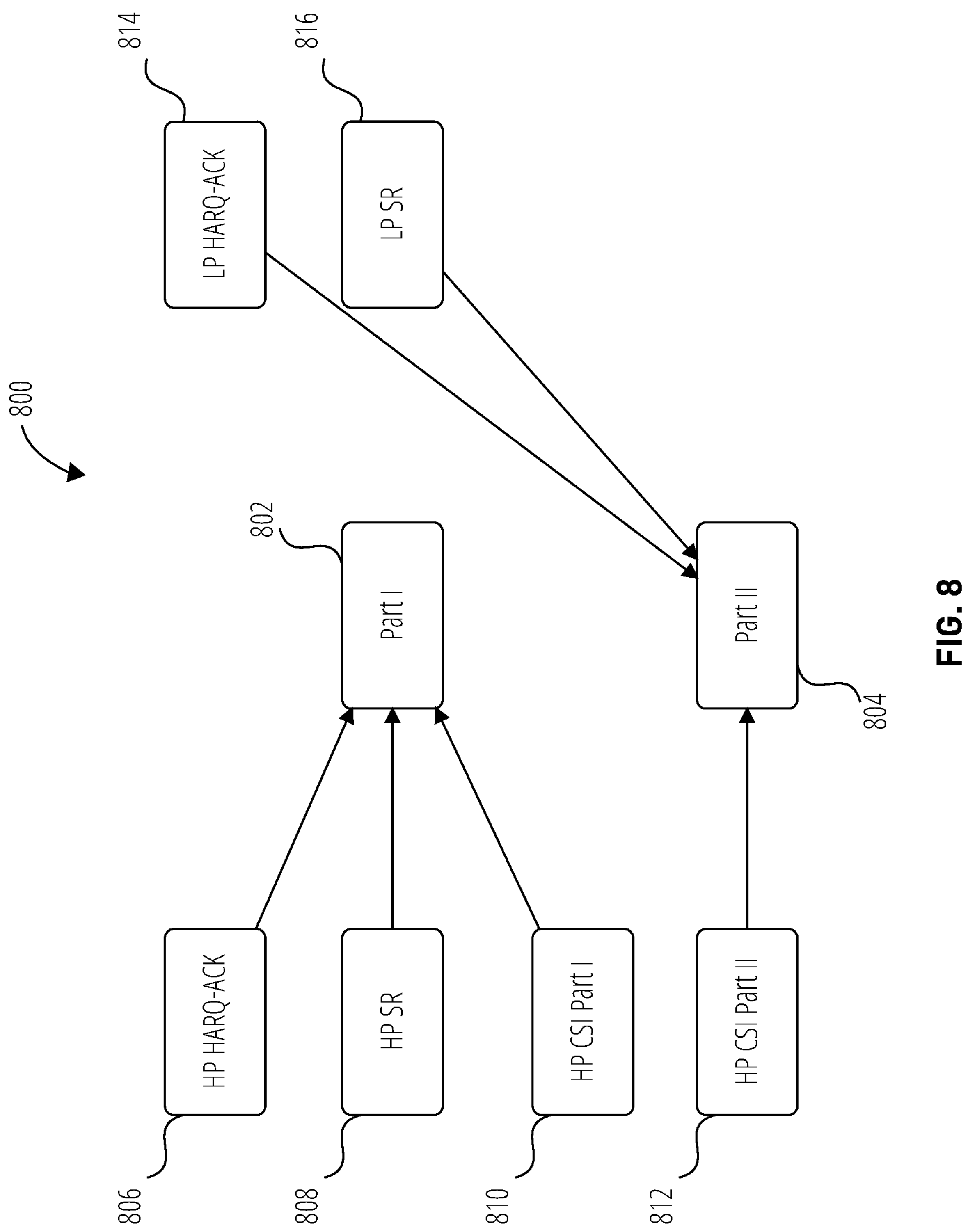
FIG. 8 illustrates an option for separate encoding of HP HARQ-ACK and LP HARQ-ACK, according to embodiments herein.

FIG. 8 illustrates an option 800 for separate encoding of HP HARQ-ACK 806 and LP HARQ-ACK 814, according to embodiments herein. The encoding may use UCI part I 802 and UCI part II 804. As illustrated, the HP HARQ-ACK 806, the HP SR 808, and the CSI part 1 810 may be placed in the UCI part I 802. Further, as illustrated, the CSI part II 812, the LP HARQ-ACK 814, and the LP SR 816 may be placed in the UCI part II 804.

As noted herein, in some wireless communication networks, UCI part I and UCI part II roughly have the same coding rate. Further, as discussed herein, one reason for separate encoding is that different coding rates can be applied to HP HARQ-ACK and LP HARQ-ACK.

Note that in any particular case, not all the UCIs may be present. Further, it may be that CSI feedback can be assumed at LP. In some wireless communication networks, if inter-layer 1 (L1) priority UCI multiplexing is limited to HARQ-ACK and SR, then CSI part I and CSI part II are both absent in the UCI multiplexing as shown in FIG. 9.

Figure 9:
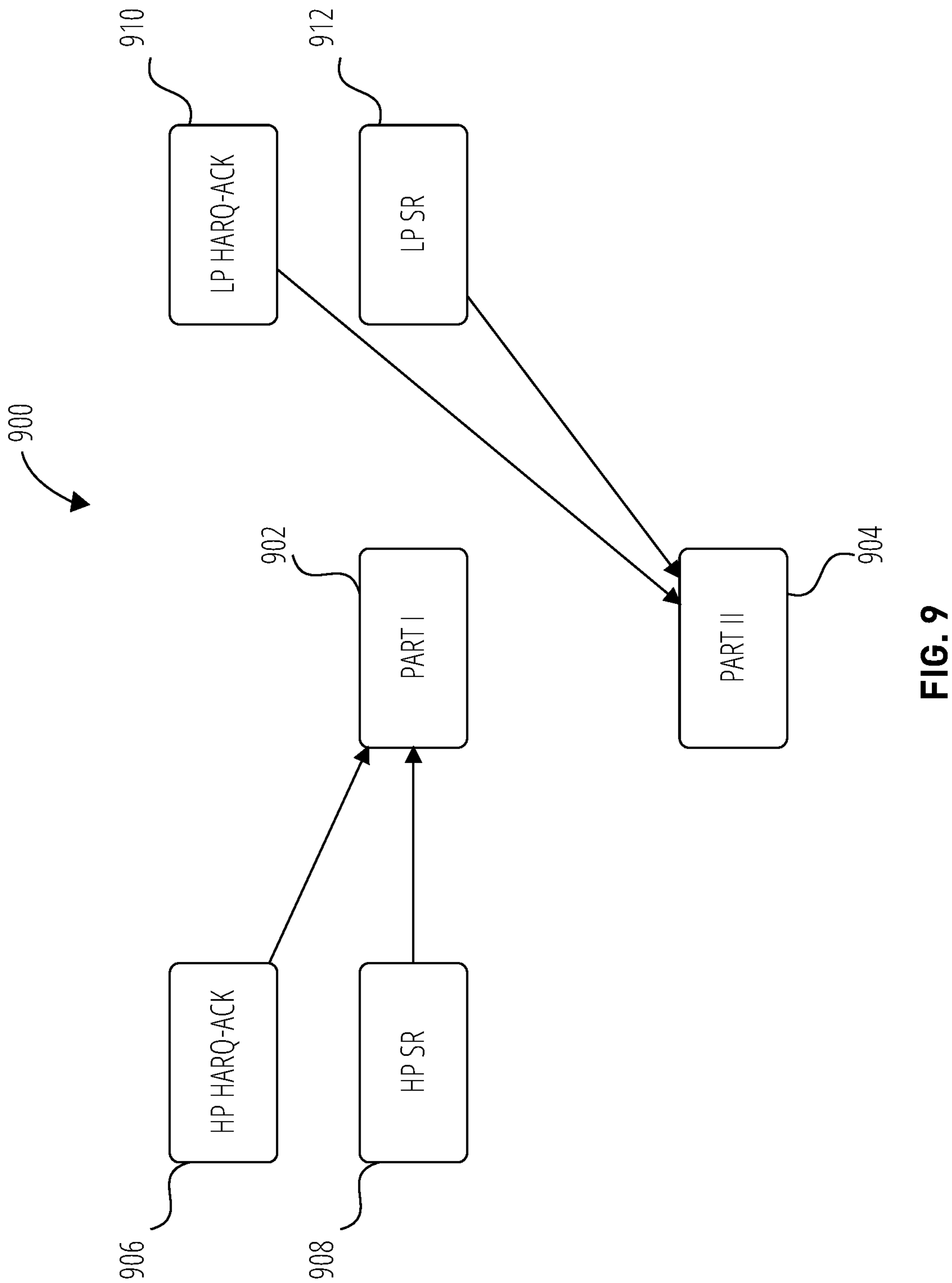
FIG. 9 illustrates an option for separate encoding of HP HARQ-ACK and LP HARQ-ACK, according to embodiments herein.

FIG. 9 illustrates an option 900 for separate encoding of HP HARQ-ACK 906 and LP HARQ-ACK 910, according to embodiments herein. The encoding may use UCI part I 902 and UCI part II 904. As illustrated, the HP HARQ-ACK 906 and the HP SR 908 may be placed in the UCI part I 902. Further, as illustrated, the LP HARQ-ACK 910 and the LP SR 912 may be placed in the UCI part II 904.

FIG. 10 illustrates a table 1000 for a first option for UCI mapping for separate encoding of HP HARQ-ACK and LP HARQ-ACK when $$R_{UCI}^{max} = r_1,$$

according to an embodiment.

FIG. 11 illustrates a table 1100 for UCI mapping for a second option for UCI mapping for separate encoding of HP HARQ-ACK and LP HARQ-ACK when $$R_{UCI}^{max} = r_1,$$

according to an embodiment.

In some embodiments, LP HARQ-ACK may be mapped to UCI Part II in a separate encoding by adopting the UCI mapping in table 900 or table 1000. In some wireless communication networks, PUCCH Format 2 does not support two part CSI (e.g., only joint encoding of UCIs is supported).

Herein, a pair of options for supporting HP HARQ-ACK/LP HARQ-ACK multiplexing over PUCCH format 2 are contemplated.

In a first option, two encoded sequences for HP-ACK (encoded with $r_1$) and LP-ACK (encoded with $r_2$) are separately generated, and then those two encoded sequences are concatenated into one encoded sequence $$a_0^{(1)}, a_1^{(1)}, a_2^{(1)}, a_3^{(1)}, \ldots, a_{A^{(1)}-1}^{(1)}.$$

In this first option, UCI mapping is not changed for PUCCH Format 2.

In a second option, support for joint encoding of HP-ACK and LP-ACK is provided for PUCCH format 2.

9.2 Joint Encoding HP HARQ-ACK and LP HARQ-ACK

FIG. 12 illustrates an option 1200 for separate encoding of elements of UCI, according to embodiment herein. The encoding may use UCI part I 1202 and UCI part II 1204. As illustrated, the HP HARQ-ACK 1206, the HP SR 1208, the CSI part 1 1210, the LP HARQ-ACK 1212, and the LP SR 1214 may be placed in the UCI part I 1202. Further, as illustrated, the CSI part II 1216 may be placed in the UCI part II 1204.

Discussion herein may relate to the determination of whether joint encoding or separate encoding is used to in a case where there is one LP UCI bit and one HP UCI bit. It may be that the case of joint encoding can be considered 2 bits UCI. Further, for UCI multiplexing over PUCCH Format 2, it may be that joint encoding of HP HARQ-ACK/LP HARQ-ACK for PUCCH Format 2 is used.

With joint encoding, the above mapping illustrated in FIG. 12 can be considered. A UCI payload is divided into two parts, UCI part I and UCI part II. In some wireless communication networks, CSI part I and CSI part II have roughly the same coding rate. However, the use of inter-L1 priority multiplexing may motivate the use of different coding rates for Part I and part II.

Note that in any particular case, not all the UCIs may be present. Further, it may be that CSI feedback can be assumed at LP. In some wireless communication networks, if inter-L1 priority UCI multiplexing is limited to HARQ-ACK and SR, then CSI part I and CSI part II are both absent in the UCI multiplexing as shown in FIG. 13.

FIG. 13 illustrates an option 1300 for joint encoding of HP HARQ-ACK and SR, according to embodiments herein. The encoding may use a single part of UCI 1302. As illustrated, the HP HARQ-ACK 1304, the HP SR 1306, the LP HARQ-ACK 1308, and the LP SR 1310 may each be placed in the single part of UCI 1302.

FIG. 14 illustrates a table 1400 for an option for UCI encoding when $$R_{UCI}^{max} = r_1,$$

according to an embodiment.

10 UCI MULTIPLEXING OVER PUSCH

In some wireless communication networks implementing UCI multiplexing over PUSCH, depending on the number of HARQ-ACK bits, puncturing or rate matching is used for HARQ-ACK bits.

As PUSCH does not carry SR, the UCI types in such cases are limited to HARQ-ACK and CSI. When both HARQ-ACK and CSI feedback are present, then a three part UCI multiplexing scheme is used.

It has been recognized that the CSI encoding/multiplexing processes of some wireless communication networks may be considered almost as functions in a programming language, and that with proper adaption of the inputs to these "functions," extensions to those designs can be obtained.

FIG. 15 illustrates an option 1500 for mapping UCIs to 3 parts in UCI multiplexing over PUSCH, according to embodiments herein. The encoding may use UCI part 0 1502, UCI part I 1504 and UCI part II 1506. As illustrated, the HARQ-ACK 1508 may be placed in the UCI part 0 1502. Further, as illustrated, the CSI part I 1510 may be placed in the UCI part I 1504. Finally, the CSI part II 1512 may be placed in the UCI part II 1506.

Some wireless communication systems use mapping rules for HARQ-ACK, CSI Part I and CSI part II over PUSCH.

For example, for some NR network, such rules are specified in 3GPP TS 38.212 version 16.4.0 (January 2021), e.g. in Clause 6.2.7.

For example, some wireless communication systems may denote the coded bits for UL-SCH as $$g_0^{UL-SCH}, g_1^{UL-SCH}, g_2^{UL-SCH}, g_3^{UL-SCH}, \ldots, g_{G^{UL-SCH}-1}^{UL-SCH}.$$

Further, the coded bits for HARQ-ACK or jointly coded bits for HARQ-ACK and CG-UCI when the high layer parameter cg-UCI-Multiplexing is configured, if any, are denoted as $$g_0^{ACK}, g_1^{ACK}, g_2^{ACK}, g_3^{ACK}, \ldots, g_{G^{ACK}-1}^{ACK}.$$

The coded bits for CSI part 1, if any, are denoted as $$g_0^{CSI-part1}, g_1^{CSI-part1}, g_2^{CSI-part1}, g_3^{CSI-part1}, \ldots, g_{G^{CSI-part1}-1}^{CSI-part1}.$$

he coded bits for CSI part 2, if any, are denoted as $$g_0^{CSI-part2}, g_1^{CSI-part2}, g_2^{CSI-part2}, g_3^{CSI-part2}, \ldots, g_{G^{CSI-part2}-1}^{CSI-part2}.$$

The coded bits for CG-UCI without HARQ-ACK, if any, are denoted as $$g_0^{CG-UCI}, g_1^{CG-UCI}, g_2^{CG-UCI}, g_3^{CG-UCI}, \ldots, g_{G^{CG-UCI}-1}^{CG-UCI}.$$

The multiplexed data and control coded bit sequence is denoted as $g_0, g_1, g_2, g_3, \ldots, g_{G-1}$. "Then the resources taken by HARQ-ACK and/or CG-UCI $$\left(g_0^{ACK}, g_1^{ACK}, g_2^{ACK}, g_3^{ACK}, \ldots, g_{G^{ACK}-1}^{ACK} \text{ or } g_0^{ACK}, g_1^{ACK}, g_2^{ACK}, g_3^{ACK}, \ldots, g_{G^{ACK}-1}^{ACK}\right),$$

CSI Part I $$\left(g_0^{CSI-part1}, g_1^{CSI-part1}, g_2^{CSI-part1}, g_3^{CSI-part1}, \ldots, g_{G^{CSI-part1}-1}^{CSI-part1}\right)$$

and CSI part II $$\left(g_0^{CSI-part2}, g_1^{CSI-part2}, g_2^{CSI-part2}, g_3^{CSI-part2}, \ldots, g_{G^{CSI-part2}-1}^{CSI-part2}\right)$$

are denoted as UCI Part 0, UCI Part I and UCI part II respectively. Then by subsequently creating mapping rules, it may be that mapping rules for HARQ-ACK, CSI Part I, CSI part II as understood in some wireless communication systems can be reused for UCI Part 0, UCI part I and UCI Part II.

Note that it may be understood that CG-UCI is mapped to UCI Part 0 in some cases.

With proposed solutions below, UCIs in UCI Part 0 populate a sequence in replacement of $$g_0^{ACK}, g_1^{ACK}, g_2^{ACK}, g_3^{ACK}, \ldots, g_{G^{ACK}-1}^{ACK},$$

UCIs in UCI Part I populate a sequence in replacement of $$g_0^{CSI-part1}, g_1^{CSI-part1}, g_2^{CSI-part1}, g_3^{CSI-part1}, \ldots, g_{G^{CSI-part1}-1}^{CSI-part1},$$

UCIs in UCI Part II populate a sequence in replacement of $$g_0^{CSI-part2}, g_1^{CSI-part2}, g_2^{CSI-part2}, g_3^{CSI-part2}, \ldots, g_{G^{CSI-part2}-1}^{CSI-part2}.$$

10.1 Mapping of UCIs to UCI Parts Over PUSCH

In some embodiments, LP HARQ-ACK can be mapped to UCI Part I or UCI Part II. FIG. 16 illustrates an option 1600 for separate encoding of HP HARQ-ACK 1608 and LP HARQ-ACK 1614, according to embodiments herein. A PUCCH may use UCI part 0 1602, UCI part I 1604 and UCI part II 1606. As illustrated, the HP HARQ-ACK 1608 may be placed in the UCI part 0 1602, the CSI part I 1610 may be placed in the UCI part I 1604, and the CSI part II 1612 may be placed in the UCI part II 1606.

The 1600 also includes the LP HARQ-ACK 1614. In a first case, if the LP HARQ-ACK 1614 is mapped to UCI Part I (shown by the solid line from the LP HARQ-ACK 1614 to the UCI Part I 1604), then the encoding sequence is CSI Part I>LP HARQ-ACK if CSI Part I contains HP CSI; otherwise the encoding sequence is LP HARQ-ACK>CSI Part I.

In a second case, if the LP HARQ-ACK 1614 mapped to UCI Part II (shown by the dashed line from the LP HARQ-ACK 1614 to the UCI Part II 1606), then the encoding sequence is CSI Part II>LP HARQ-ACK if CSI Part II contains HP CSI; otherwise LP HARQ-ACK>CSI Part II can be used.

Note that in some embodiments, even on LP PUSCH, LP HARQ-ACK is bumped to Part I or Part II once HP HARQ-ACK is present.

To avoid complicated CSI omission rules, with a consideration similar to that on UCI multiplexing on PUCCH, it may be that LP CSI can be dropped once HP CSI is present.

There may be benefits to mapping LP HARQ-ACK to UCI part I. It may be as a general matter that UCI part I tends to be better protected than UCI part II. Accordingly, mapping LP HARQ-ACK to UCI Part I may give better protection to LP HARQ-ACK than mapping LP HARQ-ACK to UCI Part II.

Alternatively, there may be benefits to mapping LP HARQ-ACK to UCI part II. In some wireless communication systems, CSI omission is applied on UCI PART II. Accordingly, to minimize changes in such implementations, it may be that LP HARQ-ACK can be mapped to Part II in all cases (irrespective of whether LP PUSCH or HP PUSCH carries mixed UCIs including LP-HARQ-ACK). In such a circumstance, tasks of CSI omission and HARQ-ACK omission/compaction can be conducted on a single UCI part instead of being spread to multiple UCI parts. Hence it may be the case that HP HARQ-ACK is mapped to Part 0, Part I is empty, LP HARQ-ACK is over Part II.

Considering there may be important HP AP CSI carried in UCI part I, mapping LP HARQ-ACK into UCI Part II may have less of an impact to HP UCIs than mapping LP HARQ-ACK into UCI Part I.

TABLE 7

| | UCI multiplexing over HP PUSCH | | | |
|---|---|---|---|---|
| | HP CSI is present | | HP CSI is absent | |
| | HP PUSCH (Alt. 1) | HP PUSCH (Alt. 2) | HP PUSCH (Alt. 1) | HP PUSCH (Alt. 2) |
| UCI Part 0 | HP HARQ-ACK | HP HARQ-ACK | HP HARQ-ACK | HP HARQ-ACK |
| UCI Part I | HP CSI Part I, LP HARQ-ACK | HP CSI Part I | LP HARQ-ACK | |
| UCI Part II | HP CSI Part II | HP CSI Part II, LP-HARQ-ACK | | LP-HARQ-ACK |

Note 1:
if HP CSI consists of a single part, then HP CSI part II is absent
Note 2:
If CG-UCI is present, it is carried in UCI Part 0

TABLE 8

| | UCI multiplexing over LP PUSCH | | | | | |
|---|---|---|---|---|---|---|
| | HP CSI is present | | Both HP CSI and LP CSI are absent | | HP CSI is absent, and LP CSI is present. | |
| | LP PUSCH (Alt. 1) | LP PUSCH (Alt. 2) | LP PUSCH (Alt. 1) | LP PUSCH (Alt. 2) | LP PUSCH (Alt. 1) | LP PUSCH (Alt. 2) |
| UCI Part 0 | HP HARQ-ACK | HP HARQ-ACK | HP HARQ-ACK | HP HARQ-ACK | HP HARQ-ACK | HP HARQ-ACK |
| UCI Part I | HP CSI Part I, LP HARQ-ACK | HP CSI Part I | LP HARQ-ACK | | LP HARQ-ACK, LP CSI Part I | LP CSI Part I |
| UCI Part II | HP CSI Part II | HP CSI Part II, LP-HARQ-ACK → (discard LP-HARQ-ACK first) | | LP-HARQ-ACK | LP CSI Part II | LP-HARQ-ACK, LP CSI Part II, → (discard LP CSI first) |

Note 1:
if HP CSI consists of a single part, then HP CSI part II is absent.
Note 2:
If CG-UCI is present, it is carried in UCI Part 0

FIG. 17 illustrates an option 1700 for separate CSI treatment, according to embodiments herein. An encoding may use UCI part 0 1702, UCI part I 1704 and UCI part II 1706. As illustrated, a HP HARQ-ACK 1708 may be placed in the UCI part 0 1702. Further, as illustrated, the HP CSI part I 1710 and the LP CSI part 1 1712 may be placed in the UCI part I 1704. Then, the HP CSI part II 1714 and the LP CSI part II 1716 may be placed in the UCI part II 1706. The LP HARQ-ACK 1718 may be placed in either UCI part I 1704 or the UCI part II 1706.

FIG. 18 illustrates an option for separate CSI treatment, according to embodiments herein. An encoding may use UCI part 0 1802, UCI part I 1804 and UCI part II 1806. As illustrated, a HP HARQ-ACK 1808 may be placed in the UCI part 0 1802. Further, as illustrated, the HP CSI part I 1810 and the LP HARQ-ACK 1812 may be placed in the UCI part I 1804. Finally, the HP CSI part II 1814 may be placed in the UCI part II 1806.

11. PUSCH RESOURCE DETERMINATION (αAND/β) FOR UCI MULTIPLEXING

11.1 Rel-15/16 Design Review

11.1.1 BetaOffsets

In certain wireless systems, the RRC configuration for BetaOffsets (see, e.g., TS 38.331) is shown below:

```
BetaOffsets ::= SEQUENCE {
betaOffsetACK-Index1 INTEGER(0..31) OPTIONAL, -- Need S
betaOffsetACK-Index2 INTEGER(0..31) OPTIONAL, -- Need S
betaOffsetACK-Index3 INTEGER(0..31) OPTIONAL, -- Need S
betaOffsetCSI-Part1-Index1 INTEGER(0..31) OPTIONAL, -- Need S
betaOffsetCSI-Part1-Index2 INTEGER(0..31) OPTIONAL, -- Need S
betaOffsetCSI-Part2-Index1 INTEGER(0..31) OPTIONAL, -- Need S
betaOffsetCSI-Part2-Index2 INTEGER(0..31) OPTIONAL-- Need S
}
```

BetaOffsets field descriptions include betaOffsetACK-Index1: Up to 2 bits HARQ-ACK (see TS 38.213, clause 9.3). When the field is absent, the UE applies the value 11.

For the BetaOffsets field betaOffsetACK-Index2: Up to 11 bits HARQ-ACK (see TS 38.213, clause 9.3). When the field is absent, the UE applies the value 11.

For the BetaOffsets field betaOffsetACK-Index3: Above 11 bits HARQ-ACK (see TS 38.213, clause 9.3). When the field is absent, the UE applies the value 11.

For the BetaOffsets field betaOffsetCSI-Part1-Index1: Up to 11 bits of CSI part 1 bits (see TS 38.213 [13], clause 9.3). When the field is absent, the UE applies the value 13.

For the betaOffsetCSI-Part1-Index2: Above 11 bits of CSI part 1 bits (see TS 38.213, clause 9.3). When the field is absent, the UE applies the value 13.

For the betaOffsetCSI-Part2-Index1: Up to 11 bits of CSI part 2 bits (see TS 38.213, clause 9.3). When the field is absent, the UE applies the value 13.

For the betaOffsetCSI-Part2-Index2: Above 11 bits of CSI part 2 bits (see TS 38.213, clause 9.3). When the field is absent, the UE applies the value 13.

11.1.2 BetaOffsets for CG PUSCH and DG PUSCH

In certain wireless systems, an information element (IE) for a configured grant configuration is given by:

```
ConfiguredGrantConfig ::= SEQUENCE {...
uci-OnPUSCH SetupRelease { CG-UCI-OnPUSCH } OPTIONAL, --
Need M...
betaOffsetCG-UCI-r16 INTEGER (0.. 31) OPTIONAL, -- Need R
...
}
CG-UCI-OnPUSCH ::= CHOICE {
dynamic SEQUENCE (SIZE (1..4)) OF BetaOffsets,
semiStatic BetaOffsets
}
```

Note on "uci-OnPUSCH": Selection between and configuration of dynamic and semi-static beta-offset. For Type 1 UL data transmission without grant, uci-OnPUSCH should be set to semiStatic. An IE for betaOffsetCG-UCI may be given by:

```
betaOffsetCG-UCI
Beta offset for CG-UCI in CG-PUSCH, (see TS 38.213, clause 9.3)
PUSCH-Config ::= SEQUENCE {...
uci-OnPUSCH SetupRelease { UCI-OnPUSCH} OPTIONAL, -- Need
M...
uci-OnPUSCH-ListForDCI-Format0-2-r16 SetupRelease
{ UCI-OnPUSCH-ListForDCI-Format0-2-r16} OPTIONAL, -- Need M...
uci-OnPUSCH-ListForDCI-Format0-1-r16 SetupRelease
{ UCI-OnPUSCH-ListForDCI-Format0-1-r16 } OPTIONAL, -- Need M
}
```

Note on uci-OnPUSCH-ListDCI-0-1, uci-OnPUSCH-ListDCI-0-2: Configuration for up to 2 HARQ-ACK codebooks specific to DCI format 0_1/0_2.

The field uci-OnPUSCH-ListDCI-0-1 applies to DCI format 0_1 and the field uci-OnPUSCHListDCI-0-2 applies to DCI format 0_2 (see TS 38.212, clause 7.3.1 and TS 38.213, clause 9.3). An IE for UCI-OnPUSCH may be given by:

```
UCI-OnPUSCH ::= SEQUENCE {
betaOffsets CHOICE {
dynamic SEQUENCE (SIZE (4)) OF BetaOffsets,
semiStatic BetaOffsets
} OPTIONAL, -- Need M
scaling ENUMERATED { f0p5, f0p65, f0p8, f1 }
}
UCI-OnPUSCH-ListForDCI-Format0-2-r16 ::= SEQUENCE (SIZE (1..2))
OF UCI-OnPUSCH-ForDCI-Format0-2-r16
UCI-OnPUSCH-ListForDCI-Format0-1-r16 ::= SEQUENCE (SIZE (1..2))
OF UCI-OnPUSCH
UCI-OnPUSCH-ForDCI-Format0-2-r16 ::= SEQUENCE {
betaOffsetsForDCI-Format0-2-r16 CHOICE {
dynamicForDCI-Format0-2-r16 CHOICE {
oneBit-r16 SEQUENCE (SIZE (2)) OF BetaOffsets,
twoBits-r16 SEQUENCE (SIZE (4)) OF BetaOffsets
},
semiStaticForDCI-Format0-2-r16 BetaOffsets
} OPTIONAL, -- Need M
  scalingForDCI-Format0-2-r16 ENUMERATED { f0p5, f0p65, f0p8, f1
  }
}
```

11.1.3 Summary on Rel-15/16 Design for BetaOffsets

For DG PUSCH, in certain wireless systems, for the non-fallback DCIs (0-1/0-2), if physical layer priority is configured (priorityIndicatorDCI-0-1/priorityIndicatorDCI-0-2), then there can be one set of beta offsets for semi-static signaling of beta offsets, and there can be up to 4 sets of betaoffsets for dynamic signaling of beta offsets. Note that each set of beta offsets can include 3 beta offsets for HARQ-ACK (for 3 ranges: up to 2 bits, 3 bits to 11 bits, and more than 11 bits), 2 offsets for CSI Part I (for 2 cases: up to 11 bits, and more than 11 bits), and 2 offsets for CSI Part II (for 2 cases: up to 11 bits, and more than 11 bits).

For CG PUSCH, in certain wireless systems, similar to DG PUSCH, UCIs over CG PUSCH can be supported, and its signaling design in Rel-15 is similar to that for DG's. Further CG-UCI's beta offsets can be configured through RRC signaling.

The coding rate for UCI Part 0 (the part taken by HARQ-ACK) is determined according to the configured beta offsets set(s) and dynamic signaling if present.

For UCI part 0, the determination of $$\beta_{offset}^{PUSCH}$$

can be summarized as below:

HARQ-ACK only over PUSCH with UL-SCH or without UL-SCH (see, e.g., clause 6.3.2.4.1.1):

$$\beta_{offset}^{PUSCH}=\beta_{offset}^{HARQ-ACK};$$

CG-UCI over PUSCH with UL-SCH (see, e.g., 6.3.2.4.1.4 CG-UCI):

$$\beta_{offset}^{PUSCH}=\beta_{offset}^{CG-UCI};$$

HARQ-ACK and CG-UCI over PUSCH with UL-SCH (see, e.g., 6.3.2.4.1.5 HARQ-ACK and CG-UCI):

$$\beta_{offset}^{PUSCH}=\beta_{offset}^{HARQ-ACK};$$

For UCI part 1, the determination of $$\beta_{offset}^{PUSCH}$$

is as follows:

CSI part I over PUSCH with UL-SCH or without UL-SCH: (see, e.g., clause 6.3.2.4.1.2):

$$\beta_{offset}^{PUSCH}=\beta_{offset}^{CSI-part1};$$

For UCI part 2, the determination of $$\beta_{offset}^{PUSCH}$$

is as follows:

CSI part II over PUSCH with UL-SCH or without UL-SCH (see, e.g., 6.3.2.4.1.3 CSI part 2):

$$\beta_{offset}^{PUSCH}=\beta_{offset}^{CSI-part2};$$

note $$\beta_{offset}^{PUSCH}$$

is not used for CSI part II over PUSCH without UL-SCH.

11.1.4 Summary on Rel-15/16 Design for Alpha

In certain wireless systems, the determination of the alpha offset, α, is according to scaling in the RRC signaling.

The information bits or payload for UCI part 0 correspond to HARQ-ACK or CG-UCI or HARQ-ACK+CG-CGI in Rel-16, for UCI part I correspond to CSI part I in Rel-16, and for UCI part II correspond to CSI part II in Rel-16).

11.2 Example Embodiments for Alpha and Beta Offsets

In certain wireless systems, if there is no inter-L1 priority UCI multiplexing, the Rel-16 behavior may be retained. If there is inter-L1 priority UCI multiplexing, a and/or R may be modified accordingly.

According to certain UCI mappings, UCI part II may have only 1 bit (e.g. 1 bit for LP HARQ-ACK). In this case, it may be possible to develop a new coding scheme, e.g., by using the physical control format indicator channel (PCFICH) code design from LTE, or through padding or repetition: with padding, [X00] for 1 bit [XY 0] for 2 bits (X and Y are HARQ-ACK bits) can be fed to the Reed-Muller code. Through repetition is also possible: [XXX], or [XX], or [X0X] or [ . . . X0 . . . X . . . ] (mapping two occurrence of X's to two positions for example) can be considered. A new channel coding scheme can be also considered.

In this case, irrespective of how 1 or 2 bits for HARQ-ACK is handled over UCI Part I and UCI Part II is handled, it may be necessary to introduce a new p offset for up to Z bits for UCI Part I and/or UCI part II (Z=1 or Z=2 for example), then an IE under BetaOffsets can be introduced for up to Z bits such as betaOffsetCSI-Part1-Index3 INTEGER(0 . . . 31) OPTIONAL—Need S for LP HARQ-ACK mapping Alt. 1; or betaOffsetCSI-Part2-Index3 INTEGER(0 . . . 31) OPTIONAL—Need S for LP HARQ-ACK mapping Alt. 2.

With LP HARQ-ACK mapping Alt. 1, according to certain embodiments disclosed herein, the revised BeatOffsets set is as follows:

```
BetaOffsets ::= SEQUENCE {
betaOffsetACK-Index1 INTEGER(0..31) OPTIONAL, -- Need S
betaOffsetACK-Index2 INTEGER(0..31) OPTIONAL, -- Need S
betaOffsetACK-Index3 INTEGER(0..31) OPTIONAL, -- Need S
betaOffsetCSI-Part1-Index1 INTEGER(0..31) OPTIONAL, -- Need S
betaOffsetCSI-Part1-Index2 INTEGER(0..31) OPTIONAL, -- Need S
betaOffsetCSI-Part1-Index3 INTEGER(0..31) OPTIONAL, -- Need S
betaOffsetCSI-Part2-Index1 INTEGER(0..31) OPTIONAL, -- Need S
betaOffsetCSI-Part2-Index2 INTEGER(0..31) OPTIONAL-- Need S
}
```

betaOffsetCSI-Part1-Index3

In certain embodiments, the field betaOffsetCSI-Part1-Index3 may comprise 1-2 bits of UCI part 1 bits (see, e.g., TS 38.213, clause 9.3). When the field is absent, the UE applies the value 13.

Note up to Rel-16, a or scaling may be semi-statically configured (separately for HP PUSCH and LP PUSCH). In the discussion below, it is assumed that the encoding of 1 or 2 bits UCI in Part I or Part II is with a solution already.

The UCI multiplexing resources can be fully determined once (β0, β1, β2, α) and the UCI encoding sequences are known which is treated above, where the beta offset for HARQACK/CG-UGI/(HARQ-ACK+CG-UCI) or UCI part 0 in Rel-16 corresponds to β0, and β1 is the beta offset for UCI part I, and β2 is the beta offset for UCI part II.

To make it easier to incorporate the specification change, certain embodiments categorize HARQ-ACK into Group-1-HARQ-ACK and Group-2-HARQ-ACK. For example, Group-1-HARQ-ACK is transmitted over UCI Part 0, Group-2-HARQACK is transmitted over UCI Part I or UCI part II.

Certain embodiments disclosed herein adapt beta offsets and alpha for different scenarios.

Legacy Scenarios

In certain embodiments, if there is no inter-L1 priority UCI multiplexing and the UCIs are of the same physical layer priority as PUSCH, the Rel-16 design is reused, which can be also formulated as (β0, β1, β2)=(betaOffsetHARQ-ACK or betaOffsetCG-UCI, betaOffsetCSI-part1, betaOffsetCSI-part2).

HP UCI Only Over LP PUSCH

For HP UCI over LP PUSCH, according to certain embodiments, a separate alpha can be semi-statically configured. It is also possible directly to assume α=1 in this case and using up all the resources for HP UCI may be a viable choice.

As for beta offsets, according to certain embodiments, there are two options.

Option 1: (β0, β1, β2) for HP UCIs over HP PUSCH can be re-used.

Option 2: up to 4 new beta offset sets can be specifically introduced for the case with HP UCI(s) over LP PUSCH.

If the LP PUSCH is a DG (dynamic Grant) PUSCH: beta_offset indicator in the DCI scheduling the LP PUSCH can be used to look up the set in either case. HP HARQ-ACK is Group-1-HARQ-ACK.

If the LP PUSCH is a CG (Configured Grant) PUSCH or PUSCH with SP-CSI, in certain embodiments, then an RRC configured (β0, β1, β2) and/or alpha can be used for Type 1 CG PUSCH, for Type 2 CG PUSCH. In addition, or in other embodiments, an RRC configured (β0, β1, β2) and/or alpha can be used or the dynamically indicated set at CG activation with beta_offset indicator can be used.

LP UCIs Only Over HP PUSCH

For LP UCIs over HP PUSCH, according to certain embodiments, a separate set of (β0, β1, β2, α), which can be different from the set for HP UCIs over HP PUSCH, can be used. For alpha, a separate alpha can be semi-statically configured for such a case. It is also possible directly to assume α=0.5 or even a smaller value.

As for beta offsets, according to certain embodiments, there are two options.

Option 1: (β0, β1, β2) for LP UCIs over LP PUSCH can be re-used.

Option 2: up to 4 new beta offset sets can be specifically introduced for the case with LP UCI(s) over HP PUSCH.

In addition, or in other embodiments, a beta_offset indicator can be used to look up the set in either case. LP HARQ-ACK is Group-2-HARQ-ACK, which can be mapped to UCI part I or UCI part II.

Mixed UCIs Over LP PUSCH

For mixed UCIs over LP PUSCH, certain embodiments may be similar to the case with HP UCIs only over LP PUSCH. In addition, certain embodiments may update betaOffsets for the UCI part(s) that carry HP UCIs. For example, β0 may be used for the HP HARQ-ACK over LP PUSCH, which is different from that configured for LP HARQ-ACK over LP PUSCH. However, β1 and β2 may remain the same as for LP CSIs over PUSCH if UCI part I and UCI part II do not carry any HP UCI. HP-ACK is Group-1-HARQ-ACK for rate matching. LP-ACK is Group-2-HARQ-ACK for rate-matching.

Mixed UCIs Over HP PUSCH

For mixed UCIs over HP PUSCH, according to certain embodiments, a can remain unchanged compared to the case with HP UCIs only over HP PUSCH, and beta offsets can remain unchanged also compared to the case with HP UCIs only over HP PUSCH. HP HARQ-ACK is Group-1-HARQ-ACK for rate matching. LP HARQ-ACK is Group-2-HARQ-ACK, which can be mapped to UCI part I or UCI part II.

In certain embodiments, the beta_offset indicator, the physical layer priority, and the types of UCI multiplexing (HP UCIs or LP UCIs or mixed UCIs, HARQ-ACK's presence, etc.) may be used to look up the beta offset set so the PRI field size does not need to be expanded. With that, four groups of beta Offsets sets can be supported.

Group 1: beta Offsets sets for LP UCIs (all UCIs are at LP) over LP PUSCH, as in the Rel-16 legacy design.

Group 2: beta Offsets sets for HP UCIs (all UCIs are at HP) over HP PUSCH, as in the Rel-16 legacy design.

Group 3: beta Offsets sets for UCI(s) with at least one UCI at HP over LP PUSCH.

Group 4: beta Offsets sets for UCI(s) with at least one UCI at LP over HP PUSCH.

Thus, for example, on a LP PUSCH with the presence of a HP UCI, Group 3 instead of Group 1 is selected. Similarly, on a HP PUSCH with the presence of a LP UCI, Group 4 instead of Group 2 is selected.

For DG PUSCH triggered by dynamic signaling with DCI format 0-2, two groups of beta offset sets are already supported in Rel-16 with regard to physical layer priority. In certain embodiments, the number of groups can be extended to 4 in Rel-17:

UCI-OnPUSCH-ListForDCI-Format0-2-r17:=SEQUENCE (SIZE (1.4)) OF UCI-OnPUSCH-ForDCI-Format0-2-r17.

A similar extension may be used, in certain embodiments, for DG PUSCH triggered by dynamic signaling with DCI format 0-1, and the number of groups is extended to four:

UCI-OnPUSCH-ListForDCI-Format0-1-r17:=SEQUENCE (SIZE (1.4)) OF UCI-OnPUSCH-r17.

In certain embodiments, UCI-OnPUSCH-r17 and UCI-OnPUSCH-ForDCI-Format0-2-r17 may have beta value less than 1 compared to their Rel-16 counterparts.

FIG. 19A and FIG. 19B illustrate betaOffset set selection at a PUSCH with a given physical layer priority. In FIG. 19A, when the UCI(s) have the same L1 priority as that of the PUSCH (e.g., HP UCI only over HP PUSCH, or LP UCI only over LP PUSCH), the UE may select from a first group 1902 of beta offset sets including beta offset set 1904 (Set 0), beta offset set 1906 (Set 1), beta offset set 1908 (Set 2), beta offset set 1910 (Set 3), and beta offset set 1912 (Set 4). In FIG. 19B, when at least one UCI has a different L1 priority as that of the PUSCH (e.g., at least one HP UCI over an LP PUSCH, or at least one LP PUSCH over an HP PUSCH), the UE may select from a second group 1914 of beta offset sets including beta offset set 1916 (Set 0A), beta offset set 1918 (Set 1A), beta offset set 1920 (Set 2A), beta offset set 1922 (Set 3A), and beta offset set 1924 (Set 4A).

The semi-static beta Offset set is shown as Set 0 and Set 0A in FIGS. 19A and 19B. The UE may use the beta_offset indicator value to select between Set 1, Set 2, Set 3, or Set 4 in FIG. 19A, or between Set 1A, Set 2A, Set 3A, or Set 4A in FIG. 19B. For the $\beta_1$ set, 3 values are given in FIGS. 19A and 19B to reflect the choice to map LP HARQ-ACK to UCI Part 1 and creating a beta offset for 1-2 LP HARQ-ACK bits as discussed above. The adaptation of mapping LP HARQ-ACK to UCI part II can lead to adding one value to the $\beta_2$ set. To reflect the situation that not all UCIs mapped to UCI part I or UCI part II are CSIs, in certain embodiments, the IE names can be modified, e.g. from "betaOffsetCSI-Part1-Index1" to "betaOffsetUCI-Part1-Index1", . . . , from "betaOffsetCSI-Part2-Index1" to "betaOffsetUCI-Part2-Index1", etc.

However, if the beta_offset indicator field size can be expanded, then in certain embodiments the selection of a beta set group can be explicitly indicated.

For a configured grant configuration, in certain embodiments, as the physical layer priority is configured as part of configured grant configuration, two groups of beta Offsets sets can be configured. One group of beta Offset sets may be configured for the case where all UCI(s) are of the same physical layer priority as the configured grant PUSCH. Another group of beta Offset sets may be configured for the case where at one UCI is of a different physical layer priority as the configured grant PUSCH.

12. EXAMPLE EMBODIMENTS

FIG. 20 illustrates a method 2000 of a user equipment, according to an embodiment. The method 2000 includes determining 2002 a first code rate, $r_1$, for a first portion of UCI.

The method 2000 further includes determining 2004 a second code rate, $r_2$, for a second portion of the UCI.

The method 2000 further includes determining 2006 a minimum number of physical resource blocks $$(PRBs),\ M_{RB,min}^{PUCCH},$$

of a PUCCH for transmitting the UCI based on $r_1$ and $r_2$.

The method 2000 further includes 2008 transmitting the UCI using the minimum number of PRBs $$M_{RB,min}^{PUCCH}.$$

In some embodiments of the method 2000, the first portion of the UCI comprises one or more HP HARQ-ACK bits; and the second portion of the UCI comprises one or more LP HARQ-ACK bits.

In some embodiments of the method 2000, the first portion of the UCI comprises one or more HP SR bits, and the second portion of the UCI comprises one or more low priority LP SR bits.

In some embodiments of the method 2000, $$M_{RB,min}^{PUCCH}$$

is determined based on $r_1$ and $r_2$ using a constraint $$\left(\sum_{n=1}^{N_{UCI-part2}^{total}} O_{UCI-part2,n} + O_{CRC,UCI-part2}\right)/(Q_m \cdot r_2) +$$

-continued $$\left(\sum_{n=1}^{N_{UCI-part1}^{total}} O_{UCI-part1,n} + O_{CRC,UCI-part1}\right)/(Q_m \cdot r_1) \le M_{RB,min}^{PUCCH} +$$

$$N_{sc,ctrl}^{RB} + N_{symb-UCI}^{PUCCH},\text{ where } \sum_{n=1}^{N_{UCI-part1}^{total}} O_{UCI-part1,n}$$

is a number of first payload bits of the first portion of the UCI, $O_{CRC,UCI-part1}$ is a number of first cyclic redundancy check (CRC) bits for the first portion of the UCI, $$\sum_{n=1}^{N_{UCI-part2}^{total}} O_{UCI-part2,n}$$

is a number of second payload bits of the second portion of the UCI, $O_{CRC,UCI-part2}$ is a number of second CRC bits for the second portion of the UCI, $Q_m$ is a parameter that is based on a modulation scheme used by the UE for PUCCH, $$N_{sc,ctrl}^{RB}$$

is a parameter that is based on a number of subcarriers per resource block excluding subcarriers used for demodulation reference signal (DM-RS) transmission, and $$N_{symb-UCI}^{PUCCH}$$

is a parameter that is based on a number of PUCCH symbols of the PUCCH excluding symbols used for DM-RS transmission.

In some embodiments of the method 2000, the PUCCH is of a PUCCH format corresponding to a high priority PUCCH configuration.

In some embodiments of the method 2000, one of the first portion of the UCI and the second portion of the UCI comprises CSI report bits.

FIG. 21 illustrates a method 2100 of a UE, according to an embodiment. The method 2100 includes encoding 2102 one or more HP HARQ-ACK bits into a first portion of UCI at a first code rate $r_1$.

The method 2100 further includes encoding 2104 one or more LP HARQ-ACK bits into a second portion of the UCI at a second code rate $r_1$.

The method 2100 further includes transmitting 2106 the UCI to a base station in a PUCCH.

In some embodiments, the method 2100 further includes encoding one or more HP SR request bits into the first portion of the UCI at the first code rate $r_1$.

In some embodiments, the method 2100 further includes encoding one or more LP SR request bits into the second portion of the UCI at the second code rate $r_2$.

In some embodiments, the method 2100 further includes encoding one or more CSI report bits into the first portion of the UCI at the first code rate $r_1$.

In some embodiments, the method 2100 further includes encoding one or more CSI report bits into the second portion of the UCI at the second code rate $r_2$.

In some embodiments, the method 2100 further includes determining a first rate matching output sequence length for the first portion of the UCI based on a number of the HP HARQ-ACK bits and a number of HP SR bits of the first portion of the UCI. In some of these embodiments the first rate matching output sequence length is further based on a number of channel state information (CSI) report bits in the first portion of the UCI. In some of these embodiments, the method 2100 further includes determining a second rate matching output sequence length for the second portion of UCI based on a difference between a total rate matching output sequent length minus the first rate matching output sequence length.

FIG. 22 illustrates a method 2200 of a UE, according to an embodiment. The method 2200 includes encoding 2202 one or more HP HARQ-ACK bits into UCI at a first code rate $r_1$.

The method 2200 further includes 2204 encoding one or more LP HARQ-ACK bits into the UCI at a second code rate $r_2$, wherein the LP HARQ-ACK bits are concatenated with the HP HARQ-ACK bits in the UCI.

The method 2200 further includes transmitting 2206 the UCI to a base station in a PUCCH.

FIG. 23 illustrates a method 2300 of a UE, according to an embodiment. The method 2300 includes encoding 2302 one or more HP HARQ-ACK bits into a first portion of UCI at a first code rate $r_1$.

The method 2300 further includes encoding 2304 one or more LP HARQ-ACK bits into a second portion of the UCI at a second code rate $r_2$.

The method 2300 further includes transmitting 2306 the UCI to a base station in a PUSCH.

In some embodiments of the method 2300, the PUSCH is a HP PUSCH that does not contain HP CSI report bits.

In some embodiments of the method 2300, the PUSCH is a LP PUSCH that does not contain either HP CSI report bits or LP CSI report bits.

FIG. 24 illustrates a method 2400 of multiplexing uplink control information (UCI) by a user equipment (UE) in a wireless communication system that includes a base station (BS).

The method 2400 is performed by the UE and includes determining 2402 a physical layer priority and a UCI multiplexing type, and selecting 2404 a selected group from among a plurality of groups of beta offset sets based on the physical layer priority and the UCI multiplexing type.

In some embodiments, the method 2400 further includes: for a dynamic grant (DG) physical uplink shared channel (PUSCH), determining a first beta offset, a second beta offset, and a third beta offset from the selected group based on a beta offset indicator value; and for a configured grant (CG) PUSCH, determining the first beta offset, the second beta offset, and the third beta offset from the selected group based on radio resource configuration (RRC) signaling from the base station.

In some embodiments, the method 2400 further includes: mapping, based at least in part on the first beta offset, the second beta offset, and the third beta offset, the UCI to UCI multiplexing resources; and transmitting, to the base station, the UCI using the UCI multiplexing resources via a physical uplink shared channel (PUSCH) corresponding to the physical layer priority.

In some embodiments of the method 2400, the mapping is further based on an alpha offset and one more UCI encoding sequences.

In some embodiments of the method 2400, when the UCI multiplexing type comprises a low priority (LP) UCI for all of the UCI and the physical layer priority comprises a LP PUSCH, the selected group comprises a first group of beta offset sets, and when the UCI multiplexing type comprises a high priority (HP) UCI for all of the UCI and the physical layer priority comprises a HP PUSCH, the selected group comprises a second group of beta offset sets.

In some embodiments of the method 2400, when the UCI multiplexing type comprises the HP UCI and the physical layer priority comprises the LP PUSCH, the selected group comprises a third group of beta offset sets. In certain such embodiments, for the third group of beta offset sets, the alpha offset is semi-statically configured. In other embodiments, for the third group of beta offset sets, the UE selects the alpha offset to be equal to one and all uplink resources are available for selecting the UCI multiplexing resources.

In some embodiments, the LP PUSCH comprises a dynamic grant (DG) PUSCH, and wherein the method 2400 further includes: determining the beta offset indicator value from downlink control information (DCI) scheduling the LP PUSCH; using the beta offset indicator value to lookup a set from among the third group of beta offset sets; and transmitting a HP hybrid automatic repeat request acknowledgement (HARQ-ACK) as a Group-1-HARQ-ACK over UCI Part 0.

In some embodiments of the method 2400, the LP PUSCH comprises a configured grant (CG) PUSCH or a PUSCH with semi-persistent channel state information (SP-CSI), the first beta offset, the second beta offset, the third beta offset, and the alpha offset are configured via radio resource control (RRC) signaling, and the method 2400 further comprises using the first beta offset, the second beta offset, the third beta offset, and the alpha offset for a Type 1 CG PUSCH.

In some embodiments of the method 2400, the LP PUSCH comprises a configured grant (CG) PUSCH or a PUSCH with semi-persistent channel state information (SP-CSI), and the method 2400 further comprises: using the first beta offset, the second beta offset, the third beta offset, and the alpha offset configured by radio resource control (RRC) signaling for a Type 2 CG PUSCH; or using a dynamically indicated set of the third group of beta offset sets for the Type 2 CG PUSCH, wherein the dynamically indicated set is indicated at CG activation with the beta offset indicator value.

In some embodiments, when the UCI multiplexing type further comprises LP UCI for at least one of the UCI, the method 2400 further comprises: transmitting an HP hybrid automatic repeat request acknowledgement (HARQ-ACK) as a Group-1-HARQ-ACK for rate matching; and transmitting an LP HARQ-ACK as a Group-2-HARQ-ACK for rate matching.

In some embodiments, when the UCI multiplexing type further comprises LP UCI for at least one of the UCI, the method 2400 further comprises: transmitting a concatenation of an HP hybrid automatic repeat request acknowledgement (HARQ-ACK) and configured grant UCI (CG-UCI) as a Group-1-HARQ-ACK for rate matching; and transmitting an LP HARQ-ACK as a Group-2-HARQ-ACK for rate matching.

In some embodiments of the method 2400, the UCI multiplexing type comprises the LP UCI and the physical layer priority comprises the HP PUSCH, the selected group comprises a fourth group of beta offset sets. In certain such embodiments, for the fourth group of beta offset sets, the alpha offset is semi-statically configured. In other embodiments, for the fourth group of beta offset sets, the UE selects the alpha offset to be less than or equal to 0.5.

In some embodiments, the method 2400 further includes: using the beta offset indicator value to lookup a set from among the fourth group of beta offset sets; and transmitting a LP hybrid automatic repeat request acknowledgement (HARQ-ACK) as a Group-2-HARQ-ACK mapped to UCI Part 1 or UCI part II.

In some embodiments, when the UCI multiplexing type further comprises HP UCI for at least one of the UCI, the method 2400 further comprises: transmitting an HP hybrid automatic repeat request acknowledgement (HARQ-ACK) as a Group-1-HARQ-ACK for rate matching; and transmitting an LP HARQ-ACK as a Group-2-HARQ-ACK for rate matching.

In some embodiments, when the UCI multiplexing type further comprises HP UCI for at least one of the UCI, the method 2400 further comprises: transmitting a concatenation of an HP hybrid automatic repeat request acknowledgement (HARQ-ACK) and configured grant UCI (CG-UCI) as a Group-1-HARQ-ACK for rate matching; and transmitting an LP HARQ-ACK as a Group-2-HARQ-ACK for rate matching.

In some embodiments, the method 2400 further includes mapping the Group-2-HARQ-ACK to a UCI part I or a UCI part II.

Embodiments contemplated herein include an apparatus comprising means to perform one or more elements of any of the methods 2000, 2100, 2200, 2300, and/or 2400. This apparatus may be, for example, an apparatus of a UE (such as a wireless device 2602 that is a UE, as described herein).

Embodiments contemplated herein include one or more non-transitory computer-readable media comprising instructions to cause an electronic device, upon execution of the instructions by one or more processors of the electronic device, to perform one or more elements of any of the methods 2000, 2100, 2200, 2300, and/or 2400. This non-transitory computer-readable media may be, for example, a memory of a UE (such as a memory 2606 of a wireless device 2602 that is a UE, as described herein).

Embodiments contemplated herein include an apparatus comprising logic, modules, or circuitry to perform one or more elements of any of the methods 2000, 2100, 2200, 2300, and/or 2400. This apparatus may be, for example, an apparatus of a UE (such as a wireless device 2602 that is a UE, as described herein).

Embodiments contemplated herein include an apparatus comprising: one or more processors and one or more computer-readable media comprising instructions that, when executed by the one or more processors, cause the one or more processors to perform one or more elements of any of the methods 2000, 2100, 2200, 2300, and/or 2400. This apparatus may be, for example, an apparatus of a UE (such as a wireless device 2602 that is a UE, as described herein).

Embodiments contemplated herein include a signal as described in or related to one or more elements of any of the methods 2000, 2100, 2200, 2300, and/or 2400.

Embodiments contemplated herein include a computer program or computer program product comprising instructions, wherein execution of the program by a processor is to cause the processor to carry out one or more elements of any of the methods 2000, 2100, 2200, 2300, and/or 2400. The processor may be a processor of a UE (such as a processor(s) 2604 of a wireless device 2602 that is a UE, as described herein). These instructions may be, for example, located in the processor and/or on a memory of the UE (such as a memory 2606 of a wireless device 2602 that is a UE, as described herein).

FIG. 25 illustrates an example architecture of a wireless communication system 2500, according to embodiments disclosed herein. The following description is provided for an example wireless communication system 2500 that operates in conjunction with the LTE system standards and/or 5G or NR system standards as provided by 3GPP technical specifications.

As shown by FIG. 25, the wireless communication system 2500 includes UE 2502 and UE 2504 (although any number of UEs may be used). In this example, the UE 2502 and the UE 2504 are illustrated as smartphones (e.g., handheld touchscreen mobile computing devices connectable to one or more cellular networks), but may also comprise any mobile or non-mobile computing device configured for wireless communication.

The UE 2502 and UE 2504 may be configured to communicatively couple with a RAN 2506. In embodiments, the RAN 2506 may be NG-RAN, E-UTRAN, etc. The UE 2502 and UE 2504 utilize connections (or channels) (shown as connection 2508 and connection 2510, respectively) with the RAN 2506, each of which comprises a physical communications interface. The RAN 2506 can include one or more base stations, such as base station 2512 and base station 2514, that enable the connection 2508 and connection 2510.

In this example, the connection 2508 and connection 2510 are air interfaces to enable such communicative coupling, and may be consistent with RAT(s) used by the RAN 2506, such as, for example, an LTE and/or NR.

In some embodiments, the UE 2502 and UE 2504 may also directly exchange communication data via a sidelink interface 2516. The UE 2504 is shown to be configured to access an access point (shown as AP 2518) via connection 2520. By way of example, the connection 2520 can comprise a local wireless connection, such as a connection consistent with any IEEE 802.11 protocol, wherein the AP 2518 may comprise a Wi-Fi® router. In this example, the AP 2518 may be connected to another network (for example, the Internet) without going through a CN 2524.

In embodiments, the UE 2502 and UE 2504 can be configured to communicate using orthogonal frequency division multiplexing (OFDM) communication signals with each other or with the base station 2512 and/or the base station 2514 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 2512 or base station 2514 may be implemented as one or more software entities running on server computers as part of a virtual network. In addition, or in other embodiments, the base station 2512 or base station 2514 may be configured to communicate with one another via interface 2522. In embodiments where the wireless communication system 2500 is an LTE system (e.g., when the CN 2524 is an EPC), the interface 2522 may be an X2 interface. The X2 interface may be defined between two or more base stations (e.g., two or more eNBs and the like) that connect to an EPC, and/or between two eNBs connecting to the EPC. In embodiments where the wireless communication system 2500 is an NR system (e.g., when CN 2524 is a 5GC), the interface 2522 may be an Xn interface. The Xn interface is defined between two or more base stations (e.g., two or more gNBs and the like) that connect to 5GC, between a base station 2512 (e.g., a gNB) connecting to 5GC and an eNB, and/or between two eNBs connecting to 5GC (e.g., CN 2524).

The RAN 2506 is shown to be communicatively coupled to the CN 2524. The CN 2524 may comprise one or more network elements 2526, which are configured to offer various data and telecommunications services to customers/subscribers (e.g., users of UE 2502 and UE 2504) who are connected to the CN 2524 via the RAN 2506. The components of the CN 2524 may be implemented in one physical device or separate physical devices including components to read and execute instructions from a machine-readable or computer-readable medium (e.g., a non-transitory machine-readable storage medium).

In embodiments, the CN 2524 may be an EPC, and the RAN 2506 may be connected with the CN 2524 via an Si interface 2528. In embodiments, the S1 interface 2528 may be split into two parts, an Si user plane (S1-U) interface, which carries traffic data between the base station 2512 or base station 2514 and a serving gateway (S-GW), and the Si-MME interface, which is a signaling interface between the base station 2512 or base station 2514 and mobility management entities (MMEs).

In embodiments, the CN 2524 may be a 5GC, and the RAN 2506 may be connected with the CN 2524 via an NG interface 2528. In embodiments, the NG interface 2528 may be split into two parts, an NG user plane (NG-U) interface, which carries traffic data between the base station 2512 or base station 2514 and a user plane function (UPF), and the Si control plane (NG-C) interface, which is a signaling interface between the base station 2512 or base station 2514 and access and mobility management functions (AMFs).

Generally, an application server 2530 may be an element offering applications that use internet protocol (IP) bearer resources with the CN 2524 (e.g., packet switched data services). The application server 2530 can also be configured to support one or more communication services (e.g., VoIP sessions, group communication sessions, etc.) for the UE 2502 and UE 2504 via the CN 2524. The application server 2530 may communicate with the CN 2524 through an IP communications interface 2532.

FIG. 26 illustrates a system 2600 for performing signaling 2634 between a wireless device 2602 and a network device 2618, according to embodiments disclosed herein. The system 2600 may be a portion of a wireless communications system as herein described. The wireless device 2602 may be, for example, a UE of a wireless communication system. The network device 2618 may be, for example, a base station (e.g., an eNB or a gNB) of a wireless communication system.

The wireless device 2602 may include one or more processor(s) 2604. The processor(s) 2604 may execute instructions such that various operations of the wireless device 2602 are performed, as described herein. The processor(s) 2604 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 2602 may include a memory 2606. The memory 2606 may be a non-transitory computer-readable storage medium that stores instructions 2608 (which may include, for example, the instructions being executed by the processor(s) 2604). The instructions 2608 may also be referred to as program code or a computer program. The memory 2606 may also store data used by, and results computed by, the processor(s) 2604.

The wireless device 2602 may include one or more transceiver(s) 2610 that may include radio frequency (RF) transmitter and/or receiver circuitry that use the antenna(s) 2612 of the wireless device 2602 to facilitate signaling (e.g., the signaling 2634) to and/or from the wireless device 2602 with other devices (e.g., the network device 2618) according to corresponding RATs.

The wireless device 2602 may include one or more antenna(s) 2612 (e.g., one, two, four, or more). For embodiments with multiple antenna(s) 2612, the wireless device 2602 may leverage the spatial diversity of such multiple antenna(s) 2612 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect).

MIMO transmissions by the wireless device 2602 may be accomplished according to precoding (or digital beamforming) that is applied at the wireless device 2602 that multiplexes the data streams across the antenna(s) 2612 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 2602 may implement analog beamforming techniques, whereby phases of the signals sent by the antenna(s) 2612 are relatively adjusted such that the (joint) transmission of the antenna(s) 2612 can be directed (this is sometimes referred to as beam steering).

The wireless device 2602 may include one or more interface(s) 2614. The interface(s) 2614 may be used to provide input to or output from the wireless device 2602. For example, a wireless device 2602 that is a UE may include interface(s) 2614 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 2610/antenna(s) 2612 already described) that allow for communication between the UE and other devices and may operate according to known protocols (e.g., Wi-Fi®, Bluetooth®, and the like).

The wireless device 2602 may include a UCI module 2616. The UCI module 2616 may be implemented via hardware, software, or combinations thereof. For example, the UCI module 2616 may be implemented as a processor, circuit, and/or instructions 2608 stored in the memory 2606 and executed by the processor(s) 2604. In some examples, the UCI module 2616 may be integrated within the processor(s) 2604 and/or the transceiver(s) 2610. For example, the UCI module 2616 may be implemented by a combination of software components (e.g., executed by a DSP or a general processor) and hardware components (e.g., logic gates and circuitry) within the processor(s) 2604 or the transceiver(s) 2610.

The UCI module 2616 may be used for various aspects of the present disclosure, for example, aspects of FIG. 20 through FIG. 24.

The network device 2618 may include one or more processor(s) 2620. The processor(s) 2620 may execute instructions such that various operations of the network device 2618 are performed, as described herein. The processor(s) 2620 may include one or more baseband processors implemented using, for example, a CPU, a DSP, an ASIC, a controller, an FPGA device, another hardware device, a firmware device, or any combination thereof configured to perform the operations described herein.

The network device 2618 may include a memory 2622. The memory 2622 may be a non-transitory computer-readable storage medium that stores instructions 2624 (which may include, for example, the instructions being executed by the processor(s) 2620). The instructions 2624 may also be referred to as program code or a computer program. The memory 2622 may also store data used by, and results computed by, the processor(s) 2620.

The network device 2618 may include one or more transceiver(s) 2626 that may include RF transmitter and/or receiver circuitry that use the antenna(s) 2628 of the network device 2618 to facilitate signaling (e.g., the signaling 2634) to and/or from the network device 2618 with other devices (e.g., the wireless device 2602) according to corresponding RATs.

The network device 2618 may include one or more antenna(s) 2628 (e.g., one, two, four, or more). In embodiments having multiple antenna(s) 2628, the network device 2618 may perform MIMO, digital beamforming, analog beamforming, beam steering, etc., as has been described.

The network device 2618 may include one or more interface(s) 2630. The interface(s) 2630 may be used to provide input to or output from the network device 2618. For example, a network device 2618 that is a base station may include interface(s) 2630 made up of transmitters, receivers, and other circuitry (e.g., other than the transceiver(s) 2626/antenna(s) 2628 already described) that enables the base station to communicate with other equipment in a core network, and/or that enables the base station to communicate with external networks, computers, databases, and the like for purposes of operations, administration, and maintenance of the base station or other equipment operably connected thereto.

The network device 2618 may include a UCI module 2632. The UCI module 2632 may be implemented via hardware, software, or combinations thereof. For example, the UCI module 2632 may be implemented as a processor, circuit, and/or instructions 2624 stored in the memory 2622 and executed by the processor(s) 2620. In some examples, the UCI module 2632 may be integrated within the processor(s) 2620 and/or the transceiver(s) 2626. For example, the UCI module 2632 may be implemented by a combination of software components (e.g., executed by a DSP or a general processor) and hardware components (e.g., logic gates and circuitry) within the processor(s) 2620 or the transceiver(s) 2626.

The UCI module 2632 may be used for various aspects of the present disclosure, for example, aspects of FIG. 20 through FIG. 24.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a user equipment (UE), comprising:

determining a first code rate ($r_1$) for a first portion of uplink control information (UCI);

determining a second code rate ($r_2$) for a second portion of the UCI;

determining a minimum number of physical resource blocks (PRBs)

$$(M_{RB,min}^{PUCCH})$$

of a physical uplink control channel (PUCCH) for transmitting the UCI based on $r_1$ and $r_2$ using $$\left(\sum_{n=1}^{N_{UCI-part2}^{total}} O_{UCI-part2,n} + O_{CRC,UCI-part2}\right)/(Q_m \cdot r_2) + \left(\sum_{n=1}^{N_{UCI-part1}^{total}} O_{UCI-part1,n} + O_{CRC,UCI-part1}\right)/(Q_m \cdot r_1) \leq M_{RB,min}^{PUCCH} + N_{sc,ctrl}^{RB} + N_{symb-UCI}^{PUCCH}, \text{ where: } \sum_{n=1}^{N_{UCI-part1}^{total}} O_{UCI-part1,n}$$

is a number of first payload bits of the first portion of the UCI;

$O_{CRC,UCI-part1}$ is a number of first cyclic redundancy check (CRC) bits for the first portion of the UCI;

$$\sum_{n=1}^{N_{UCI-part2}^{total}} O_{UCI-part2,n}$$

is a number of second payload bits of the second portion of the UCI;

$O_{CRC,UCI-part2}$ is a number of second CRC bits for the second portion of the UCI;

$Q_m$ is a parameter that is based on a modulation scheme used by the UE for the PUCCH;

$$N_{sc,ctrl}^{RB}$$

is a parameter that is based on a number of subcarriers per resource block excluding subcarriers used for demodulation reference signal (DM-RS) transmission; and $$N_{symb-UCI}^{PUCCH}$$

is a parameter that is based on a number of PUCCH symbols of the PUCCH excluding symbols used for DM-RS transmission; and transmitting the UCI using the minimum number of PRBs $$M_{RB,min}^{PUCCH}.$$

2. The method of claim 1, wherein:

the first portion of the UCI comprises one or more high priority (HP) hybrid automatic repeat request acknowledgement (HARQ-ACK) bits; and the second portion of the UCI comprises one or more low priority (LP) HARQ-ACK bits.

3. The method of claim 1, wherein:

the first portion of the UCI comprises one or more high priority (HP) scheduling request (SR) bits; and the second portion of the UCI comprises one or more low priority (LP) SR bits.

4. The method of claim 1, wherein the PUCCH is of a PUCCH format corresponding to a high priority PUCCH configuration.

5. The method of claim 1, wherein one of the first portion of the UCI and the second portion of the UCI comprises channel state information (CSI) report bits.

6. A computing apparatus of a user equipment (UE), comprising:

one or more processors; and a memory storing instructions that, when executed by the one or more processors, configure the UE to:

determine a first code rate ($r_1$) for a first portion of uplink control information (UCI);

determine a second code rate ($r_2$) for a second portion of the UCI;

determine a minimum number of physical resource blocks (PRBs)

$$\left(M_{RB,min}^{PUCCH}\right)$$

of a physical uplink control channel (PUCCH) for transmitting the UCI based on $r_1$ and $r_2$ using $$\left(\sum_{n=1}^{N_{UCI-part2}^{total}} O_{UCI-part2,n} + O_{CRC,UCI-part2}\right)/(Q_m \cdot r_2) + \left(\sum_{n=1}^{N_{UCI-part1}^{total}} O_{UCI-part1,n} + O_{CRC,UCI-part1}\right)/(Q_m \cdot r_1) \leq M_{RB,min}^{PUCCH} \cdot N_{sc,ctrl}^{RB} \cdot N_{symb-UCI}^{PUCCH}, \text{ where: } \sum_{n=1}^{N_{UCI-part1}^{total}} O_{UCI-part1,n}$$

is a number of first payload bits of the first portion of the UCI;

$O^{CRC,UCI-part1}$ is a number of first cyclic redundancy check (CRC) bits for the first portion of the UCI;

$$\sum_{n=1}^{N_{UCI-part2}^{total}} O_{UCI-part2,n}$$

is a number of second payload bits of the second portion of the UCI;

$O_{CRC,UCI-part2}$ is a number of second CRC bits for the second portion of the UCI;

$Q_m$ is a parameter that is based on a modulation scheme used by the UE for the PUCCH;

$$N_{sc,ctrl}^{RB}$$

is a parameter that is based on a number of subcarriers per resource block excluding subcarriers used for demodulation reference signal (DM-RS) transmission; and $$N_{symb-UCI}^{PUCCH}$$

is a parameter that is based on a number of PUCCH symbols of the PUCCH excluding symbols used for DM-RS transmission; and transmit the UCI using the minimum number of PRBs $$M_{RB,min}^{PUCCH}.$$

7. The computing apparatus of claim 6, wherein:

the first portion of the UCI comprises one or more high priority (HP) hybrid automatic repeat request acknowledgement (HARQ-ACK) bits; and the second portion of the UCI comprises one or more low priority (LP) HARQ-ACK bits.

8. The computing apparatus of claim 6, wherein:

the first portion of the UCI comprises one or more high priority (HP) scheduling request (SR) bits; and the second portion of the UCI comprises one or more low priority (LP) SR bits.

9. The computing apparatus of claim 6, wherein the PUCCH is of a PUCCH format corresponding to a high priority PUCCH configuration.

10. The computing apparatus of claim 6, wherein one of the first portion of the UCI and the second portion of the UCI comprises channel state information (CSI) report bits.

11. A non-transitory computer-readable storage medium including instructions that when executed by one or more processors of a user equipment (UE), cause the UE to:

determine a first code rate ($r_1$) for a first portion of uplink control information (UCI);

determine a second code rate ($r_2$) for a second portion of the UCI;

determine a minimum number of physical resource blocks $$\left(M_{RB,min}^{PUCCH}\right)$$

of a physical uplink control channel (PUCCH) for transmitting the UCI based on $r_1$ and $r_2$ using $$\left(\sum_{n=1}^{N_{UCI\text{-}part2}^{total}} O_{UCI\text{-}part2,n} + O_{CRC,UCI\text{-}part2}\right)/(Q_m \cdot r_2) + \left(\sum_{n=1}^{N_{UCI\text{-}part1}^{total}} O_{UCI\text{-}part1,n} + O_{CRC,UCI\text{-}part1}\right)/(Q_m \cdot r_1) \le M_{RB,min}^{PUCCH} \cdot N_{sc,ctrl}^{RB} \cdot N_{symb\text{-}UCI}^{PUCCH},$$ where: $$\sum_{n=1}^{N_{UCI\text{-}part1}^{total}} O_{UCI\text{-}part1,n}$$

is a number of first payload bits of the first portion of the UCI;

$O_{CRC,UCI\text{-}part1}$ is a number of first cyclic redundancy check (CRC) bits for the first portion of the UCI;

$$\sum_{n=1}^{N_{UCI\text{-}part2}^{total}} O_{UCI\text{-}part2,n}$$

is a number of second payload bits of the second portion of the UCI;

$O_{CRC,UCI\text{-}part2}$ is a number of second CRC bits for the second portion of the UCI;

$Q_m$ is a parameter that is based on a modulation scheme used by the UE for the PUCCH;

$$N_{sc,ctrl}^{RB}$$

is a parameter that is based on a number of subcarriers per resource block excluding subcarriers used for demodulation reference signal (DM-RS) transmission; and $$N_{symb\text{-}UCI}^{PUCCH}$$

is a parameter that is based on a number of PUCCH symbols of the PUCCH excluding symbols used for DM-RS transmission; and transmit the UCI using the minimum number of PRBs $$M_{RB,min}^{PUCCH}.$$

12. The non-transitory computer-readable storage medium of claim 11 wherein:

the first portion of the UCI comprises one or more high priority (HP) hybrid automatic repeat request acknowledgement (HARQ-ACK) bits; and the second portion of the UCI comprises one or more low priority (LP) HARQ-ACK bits.

13. The non-transitory computer-readable storage medium of claim 11, wherein:

the first portion of the UCI comprises one or more high priority (HP) scheduling request (SR) bits; and the second portion of the UCI comprises one or more low priority (LP) SR bits.

14. The non-transitory computer-readable storage medium of claim 11, wherein the PUCCH is of a PUCCH format corresponding to a high priority PUCCH configuration.

15. The non-transitory computer-readable storage medium of claim 11, wherein one of the first portion of the UCI and the second portion of the UCI comprises channel state information (CSI) report bits.

* * * * *